United States Patent [19]
Bolon et al.

[11] Patent Number: 5,822,420
[45] Date of Patent: Oct. 13, 1998

[54] SIGNALING PROTOCOL FOR MULTILINK ACCESS NETWORK-LOCAL EXCHANGE INTERFACES

[75] Inventors: Brian Bolon, Ellicott City; Masoud Loghmani; Steven Davis, both of Columbia, all of Md.

[73] Assignee: Digital Technics, Inc., Columbia, Md.

[21] Appl. No.: 706,220

[22] Filed: Aug. 30, 1996

[51] Int. Cl.$^6$ .............................. H04M 7/00; H04M 9/00
[52] U.S. Cl. .......................... 379/230; 379/198; 379/207; 379/219; 379/229; 379/399; 370/431; 370/434
[58] Field of Search .................................. 379/196, 197, 379/198, 199, 200, 201, 207, 229, 230, 231, 333, 232, 234, 219, 220, 399; 370/329, 335, 336, 431, 432, 433, 434, 437, 441, 442, 464

[56] References Cited

U.S. PATENT DOCUMENTS

| | | | |
|---|---|---|---|
| 4,811,420 | 3/1989 | Avis et al. | 455/502 |
| 4,879,714 | 11/1989 | Maeno | 370/437 |
| 5,046,067 | 9/1991 | Kimbrough | 370/377 |
| 5,161,180 | 11/1992 | Chavous | 379/198 |
| 5,291,479 | 3/1994 | Vaziri et al. | 370/264 |
| 5,315,644 | 5/1994 | Lester et al. | 379/399 |
| 5,381,405 | 1/1995 | Daugherty et al. | 370/355 |
| 5,386,417 | 1/1995 | Daugherty et al. | 370/352 |
| 5,422,943 | 6/1995 | Cooney et al. | 379/234 |
| 5,452,286 | 9/1995 | Kitayama | 370/228 |
| 5,454,033 | 9/1995 | Hahn et al. | 379/198 |
| 5,467,398 | 11/1995 | Pierce et al. | 380/44 |
| 5,528,665 | 6/1996 | Peitz | 455/403 |
| 5,544,224 | 8/1996 | Jonsson et al. | 455/434 |
| 5,550,913 | 8/1996 | McMaster et al. | 379/234 |
| 5,566,239 | 10/1996 | Garcia et al. | 379/399 |
| 5,574,783 | 11/1996 | Dunn | 379/234 |
| 5,635,980 | 6/1997 | Lin et al. | 348/13 |
| 5,642,411 | 6/1997 | Theis | 379/265 |
| 5,651,061 | 7/1997 | Domoto et al. | 379/220 |

FOREIGN PATENT DOCUMENTS

| | | | |
|---|---|---|---|
| 616 476 | 3/1994 | European Pat. Off. | H04Q 3/58 |
| 616 478 | 3/1994 | European Pat. Off. | H04Q 3/66 |
| WO 97/18687 | 5/1997 | WIPO | H04Q 11/04 |

OTHER PUBLICATIONS

Matwijee, T.A., "Local Digital Switch Features Needed to Support Forward–Looking Integrated Digital Loop Carrier Systems", Bell Communications Research, Inc., Jun. 1987, pp. 11.1.1–11.1.7.

Overstreet, R.L., "Low Bit Rate Voice in Digital Loop Carrier Systems", AT&T Bell Laboratories, Nov. 1987, pp. 20.7.1–20.7.4.

*Primary Examiner*—Ahmad F. Matar
*Assistant Examiner*—Scott Wolinsky
*Attorney, Agent, or Firm*—Roylance, Abrams, Berdo & Goodman, L.L.P.

[57] ABSTRACT

A protocol for multilink access network-local exchange (AN-LE) interfaces is provided for common channel signaling on all AN-LE links and the transfer of calls and control to operational links upon detection of a link failure. The protocol permits the AN to assign channels on an AN-LE link and is error-tolerant and self-aligning.

12 Claims, 42 Drawing Sheets

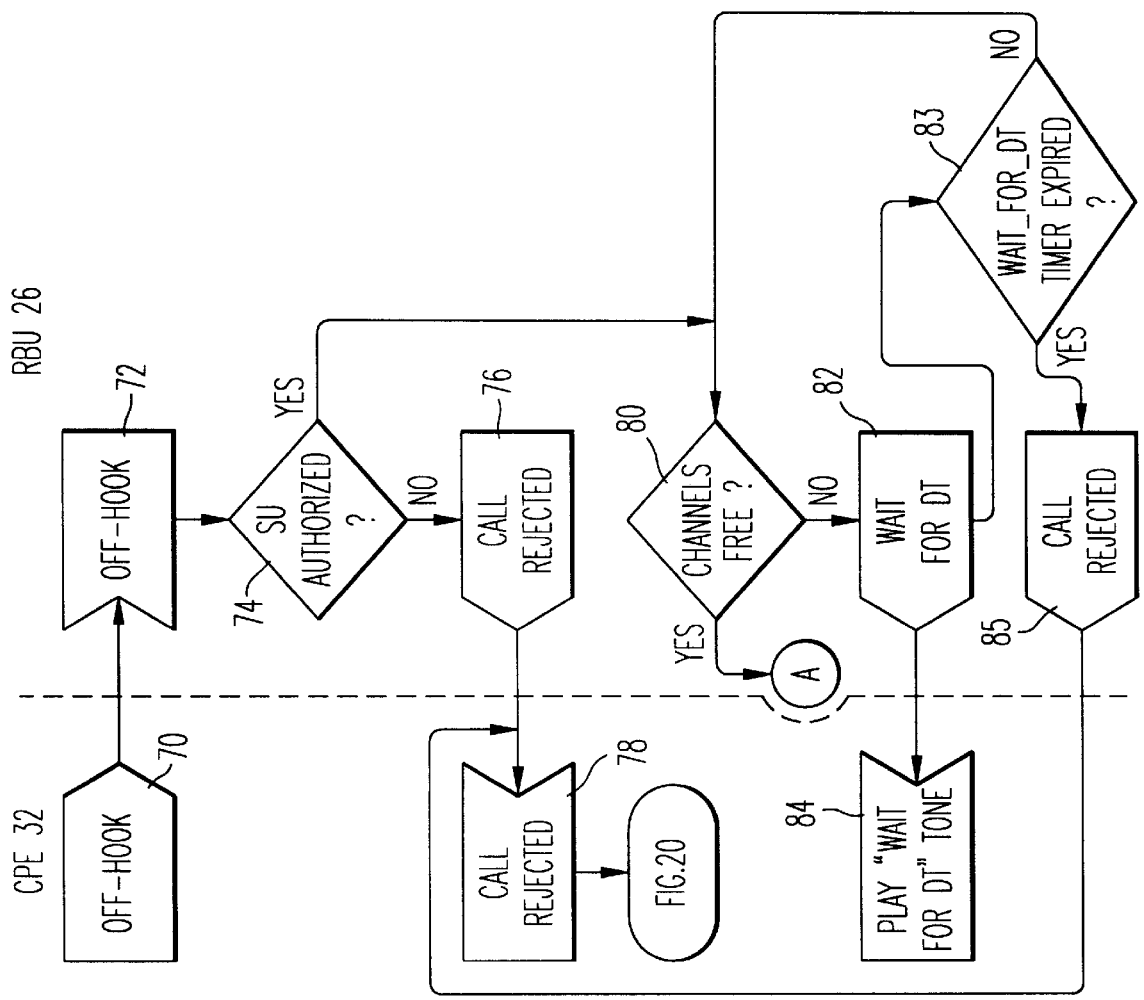

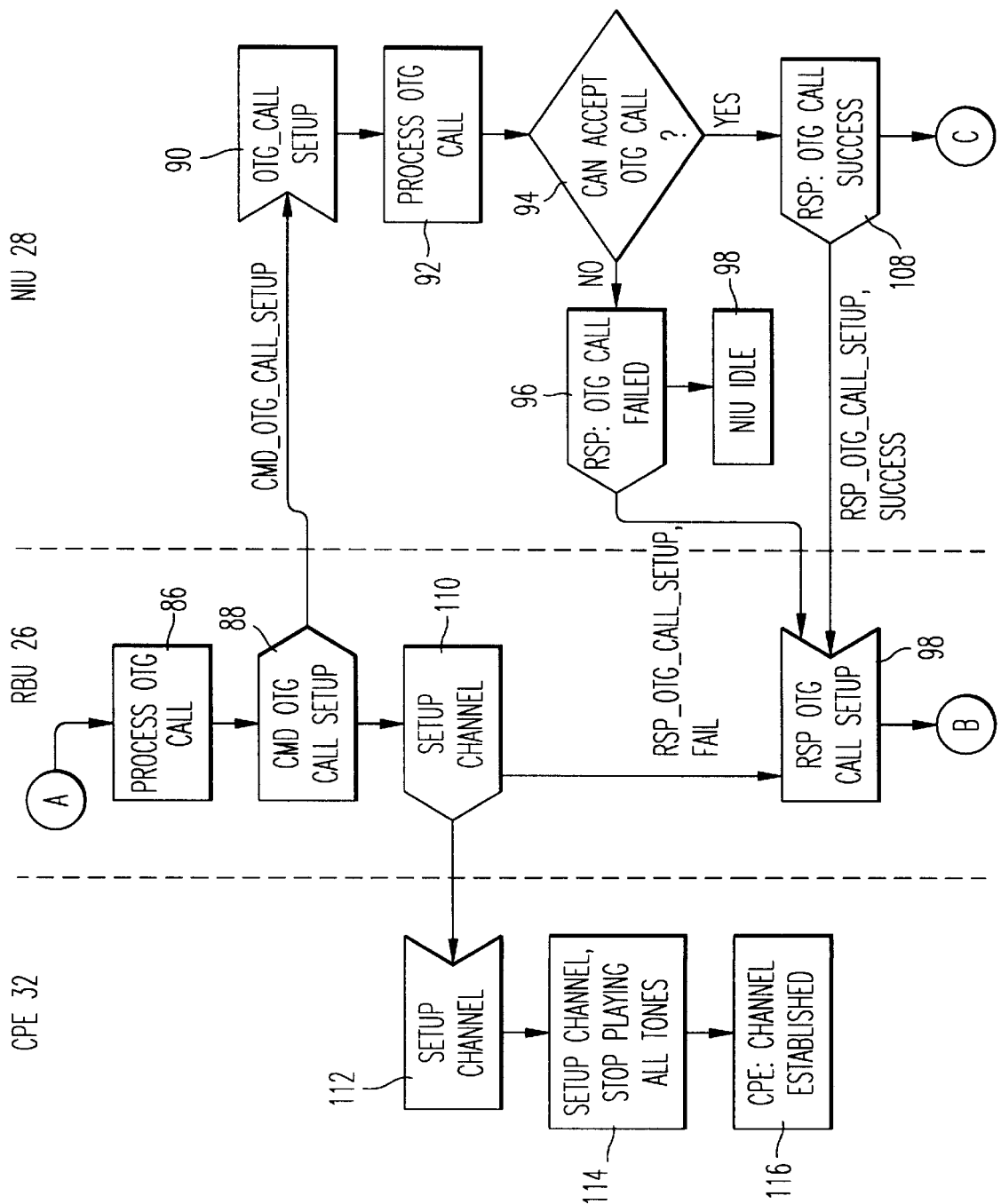

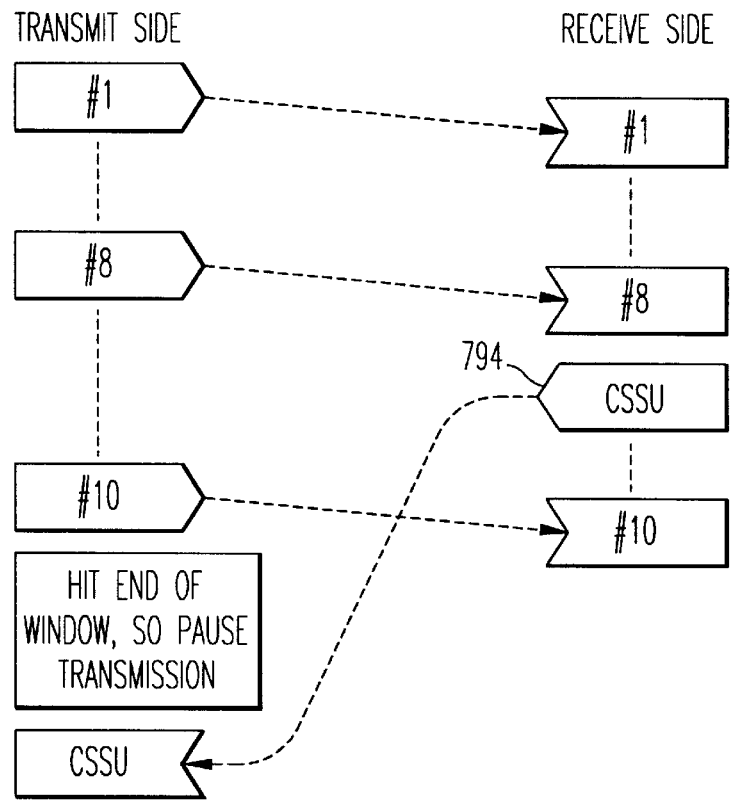
NOW 8 PACKETS ARE ACKNOWLEDGED AND
ONLY 2 PACKETS ARE UNACKNOWLEDGED,
SO RESUME TRANSMISSION OF UP TO 8 MORE.
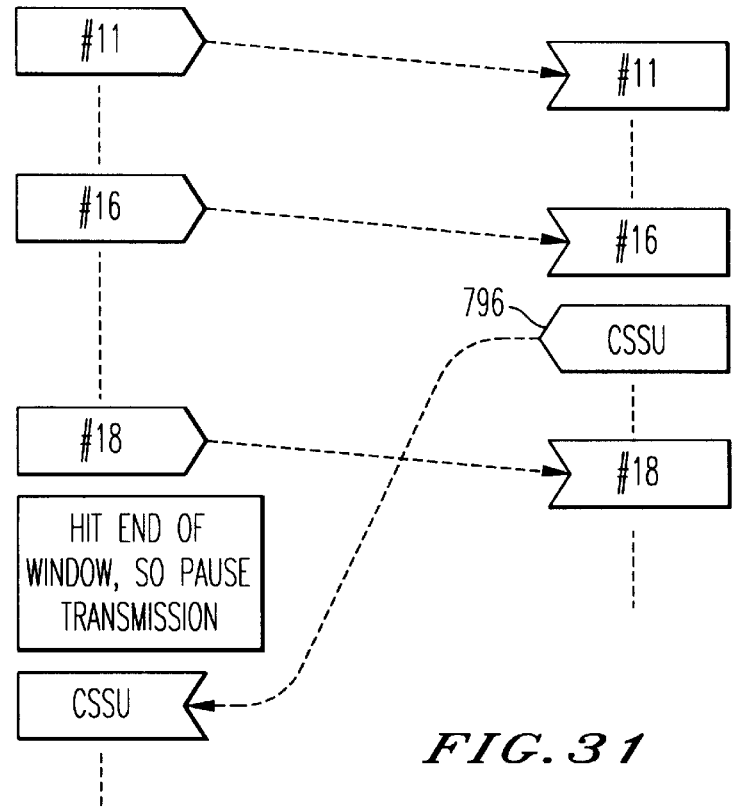
FIG. 31

SIGNALING PROTOCOL FOR MULTILINK ACCESS NETWORK-LOCAL EXCHANGE INTERFACES

BACKGROUND OF THE INVENTION

Digital loop carriers (DLCs) provide subscribers in a carrier serving area with at least one of the following: voice-grade service, digital data service (e.g., up to 64 kilobits per second (kbps), digital subscriber lines (DSLs) for integrated digital services networks (ISDNs) and a number of two-wire voice-grade special services. A DLC can be a stand-alone or universal DLC (UDLC), or integrated into a local serving switch to create an integrated DLC (IDLC). A DLC comprises a local digital switch (LDS), a digital transmission facility (DTF) and a remote digital terminal (RDT) such as a SLC®96 remote terminal available from AT&T, Parsippany, N.J. Conventional metallic pair loop designs are often used on the subscriber side of the RDT, although other links such as fixed wireless links (FWLs) can be used. The LDS provides at least one DS1 digital carrier (i.e., a North American standard 1.544 megabit/sec (Mbps) T1 or an International Telegraph and Telephone Consultative Committee (CCITT) standard 2.048 Mbps E1) to the RDT. The DS1 can be transported on metallic pairs or a fiber pair, for example.

A number of standards have been developed for DLCs such as the TR-303 standard described in the Technical Reference TR-NWT-000303 and related documents published by Bell Communications Research, Inc., Morristown, N.J., and the V5 standard promulgated by the European Telecommunications Standards Institute (ETSI). The TR-303 standard describes a generic interface between a RDT 12 and a LDS 14 in an IDLC 10, as shown in FIG. 1. The LDS 14 comprises switch stages 16 and an integrated digital terminal (IDT) 18. Operating systems (OSs) 24 can be connected to the IDT 18. The IDLC system 10 further comprises a digital signal cross-connect 20 and an office repeater bay 22. TR-303 is also applicable to non-integrated systems, that is, UDLC systems using the same RDT 12. UDLCs are typically installed in analog central offices (COs) and then later integrated by replacing the analog switch with a LDS 14 and the COT with a direct digital interface to the LDS.

According to the TR-303 standard, the physical layer of the IDLC interface is based on DS1 rate modularity. A DS1 uses the Extended Super Frame (ESF) format which employs the channel derived from the 193rd bit of a DS1 frame for a number of functions such as synchronization and error detection, and a derived 4 kbps channel for performance report messages between an RDT 12 and an LDS 14 or alarm codes when preempted. A separate DS0 data link called the Embedded Operations Channel (EOC) is used for transmitting operations messages between the RDT 12 and the LDS 14 and between the RDT and operating systems (OSs). The EOC is based on LAPD or Link Access protocol on the D-channel for ISDN.

The generic IDLC interface described in TR-303 supports two different call processing techniques. The first technique is hybrid signaling (i.e., sixteen state robbed-bit signaling or in-slot signaling) wherein ABCD codes are transmitted for call supervision (e.g., on-hook and off-hook detection) while a time slot is assigned to the line unit. Per-call time slot assignment is accomplished over a 64 kbps data link channel (i.e., a DS0 channel) referred to as the Time Slot Management Channel (TMC) which carries messages between the LDS and RDT. These messages are used to create and destroy time slot assignments between line units and DS0s on a per-call basis. The second call processing technique is out-of-band signaling and consists solely of a 64 kbps data link channel referred to as the Common Signaling Channel (CSC). The CSC carries messages for making time slot assignments and for call supervision. Both the TMC and the CSC are based on the LAPD protocol that is used on ISDN D-channels. The LDS 14 in a generic IDLC 10 under TR-303 preferably accommodates both call processing techniques to enable connection with different RDTs 12 which may use either TMC or CSC signaling, but need not do so simultaneously for any one RDT. In both types of signaling, that is, TMC and CSC, time slot assignment is accomplished at the LDS 14.

With reference to FIG. 2, the RDT 12 is one of a number of different types of access networks (ANs) 26, and the LDS 14 is more generically described as a local exchange (LE) 28. The ETSI developed the V5 protocol (i.e., V5.1 and V5.2) for a link 30 between an AN 26 and a LE 28, which shall hereinafter be referred to as an AN-LE link 30. The V.5 protocol is substantially equivalent to TR-303; therefore, the TR-303, V.5 protocol and similar protocols for AN-LE links are disadvantageous for a number of the same reasons. First, these protocols require an AN (e.g., a radio base unit (RBU) in a FWL) to report all physical signals collected at customer premises equipment (CPE) 32 (e.g., a line unit connected to a RDT 12) to the LE 28. The LE 28 then analyzes the signals to determine the type of service to offer the subscriber. Thus, air channels in a FWL are being used for the transmission of redundant data that does not generate revenue. Second, these protocols do not provide call processing in a number of situations such as when a CPE 32 goes off-hook and no air channel or DS0 is available. In such a case, the AN 26 rejects the call in accordance with these protocols. These protocols are not error-tolerant and do not provide self-alignment functions. In addition, these protocols do not permit priorities to be assigned to calls (e.g., emergency calls using "911"). The protocols generally use one or more selected links between a AN 26 and a LE 28 for signaling. Thus, when one of these links 30 is not functional, some of the control communication channels may be lost because the protocol does not provide for transfer of calls to another link that is operational. Alternatively, some calls must be torn down in order to allow for transfer of control to other links 30. Finally, these protocols require the LE to transmit time slot or channel assignment information regardless of whether it is used by the AN.

SUMMARY OF THE INVENTION

In accordance with the present invention, a protocol is provided for links between an AN and an LE which overcomes disadvantages associated with existing protocols and realizes a number of advantages. The protocol provides for common channel signaling on all of the AN-LE links and the transfer of calls from a failed link to an operational link without reinitialization of links following a switchover protocol, and additional administrative functions. Further, the protocol of the present invention conserves bandwidth by permitting the CPE to interpret physical signals and to send processed results to an AN, and by eliminating the need for the LE to send channel assignment data to the AN. The AN assigns channels on one or more AN-LE links.

In accordance with another aspect of the present invention, the AN-LE interface protocol provides for call processing in a number of glare conditions which arise in a telecommunications system having multiple points of control along the path of a call (e.g., an AN that assigns channels on the AN-LE link). Examples of these glare conditions include a CPE placing an outgoing call when the NIU is sending it an incoming call, or the NIU placing an incoming call to the CPE when the RBU is sending it an outgoing call.

In accordance with another aspect of the present invention, the protocol implements a self-aligning, error-tolerant link layer which allows for detection of link failure by either the AN or LE end point, notification of the other end point, termination of multiple frame operation and transfer of calls and control signaling from the failed link to other operational links. The link layer also provides for notifying end points of misalignment conditions and for corrective procedures.

BRIEF DESCRIPTION OF THE DRAWINGS

These and other features and advantages of the present invention will be more readily apprehended from the following detailed description when read in connection with the appended drawings, which form a part of this original disclosure, and wherein:

FIGS. 6A, 6B, 6C, 7–15, 16A, 16B and 17–20 are flow charts illustrating respective sequences of call processing operations performed by the AN and the LE in accordance with an embodiment of the present invention;

FIGS. 30–35 are schematic diagrams of illustrating the processing of exemplary packets transmitted between the AN and the LE in accordance with an embodiment of the present invention.

DETAILED DESCRIPTION OF THE PREFERRED EMBODIMENT

Figure 1:
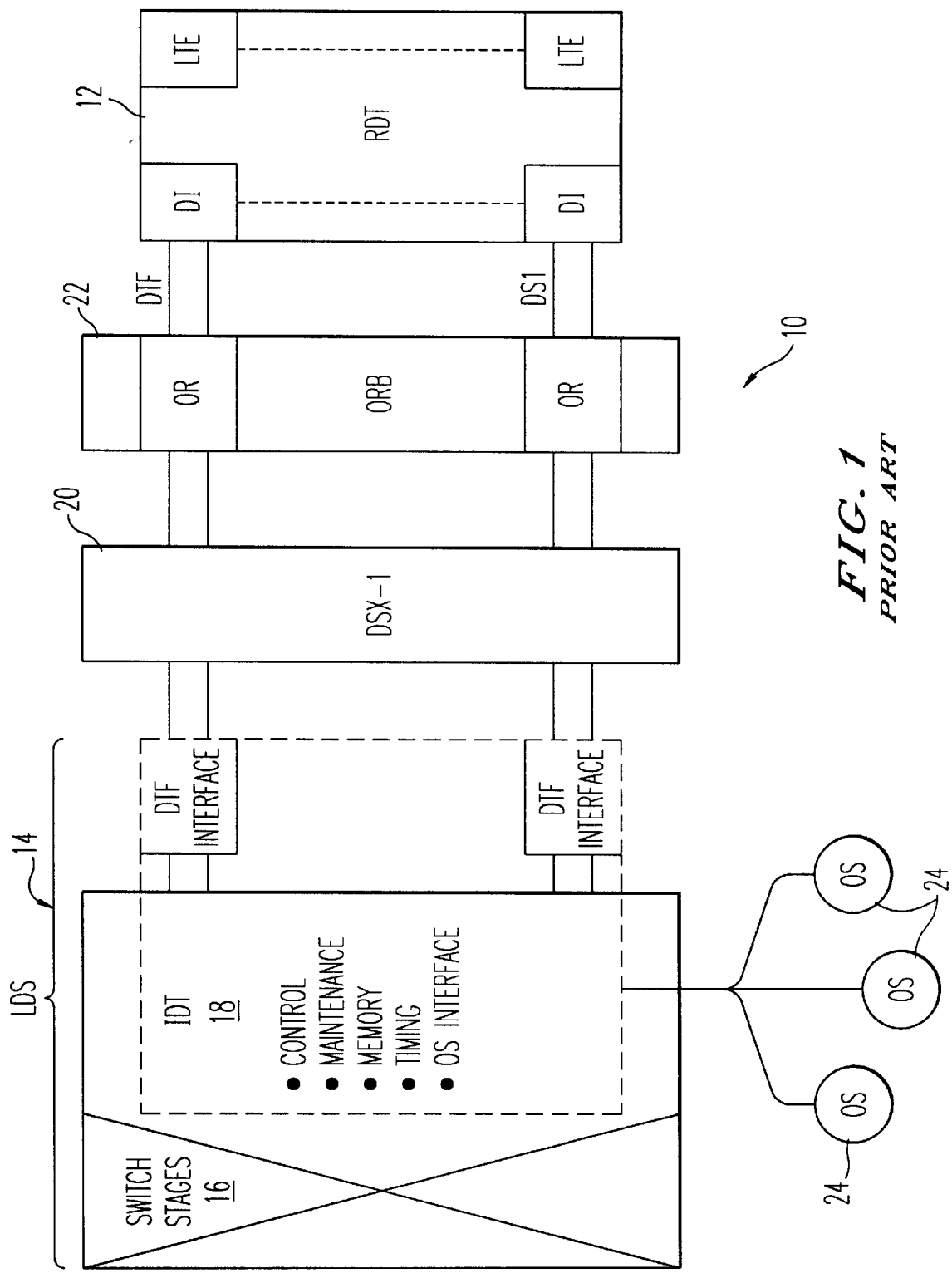
FIG. 1 is a block diagram of a conventional integrated digital loop carrier.
Figure 2:
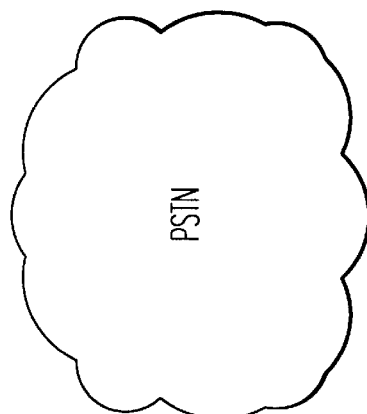
FIG. 2 is a block diagram of a conventional telecommunications access system.
Figure 3:
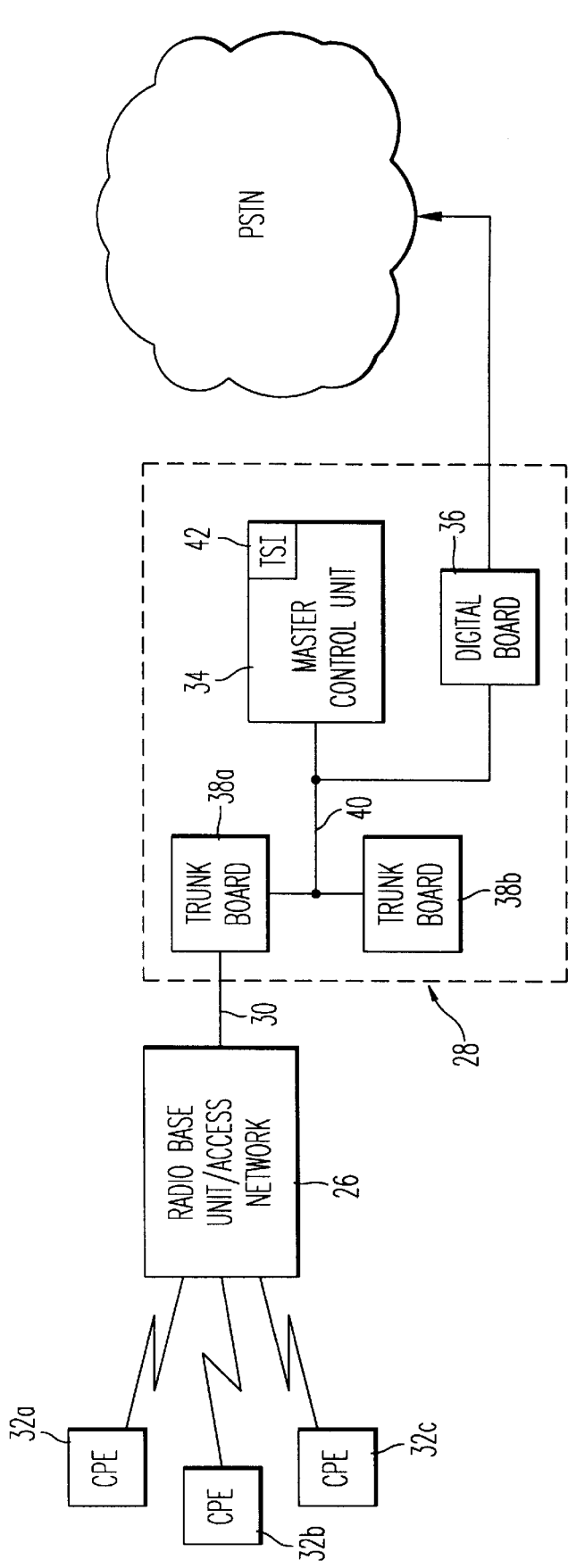
FIG. 3 is a block diagram of an exemplary telecommunications access system for implementing a multilink AN-LE interface protocol in accordance with an embodiment of the present invention.

The multilink AN-LE interface protocol of the present invention is preferably used for signaling on two or more AN-LE links 30 (FIG. 2). For illustrative purposes, the AN 26 is a radio base unit (RBU), the LE 28 is a network interface unit (NIU), an AN-LE link 30 is an E1, and the CPE 32 is located in a FWL. The reference numerals 26 and 28 shall hereinafter correspond to the RBU and NIU, respectively, as shown in FIG. 3. It is to be understood, however, that the AN-LE interface protocol of the present invention can be used with substantially any type of AN-LE link 30 and with substantially any type of CPE 32, AN 26 and LE 28.

With reference to FIG. 3, the RBU 26 can be, for example, a Lockheed-Martin RBU provided for the CD2000 line of FWL products available from Granger Telecommunications Systems, Ltd., United Kingdom. The RBU is configured for connection to four E1s. Four AN-LE links 30 shall therefore be described as connecting the AN 26 and the LE 28 for illustrative purposes.

The NIU 28 preferably comprises one or more master control units (MCUs) 34 and one or more peripheral boards such as the boards described in U.S. Pat. No. 5,291,479, which issued Mar. 1, 1994 to Faramarz Vaziri, Brian Bolon, Brent E. Bryson, John Emerick and is incorporated herein by reference. For example, the NIU 28 can comprise a digital board 36 connected to the PSTN, and trunk boards 38a and 38b. The trunk boards 38a and 38b can each be connected to the RBU 26 by two E1s. It is to be understood that an MCU 34 can be connected to different numbers and different types of peripheral boards, as well as to other MCUs.

The MCU 34 and the peripheral boards 36a, 36b and 38 are preferably connected by a plurality of pulse code modulated (PCM) highways indicated generally at 40. For example, six PCM highways can be provided to transmit data among the MCU 34 and the peripheral boards, each PCM highway having an aggregate data rate of 2.048 Mbps and 32 time division multiplexed (TDM) 64 kbps channels. Thus, as many as 192 ports can have PCM highway access without blocking any port activity. Seventh and eighth dedicated PCM highways are preferably also provided for service circuits and internal system communication, respectively. The seventh and eighth PCM highways preferably use the high-level data link control (HDLC) developed by the International Standards Organization to establish a master/slave relationship between the MCU and the peripheral boards as described in U.S. Pat. No. 5,291,479. A time slot interchange (TSI) 42 is provided on the MCU 34 which allows the MCU to route calls via the 192 ports and to connect the ports to local services.

Figure 4:
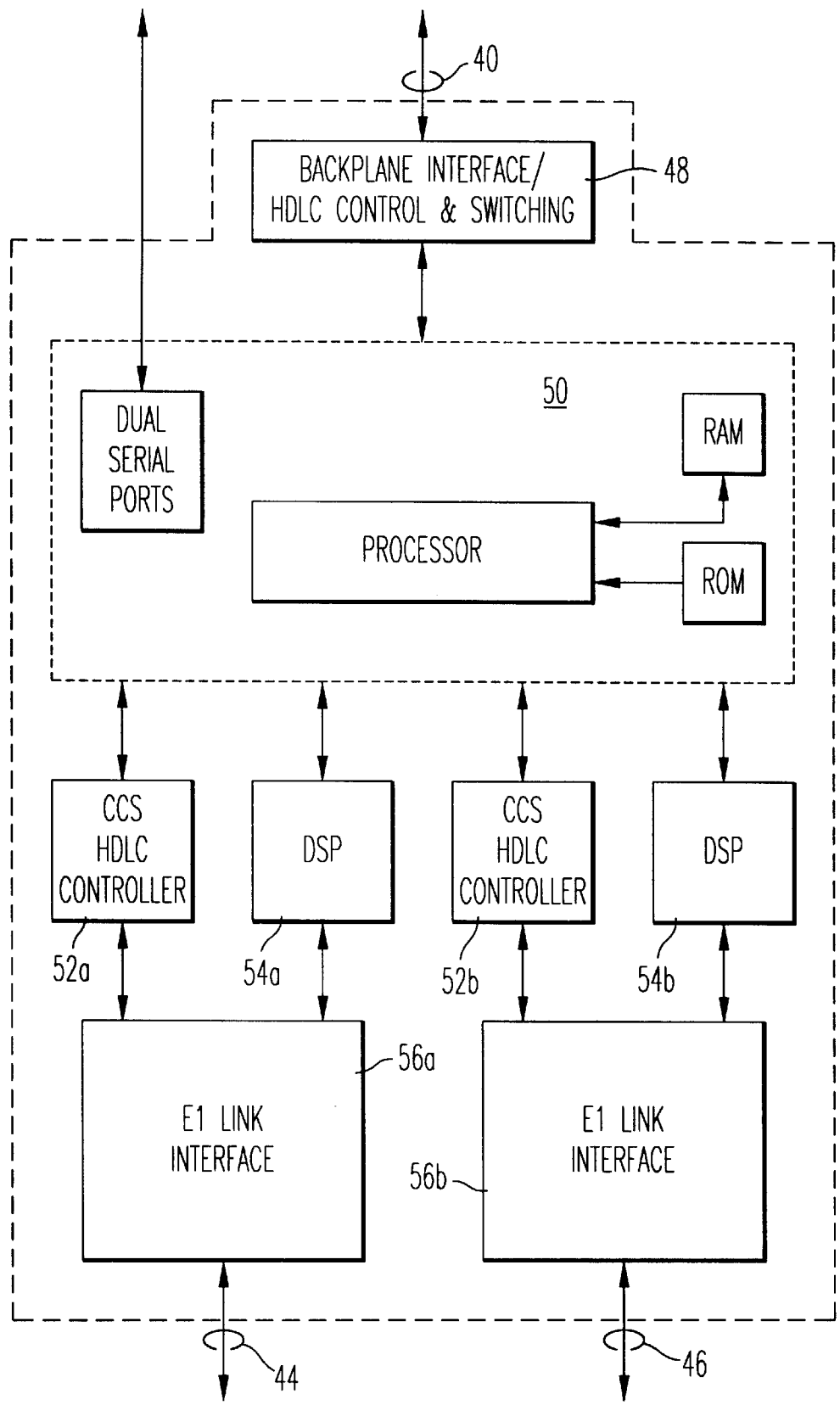
FIG. 4 is a block diagram of a trunk board for use in the local exchange of the telecommunications access system depicted in FIG. 3.

With reference to FIG. 4, a trunk board 38 is shown which comprises circuitry for processing a plurality of trunk lines such as two E1s 44 and 46. A backplane interface 48 is provided for connecting the trunk board to the PCM highways 40. The backplane interface 48 comprises HDLC control for the seventh and eighth dedicated PCM highways and TSI control for switching data from the E1s onto one of the 192 channels or for receiving data packets from a channel that are addressed to the trunk board. A main control circuit 50 on the trunk board comprises a board processor 45, read-only and random access memories 47 and 49 (i.e., a ROM and a RAM), serial ports 51 and program code for communicating with the MCU 34 via HDLC control and for operating trunk board components. Further, the trunk board 38 comprises HDLC controllers 52a and 52b, optional digital signal processors (DSP) 54a and 54b and E1 interface units 56a and 56b for each of the two E1s, respectively. Each HDLC controller 52 is programmed to process signaling between the NIU 28 and the RBU 26 on that particular E1 in accordance with the protocol of the present invention. Each DSP 54 is programmed to provide tone detection and generation and echo cancellation, among other functions. Each E1 interface unit 56 provides a physical interface for with an E1, as well as clocking, protection.

Figure 5:
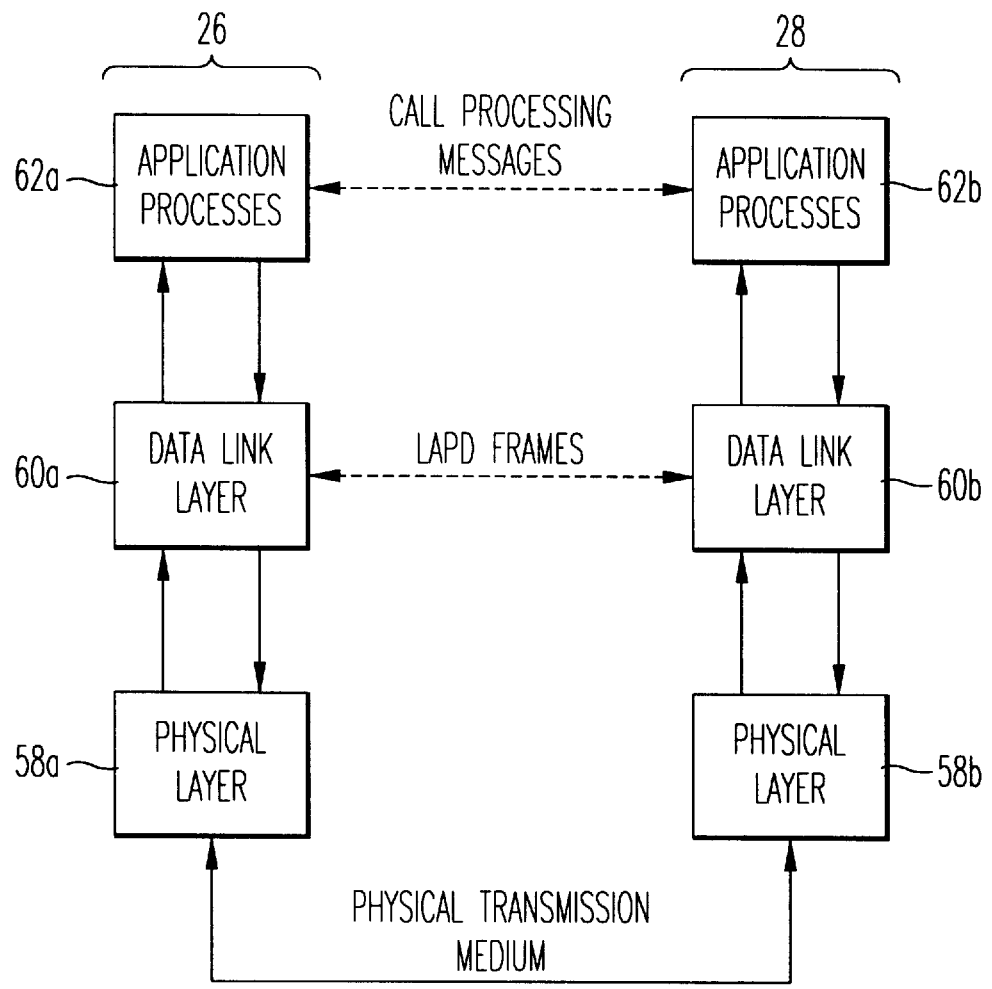
FIG. 5 is a schematic block diagram illustrating the layers of network processing associated with an AN and a LE that employ a multilink AN-LE interface protocol in accordance with an embodiment of the present invention.

The AN (e.g., RBU) 26 and the LE (e.g., NIU) 28 will now be described with reference to three layers in the Open Systems Interconnection (OSI) model network architecture designed by the International Standards Organization (ISO). First, a physical layer 58 such as an RS-232 wireline or other physical connection is provided between the AN 26 and the LE 28, as shown in FIG. 5. Second, a link layer 60 is provided to ensure frames of data are reliably transmitted on the physical layer 58 between the AN 26 and the LE 28, for example. Finally, an application layer 62 is provided for call processing.

The application layer of the AN-LE interface protocol of the present invention will now be described with reference to FIGS. 6A, 6B, 6C, 7–15, 16A, 16B, and 17–20. The flow charts in FIGS. 6A, 6B, 6C, 7–15, 16A, 16B and 17–20 illustrate call processing for a number of events, including an outgoing call from a CPE 32 to the NIU 28 (FIGS. 6A, 6B and 6C), an incoming call from the PSTN to a CPE 32 (FIG. 7), call tear-down upon receipt of an on-hook signal from a CPE 32 (FIG. 8), call tear-down upon release of a high traffic, low priority (HTLP) call by the RBU 26 (FIG. 9), call tear-down upon detection of a lost air channel by the RBU 26 (FIG. 10), call tear-down initiated by the NIU 28 (FIG. 11), change of call type (FIG. 12) or call priority (FIG. 13), hook flash (FIG. 14), an incoming call from a pay telephone (FIG. 15), channel reassignment to another on the AN-LE link 30 (FIGS. 16A and 16B), a number of glare conditions (FIGS. 17–19), and call rejection at a CPE 32 (FIG. 20).

Figure 6C:
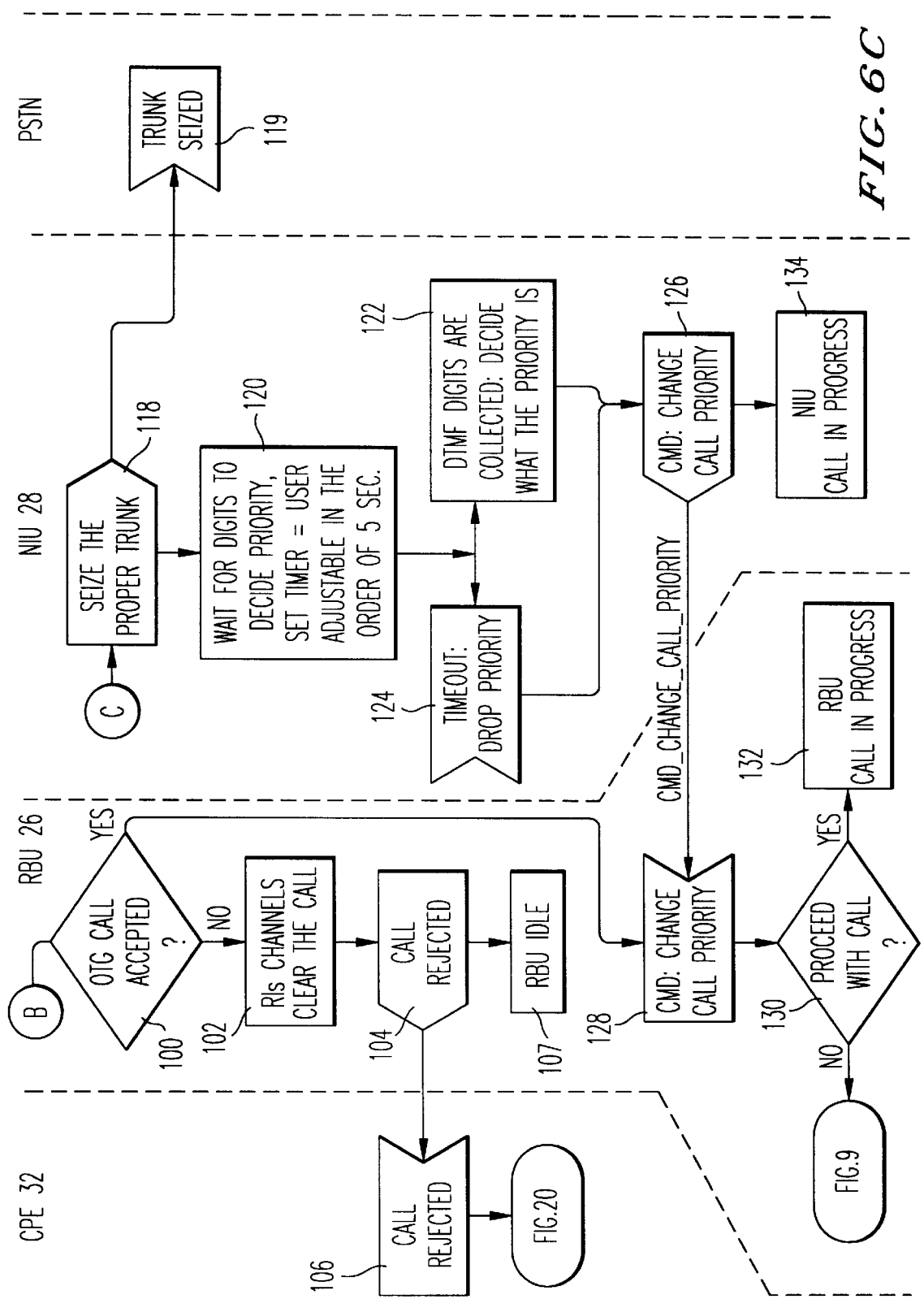

As shown in FIGS. 6A, 6B and 6C the RBU 26 receives an indication that a CPE 32 has gone off-hook, as indicated in blocks 70 and 72. The RBU 26 is programmed to determine whether or not the CPE 32 or subscriber unit 32 is authorized to access the network via the RBU 26 and the NIU 28, and rejects the call if the CPE 32 28 is not authorized (blocks 74 and 76). A call rejection signal is transmitted from the RBU 26 to the CPE 32 (block 78). The CPE 32 subsequently undergoes the procedure illustrated in FIG. 20 for call termination or rejection. If subscriber unit 32 access is authorized, the RBU 26 determines whether or not any channels on an AN-LE link 30 are available (block 80). The AN-LE interface protocol of the present invention assumes a generic interface between the RBU and the CPE. By way of example, the RBU 26 can transmit a wait-for-dial tone command to the CPE 32 if no channels are available (blocks 82 and 84). If a channel does not become available within a predetermined period of time, the call is rejected, as indicated by blocks 83 and 85. If channels are available on an AN-LE link 30, the RBU 26 is programmed to commence processing an outgoing call (block 86) by transmitting a CMD_OTG_CALL_SETUP command to the NIU 28 (block 88). The CMD_OTG_CALL_SETUP command provides the NIU 28 with a time slot on an AN-LE link 30 that is to be used for the outgoing call, the subscriber's identification number, and other information. Alternatively, the AN-LE link 30 can be a serial RS-232 connection.

In accordance with the present invention, the RBU 26 does not forward an indication that the CPE 32 has gone off-hook to the NIU 28. The CPE 32 determines the off-hook condition itself and then reports the condition to the RBU 26. This is in contrast with existing AN-LE link protocols which require the transmission of physical signals from the CPE 32 to a local exchange 28 for processing to determine the service that is to be provided, thereby placing redundant, non-revenue generating data on the communication links between the CPE 32 and the AN 26 and between the AN 26 and the LE 28.

Upon receipt of the CMD_OTG_CALL_SETUP command (block 90), the NIU 28 proceeds to process an outgoing call in accordance with its program code (block 92). For example, the NIU 28 first determines whether or not it can accept an outgoing call (block 94). If the NIU 28 is unable to accept the call, it transmits a RSP_OTG_CALL_SETUP response with a failure code signal to the RBU 26 (block 94). The NIU 28 then enters an idle state (block 96).

Upon receipt of this response signal (blocks 98 and 100), the RBU 26 releases the channels that were being reserved for the outgoing call initiated by the CPE 32 and otherwise clears the call (block 102). The RBU 26 subsequently transmits a call rejected signal to the CPE 32 (blocks 104 and 106). Accordingly, the CPE 32 commences the process illustrated in FIG. 20, and the RBU 26 enters an idle state (block 107). If the NIU 28 can accept the outgoing call, it transmits a RSP_OTG_CALL_SETUP response with a success code signal, as indicated by the affirmative branch of decision block 94 and block 108. Meanwhile, the RBU 26 commands the CPE 32 to prepare for communication on the time slot assigned by the RBU 26 and to stop playing all tones, as indicated in blocks 110, 112, 114 and 116.

After the NIU 28 transmits a response signal indicating that it is prepared to process the outgoing call (block 108), the NIU 28 seizes a trunk and awaits receipt of dual-tone multi-frequency (DTMF) digits (blocks 118, 119 and 120). Priority of the outgoing call is based on a default priority that is determined by the subscriber service and the DTMF digits. For example, the majority of the calls can be high traffic, low priority (HTLP) calls, except for emergency service calls such as "911" calls which receive the highest priority by the NIU 28. As indicated in blocks 122 and 124, the NIU assumes that the call is a high priority call, unless the collected digits indicate otherwise. The NIU 28 transmits a CMD_CHANGE_CALL_PRIORITY command to the RBU 26 (block 126). Based on the priority indicated by the NIU (block 128), the RBU 26 can proceed with call tear-down, as described below in connection with FIG. 9, or continue to operate in conjunction with the CPE 32 for the duration of the call (blocks 130 and 132). Meanwhile, the NIU 28 is in a call-in-progress state (block 134).

Figure 7:
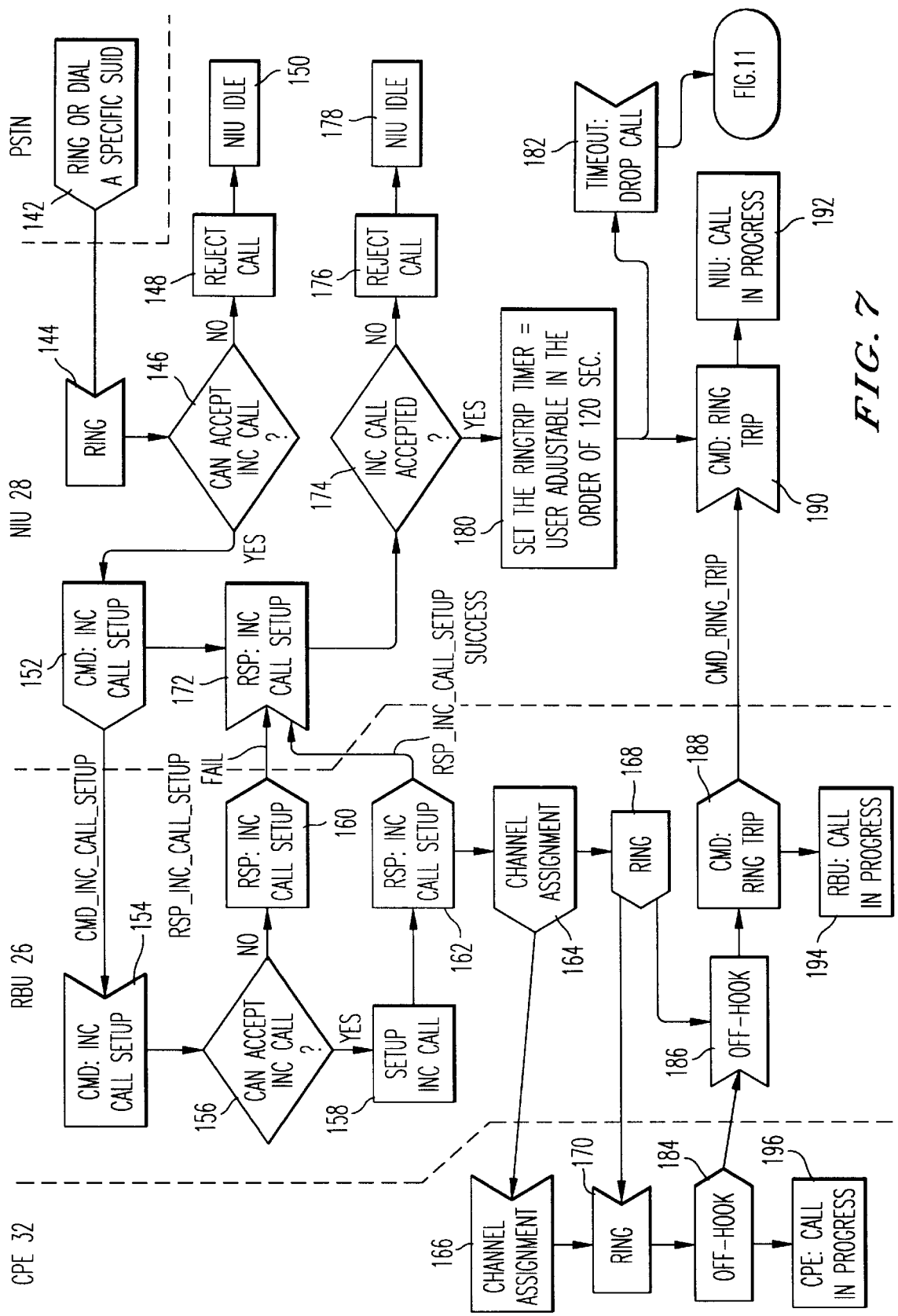

Incoming call processing will now be described with reference to FIG. 7. The NIU 28 receives a ring signal and determines whether or not it can accept the incoming call (blocks 132, 144 and 146). If it cannot, the NIU 28 rejects the call and enters an idle state (blocks 148 and 150). If the call is accepted, the NIU 28 transmits a CMD_INC_CALL_SETUP command to the RBU 26 (block 152). The RBU 26, in turn, prepares to process an incoming call (blocks 154, 156 and 158). The RBU 26 transmits a RSP CMD_INC_CALL_SETUP response signal to the NIU 28 indicating via one or more of its bits whether or not it has failed or succeeded in preparing for the incoming call (blocks 160 and 162). The RBU 26 also transmits a ring signal to the CPE 32 (blocks 168 and 170). Thus, in contrast with existing AN-LE link protocols, channel assignment occurs at the RBU 26 and not at the local exchange or NIU 28. The NIU 28 receives the RSP CMD_INC_CALL_SETUP response signal (block 172) and proceeds to reject the call if the NIU fails to accept the incoming call (block 174, 176 and 178); otherwise, the NIU sets a ring-trip timer (block 180). The NIU 28 terminates the call in accordance with the flowchart depicted in FIG. 11 if a CMD_RING_TRIP_command is not received from the RBU 26 within a predetermined period of time (block 182). After the CPE 32 goes off-hook (block 184) and notifies the RBU 26 of its off-hook condition (block 186), the RBU 26 transmits a CMD_RING_TRIP_command to the NIU 28 (blocks 188 and 190). After the command signal is received, the NIU 28 processes the call in progress, along with the RBU 26 and CPE 32 (blocks 192, 194 and 196).

The RBU 26 responds by locating a time slot on an AN-LE link 30 for the call (block 164). The response signal from the RBU 26 is sent to the NIU 28, but not necessarily over the same AN-LE link over which the command was sent. Alternately, the response signal can be sent via a common control serial connection. The RSP_INC_CALL_SETUP message is sent over the E1 link on which the call is assigned by the RBU 26 and comprises the time slot of the call unless a fail status condition is being transmitted. The CPE 32 is also notified of the channel assignment by the RBU 26 (block 166).

Figure 8:
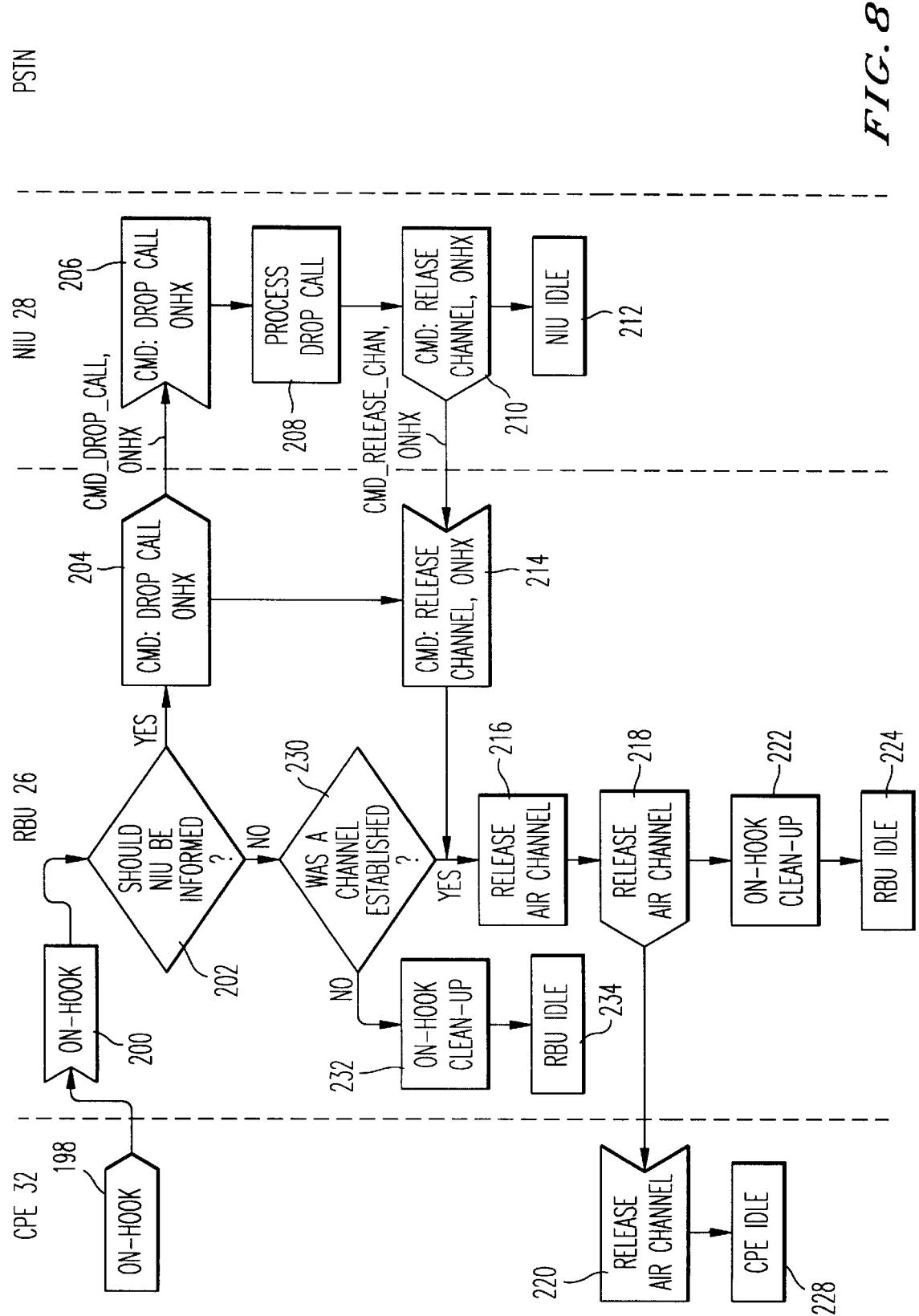

With reference to FIG. 8, the RBU 26 determines whether or not the NIU 28 should be informed of an on-hook condition during call termination (blocks 198, 200 and 202). The NIU 28 does not need to know about a CPE 32 on-hook event when, for example, a CPE 32 goes on-hook while waiting for an air channel to make an outgoing call to the RBU 26. If this is not the case, the RBU 26 generates a CMD_DROP_CALL command for the NIU 28 (block 204). The NIU 28, in turn, releases the channel assigned by the RBU 26 (blocks 206 and 208) and generates a CMD_RELEASE_CHAN command for the RBU 26 (block 210) prior to entering an idle state (block 212). The RBU 26, in turn, releases the air channel (blocks 214 and 216) and transmits a command for the CPE 32 to do the same (blocks 218 and 220). The RBU 26 undergoes an on-hook clean-up process prior to entering in an idle state (blocks 222 and 224) along with the CPE 32 after it has released the air channel (block 228). If the NIU 28 need not be informed of the on-hook condition and no air channel was established (250), then the RBU 26 performs an on-hook clean-up routine before entering an idle state (blocks 232 and 234).

Figure 9:
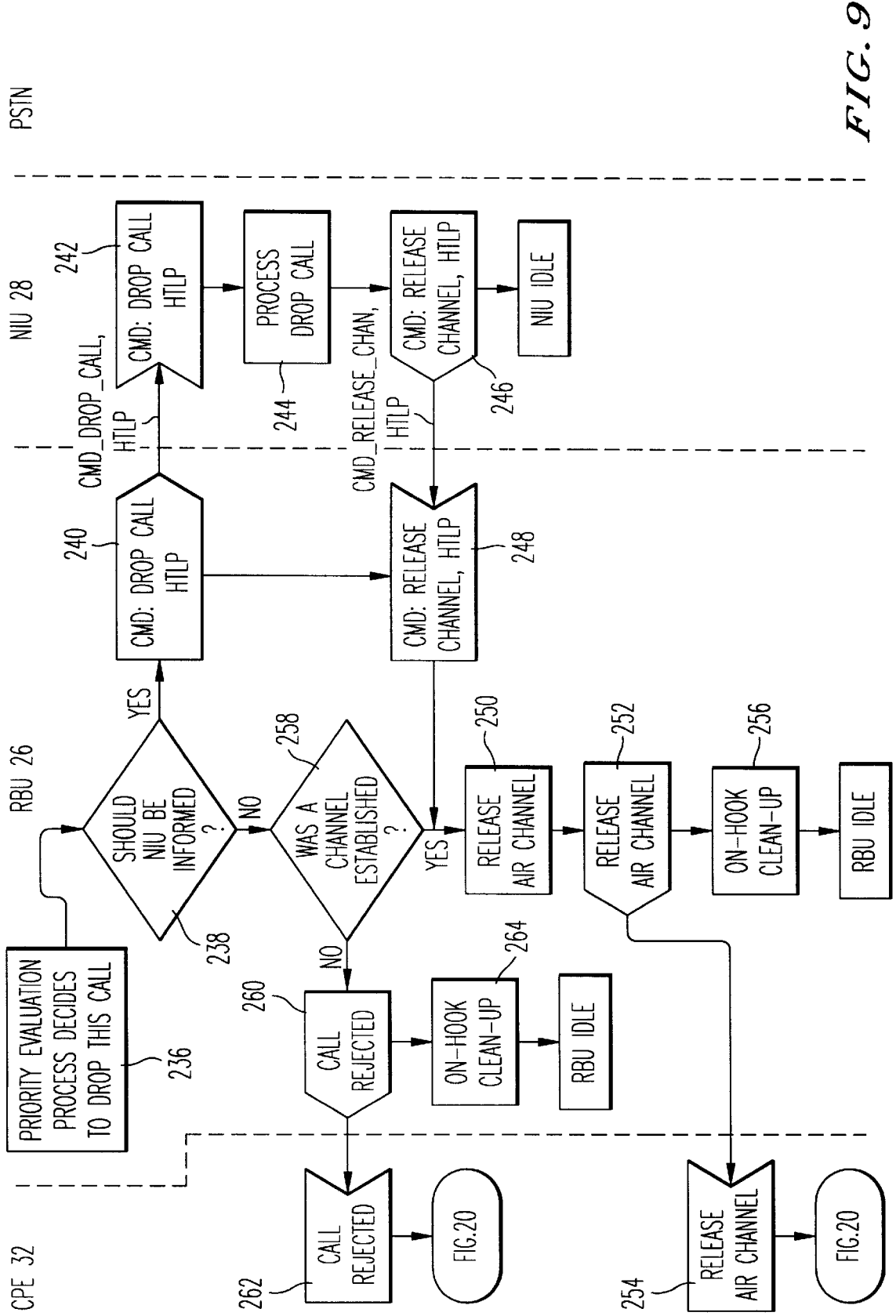

The process for tearing-down a telephone call following a priority evaluation (block 236) by the RBU 26 is illustrated in FIG. 9. The RBU 26 determines whether or not the NIU needs to be informed of the call tear-down process (block 238). As stated previously, there are instances when the NIU 28 does not need to know about an on-hook event from the CPE 32, or a decision by the RBU 26 to tear-down a call which has not yet been coordinated with the NIU 28. If the call has involved some form of handshaking with the NIU 28 (e.g., the transmission of a CMD_OTG_CALL_SETUP command) then the RBU 26 proceeds to send a CMD_DROP_CALL command to the NIU 28 (blocks 240 and 242). The command preferably comprises a field for indicating that the call is being dropped due to a priority evaluation, as opposed to an on-hook condition, for example. The NIU 28 undergoes a process for dropping the call (block 244) and subsequently transmits a CMD_RELEASE_CHAN command to the RBU 26 (blocks 246 and 248). This command also has a field specifying the reason for the command, such as an on-hook condition. Upon receipt of this command, the RBU 26 proceeds to release the air channel (block 250) and to notify the CPE 32 of the same (blocks 252 and 254) before undergoing an on-hook clean-up process (block 256). If the NIU 28 need not be informed of a call being dropped by the RBU, the RBU 26 determines whether or not an air channel was established with the CPE 32 (block 258). If not, the RBU 26 transmits a call rejected signal to the CPE 32 (blocks 260 and 262) before undergoing an on-hook clean-up process (block 264). After the CPE 32 receives a call reject command or a release air channel command, it undergoes the process described below in connection with FIG. 20.

Figure 10:
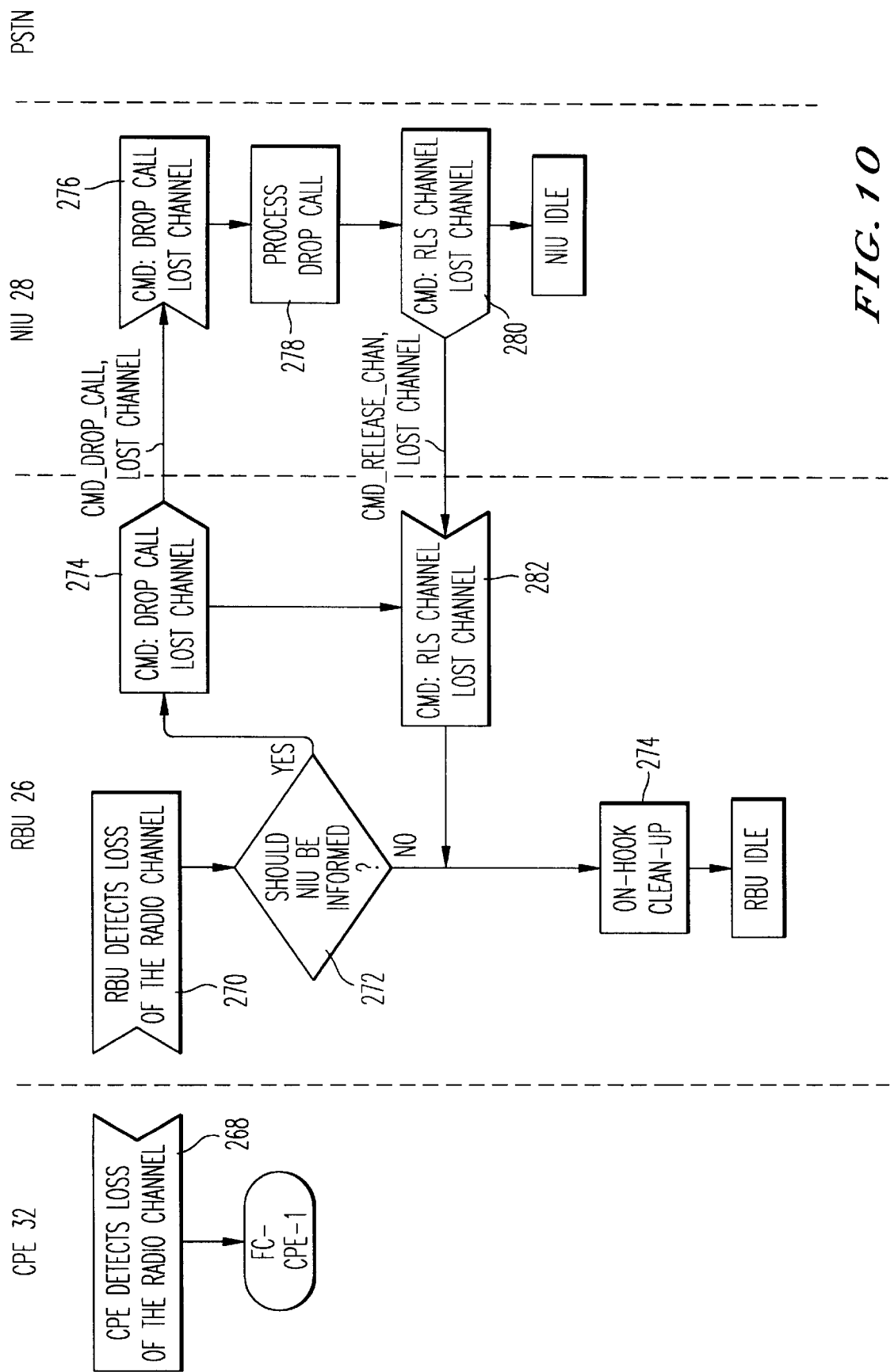

Call tear-down can also result upon detection of loss of a channel, as illustrated in FIG. 10. For example, if the CPE 32 detects loss of the radio link with the RBU 26 (block 268), it undergoes the process described in connection with FIG. 20. If the RBU 26 detects the loss of a radio channel (block 270), it determines whether or not the NIU 28 should be informed (block 272). If the loss of channel occurred while the CPE 32 was waiting for a channel on an AN-LE link 30 to make an outgoing call, then the NIU 28 need not be informed. Accordingly, the RBU 26 can proceed with an on-hook clean-up process (block 274). The RBU 26 otherwise sends a CMD_DROP_CALL command (block 276) having bits for indicating a lost channel condition to the NIU 28. The NIU 28 terminates the call (block 278) before transmitting a command to the RBU 2628 to release the channel (blocks 280 and 282). The RBU 2628, in turn, undergoes the on-hook clean-up process (block 294) and plays tones at the CPE 32 as needed.

Figure 11:
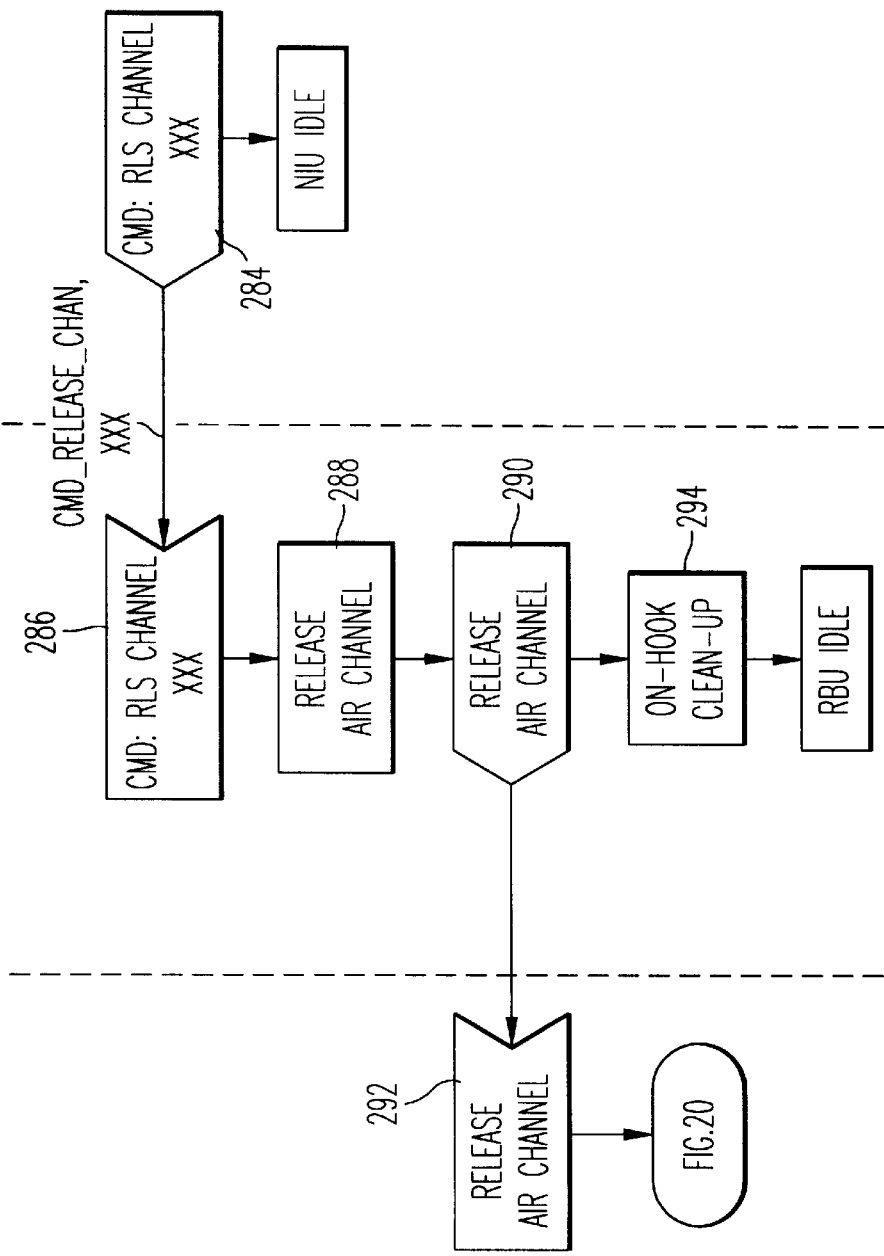

As shown in FIG. 11, the NIU 28 can initiate a call tear-down process if, for example, it receives an on-hook signal from the PSTN, or a partial dial signal, or a ring-trip time-out signal. The NIU 28 transmits a CMD_RELEASE_CHAN command to release the channel AN-LE on the link 30 (block 288) to the RBU 26 (blocks 284 and 286). The RBU 26, in turn, releases the air channel and notifies the CPE 32 of having done so (blocks 290 and 292). The CPE 32 undergoes the process described in connection with FIG. 20 while the RBU 26 undergoes an on-hook clean-up process (block 294).

Figure 12:
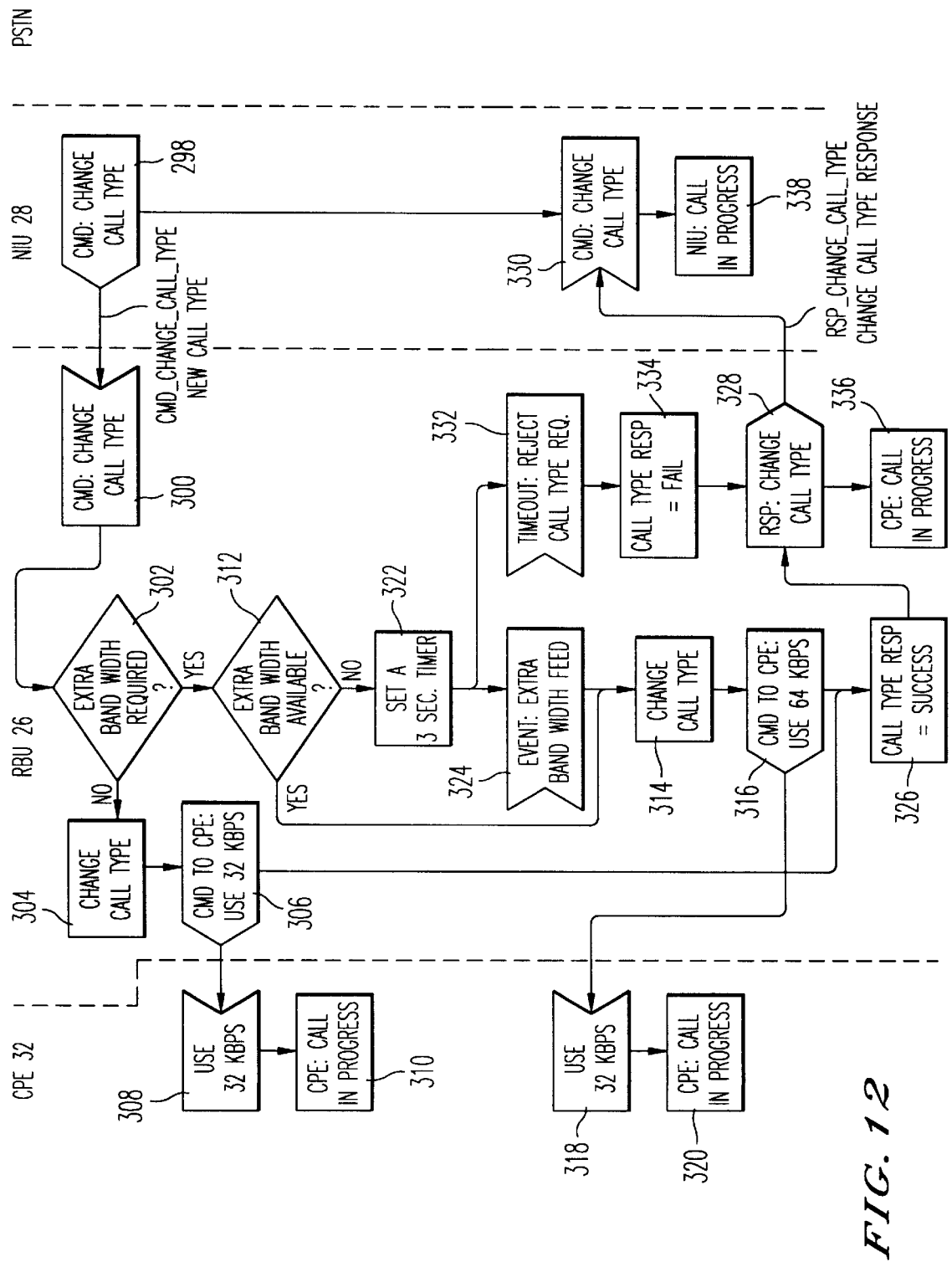
Figure 13:
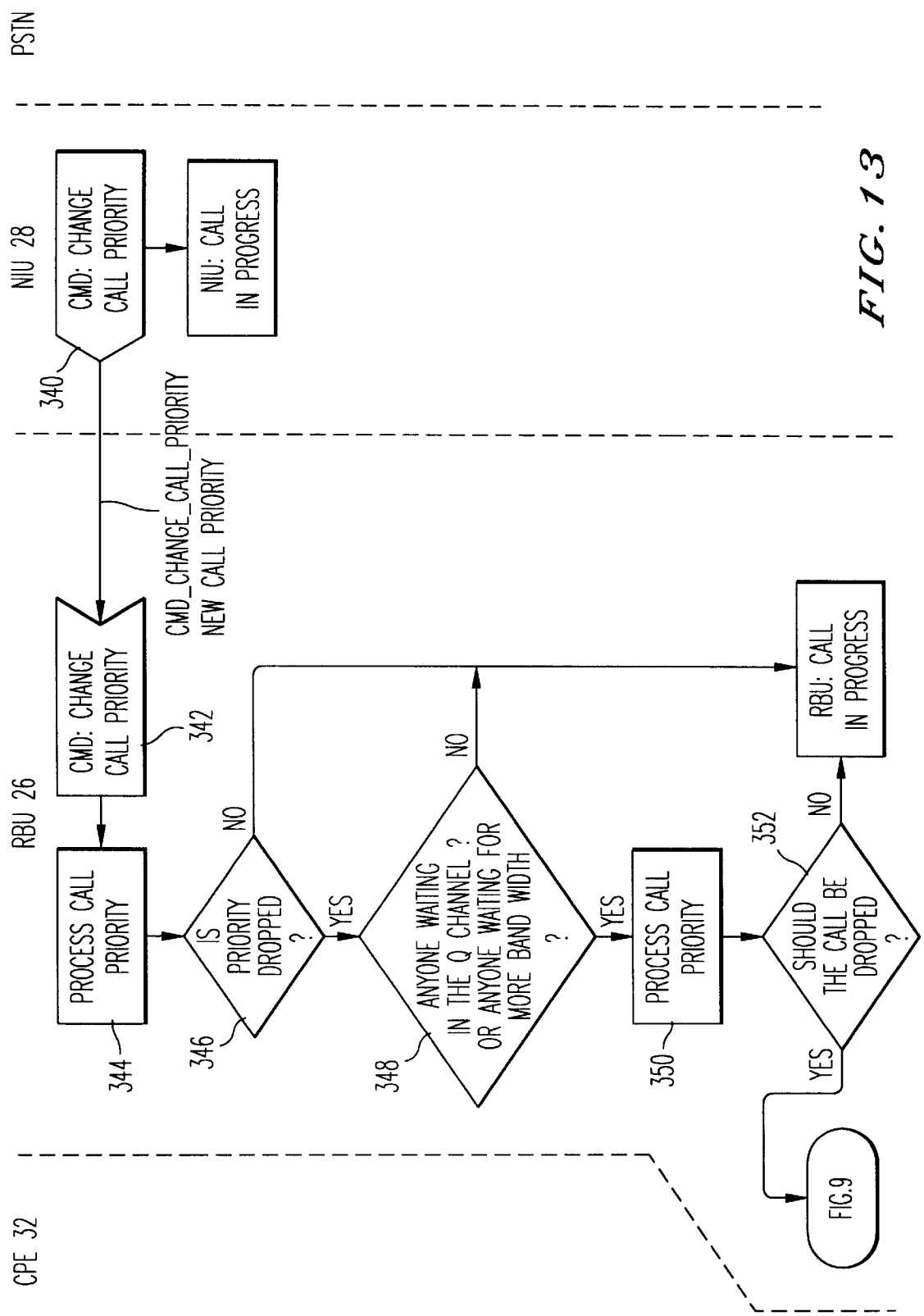

With reference to FIG. 12, the NIU 28 can transmit a CMD_CALL_TYPE command to the RBU 26 if the NIU detects a data call-type tone from the PSTN or RBU (blocks 298 and 300). The RBU 26 proceeds to determine whether or not extra bandwidth is required based on call-type information provided in the CMD_CALL_TYPE command (block 302). If extra bandwidth is not required, the RBU 26 transmits a command to the CPE 32 (blocks 304 and 306) to commence call processing using a 32 kbps rate, as opposed to a 64 kbps rate, in a E-1 based system (blocks 308 and 310). It is to be understood that these bandwidths are for illustrative purposes only and that other bandwidths can be used to process different call-types in accordance with the present invention. If the RBU 26 determines that extra bandwidth is required and is available (block 312), the RBU 26 proceeds to change the call-type (block 314) by sending a command to the CPE 32 (blocks 316 and 318) to use a 64 kbps rate (block 320). If extra bandwidth is not available, the RBU 26 sets a timer (block 322). If extra bandwidth is made available before the timer times out (block 324), then the RBU 26 changes call-type by commanding the CPE 32 to use a 64 kbps rate (blocks 314 and 316). The RBU 26 then transmits a RSP_CHG_CALL_TYPE response signal to the NIU 28 indicating that the change of call type was successful (blocks 326, 328 and 330). If the timer times out before the required bandwidth is available (block 332), the RBU 26 transmits a response signal to the NIU indicating that the change of call type was a failure (blocks 334, 328 and 330). The RBU and the NIU proceed to process the call in progress (blocks 336 and 338).

Figure 15:
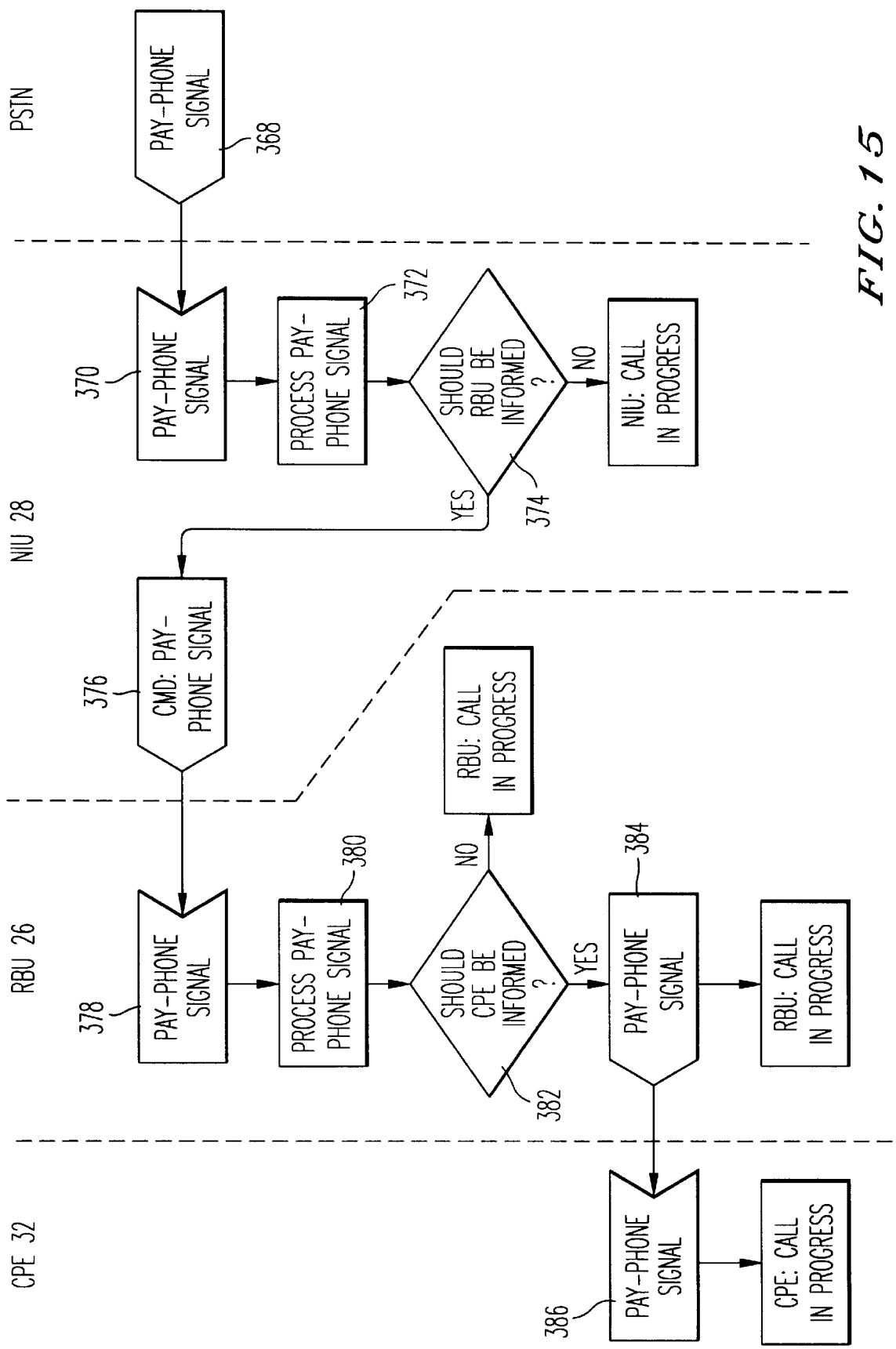

The NIU 28 can also send a command to the RBU 26 to change the call priority, as illustrated in FIG. 15. The RBU 26 assumes that a call is high priority unless it is instructed otherwise by the NIU 28. The RBU 26 therefore responds by changing to the new priority (blocks 340 and 342) specified in the NIU command. If the new priority is a lower priority (block 246), then the RBU 26 determines whether or not more bandwidth is desired for a different call with higher priority or whether a CPE has been waiting in a queue for an available air channel (block 346). A call that has been placed in a queue is preferably considered a high priority call by default. If so, the RBU 26 proceeds to process call priority and to determine whether the call should be dropped (blocks 348, 350 and 352), that is, whether or not there is a call in the queue or there is a call with higher priority requiring additional bandwidth and the current call has the lowest priority. If the current telephone call should be dropped, then the RBU 26 proceeds to operate in accordance with the procedure illustrated in FIG. 9.

Figure 14:
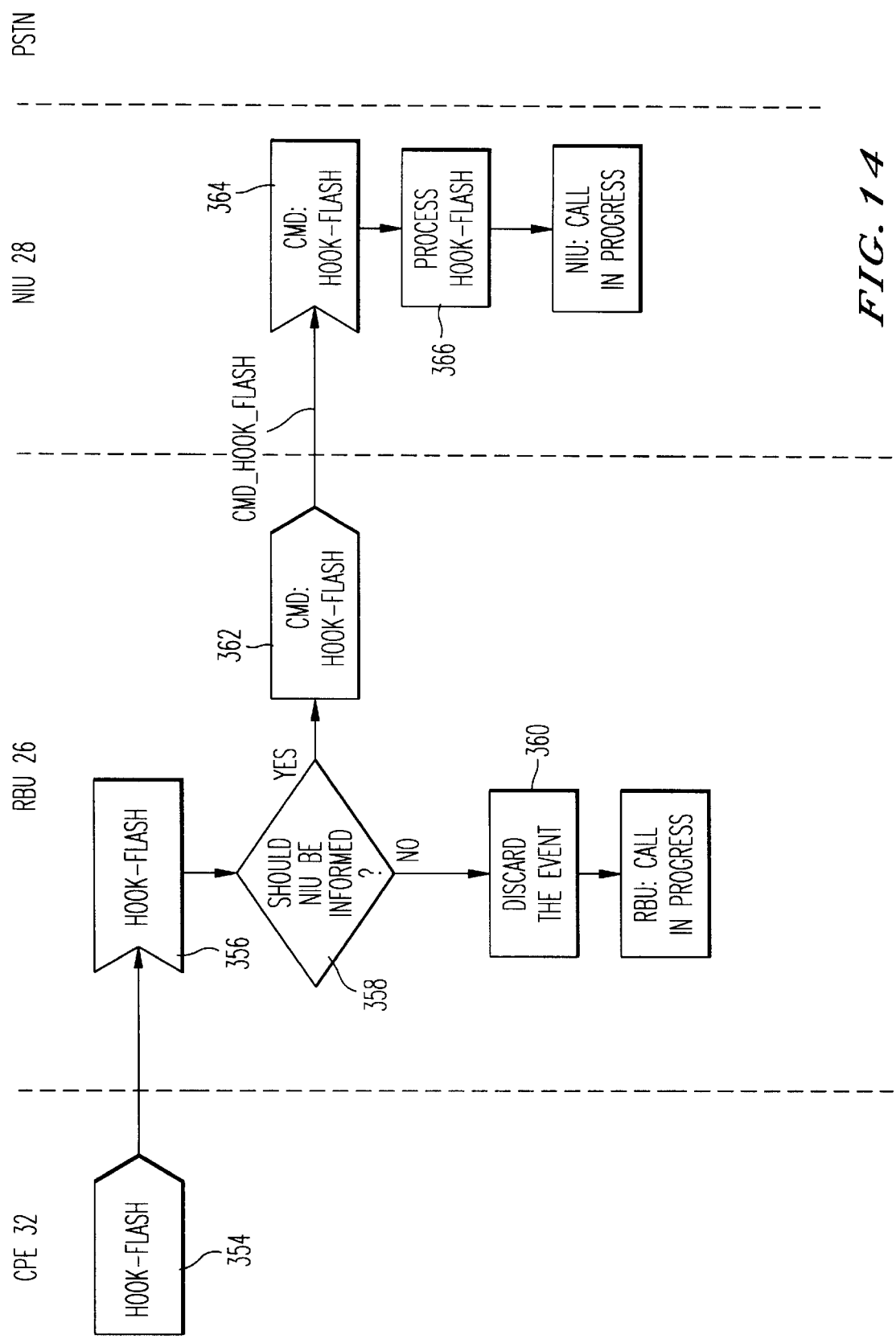

With reference to FIG. 14, the CPE 32 notifies the RBU 26 when a hook-flash event occurs (blocks 354 and 356). The RBU 26 decides whether or not the NIU 28 should be informed of the event (block 358). As stated previously, there are instances when the NIU 28 does not need to know whether a hook-flash event has occurred, such as when the CPE 32 hook flashes while waiting for a channel on an AN-LE link 30 to make an outgoing call. If this is so, the RBU 26 discards the event (block 360); otherwise, the RBU 26 sends a CMD_HOOK_FLASH command to the NIU 28 (block 362). The NIU 28 proceeds to process the hook-flash (blocks 364 and 366), while the NIU 28 proceeds to give a dial tone to the CPE 32 that is off-hook.

With reference to FIG. 15, the NIU 28 is programmed to detect a pay telephone signal transmitted from the PSTN (blocks 368 and 370) and to determine whether or not the RBU 26 should be informed (blocks 372 and 374). For example, the RBU 26 need not be informed if no channel on an AN-LE link 30 has been assigned by the RBU 26 for the incoming call from the pay telephone. If so, the NIU 28 transmits a PAYPHONE_SIGNAL command to the RBU 26 (block 376). The RBU, in turn, forwards the PAYPHONE_SIGNAL to the CPE 32 (blocks 384 and 386) following a determination that the CPE 32 should be informed (blocks 378, 380 and 382). The CPE 32 need not be informed, for example, when no air channel has been established with the RBU 26.

Figure 16A:
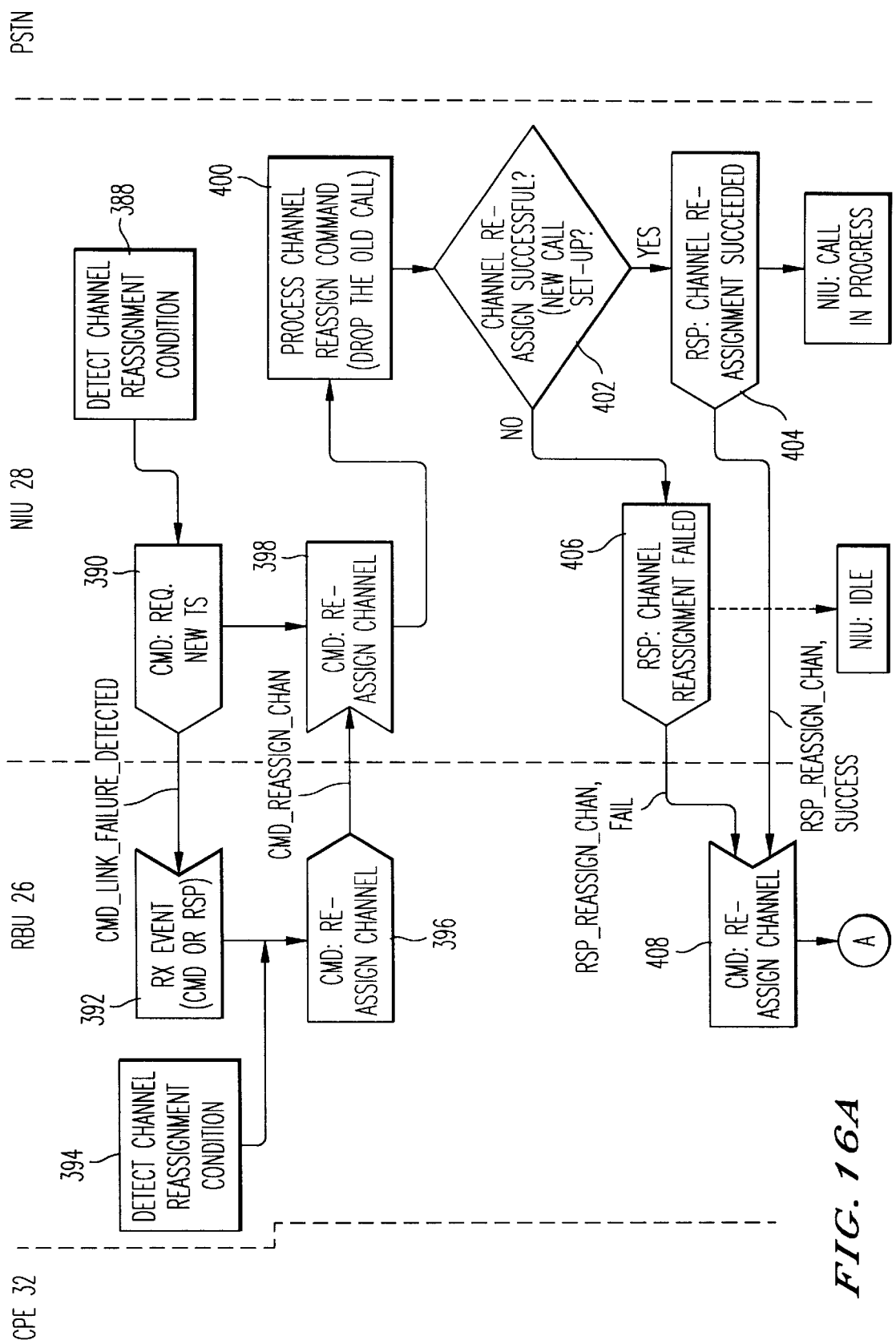
Figure 16B:
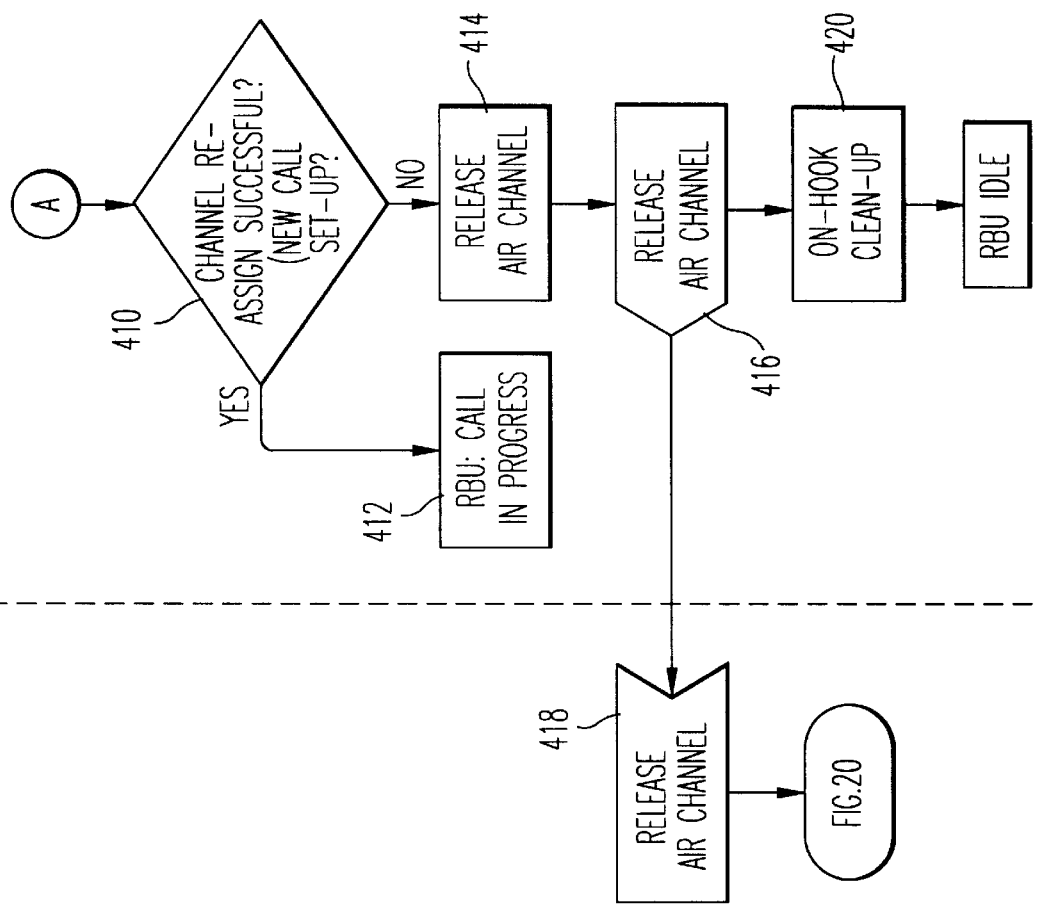
Figure 17:
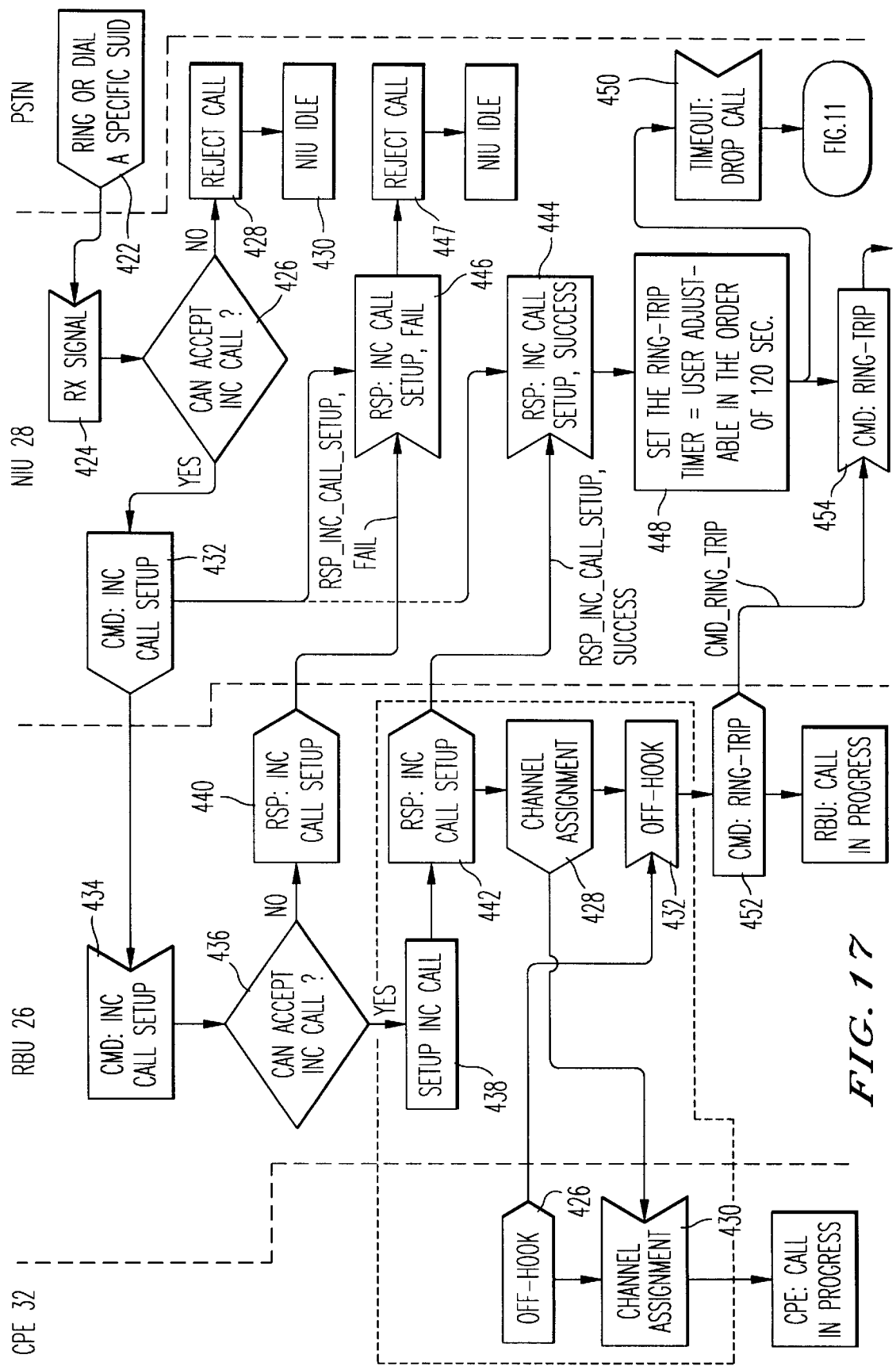

In accordance with the present invention, the protocol permits the RBU 26 to perform channel reassignment among the AN-LE links 30. With reference to FIGS. 16A and 16B if the NIU 28 detects a channel reassignment condition such as a link failure (block 388) and additional control links are available between the RBU and NIU, the NIU transmits a CMD_LINK_FAIL command to the RBU 26 (blocks 390 and 392). Alternatively, the RBU 26 can detect a channel assignment condition such as a number of packets being unsuccessfully transmitted from the NIU 28, as described below in connection with the link layer 60 of the AN-LE interface protocol of the present invention. The RBU 26 responds by locating another AN-LE link channel to which the call in progress can be moved. The RBU 26 sends a command to reassign a channel to the NIU 28 comprising the new time slot for the call on the AN-LE link (blocks 396 and 398), as well as the previous time slot for the call and a link identification number for the previous channel. The NIU 28 responds to the reassigned channel command by dropping the call from the previous channel and setting up the call on the newly assigned channel (block 400). If the reassignment is successful, the NIU 28 indicates the same to the RBU 26 via a RSP_REASSIGN_CHAN response signal which contains bits to indicate success (blocks 402 and 404). If the reassignment is not successful, a response signal is sent to the RBU indicating failure (block 406). If the RBU 26 receives a success response signal (blocks 408 and 410), it continues to process the call in progress (block 412); otherwise, the RBU 26 releases the air channel (block 414), instructs the CPE 32 to do likewise (blocks 416 and 418), and begins an on-hook clean-up process (block 420).

The AN-LE interface protocol of the present invention is advantageous because it allows call flow exceptions to be processed, whereas the calls would be rejected or terminated using existing protocols. A call flow exception is a condition in which a call is interrupted or otherwise adversely affected by a problem such as a priority or timing conflict, a broadcast or wireline signal interference, among other conditions. Calls involved in a call flow exception are processed in ways that result in a minimal rejection rate in accordance with the present invention. While the rejection rate is minimized, some calls can be rejected due to physical constraints and limitations associated with some interfaces on the PSTN side, such as loop start trunks. Loop start trunks provide a single point of contact for each subscriber and the NIU 28 which is helpful when resolving some call flow exceptions. As will be described below, the AN-LE interface protocol of the present invention allows for processing exceptions in digital and analog modes differently.

Call flow exception or glare conditions occur due to the multiple points of control along the path of the call. As stated previously, the AN-LE interface protocol of the present invention operates in a system wherein the RBU 26 and CPE 32 are programmed to handle a number of call processing issues, as opposed to requiring the NIU 28 to handle all of the call processing, as does the LE in a V5 or other existing protocol-based system. For example, a subscriber can go off-hook on a telephone 32 (blocks 426, 422, 430 and 432) to make an outgoing call while an incoming call is being processed simultaneously in the PSTN for that particular subscriber (blocks 422 and 424). The processing of the incoming call, as illustrated in (blocks 426, 428, 430, 432, 434, 436, 438, 440, 442, 444, 446, 447, 448 and 450 in FIG. 7, is substantially the same as that described above in connection with FIG. 7. Thus, a glare condition appears somewhere along the path that cannot be avoided. The protocol of the present invention provides resolution to this glare condition between the CPE and the RBU in favor of the incoming call. The RBU 26 therefore sends a ring-trip signal (block 452) to the NIU 28 (block 454) upon reception of an off-hook signal from the CPE 32. As stated previously, the protocol of the present invention differs from existing protocols in that the off-hook signaling was not transmitted to the NIU 28. Instead, the CPE 32 processed the event to determine that an off-hook condition was present and the RBU, in turn, processed the off-hook condition to determine that a ring-trip signal was necessary at the NIU 28.

Figure 18:
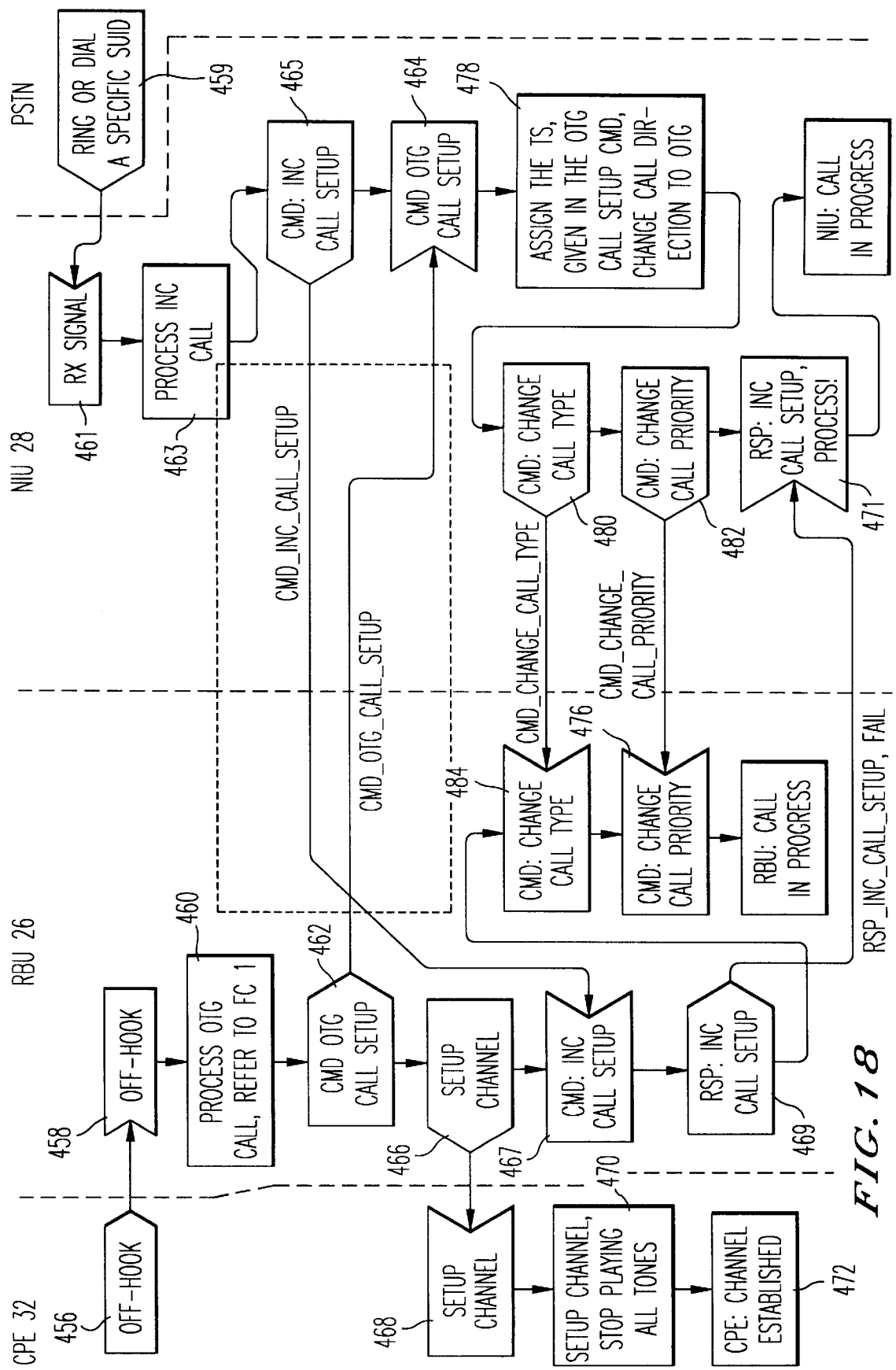

A glare condition can also occur between the RBU and the NIU, that is, the RBU transmits a CMD_OTG_CALL_SETUP command at the same time the NIU transmits a CMD_INC_CALL_SETUP command, as shown in FIG. 18. The outgoing call processing illustrated in blocks 456, 458, 462, 466, 468, 470, 472 and 476 is substantially equivalent to that described above in connection with FIG. 6. Meanwhile, the incoming call processing, illustrated in (blocks 459, 461, 463, 465, 467, 469 and 471 is substantially equivalent to that described above in connection with FIG. 7. The RBU, however, preferably rejects the incoming call (block 469) and proceeds to process the outgoing call in accordance with the present invention. The NIU, on the other hand, processes the outgoing call differently, depending on whether it is an analog or digital system. In an analog system, the outgoing call is connected to the incoming call (block 470). That is, the subscriber is connected to a calling party instead of receiving a dial tone. The NIU 28 processes the outgoing call as an incoming call by transmitting change call type and change call priority commands (blocks 480, 482 and 484) to the RBU 26, as described above in connection with FIGS. 12 and 13. In a digital system, the outgoing call is processed by the NIU 28 on one of the available channels, and the NIU 28 rejects the incoming call from the PSTN. The present call is therefore treated as an outgoing call in the manner described above in connection with FIG. 6.

Figure 19:
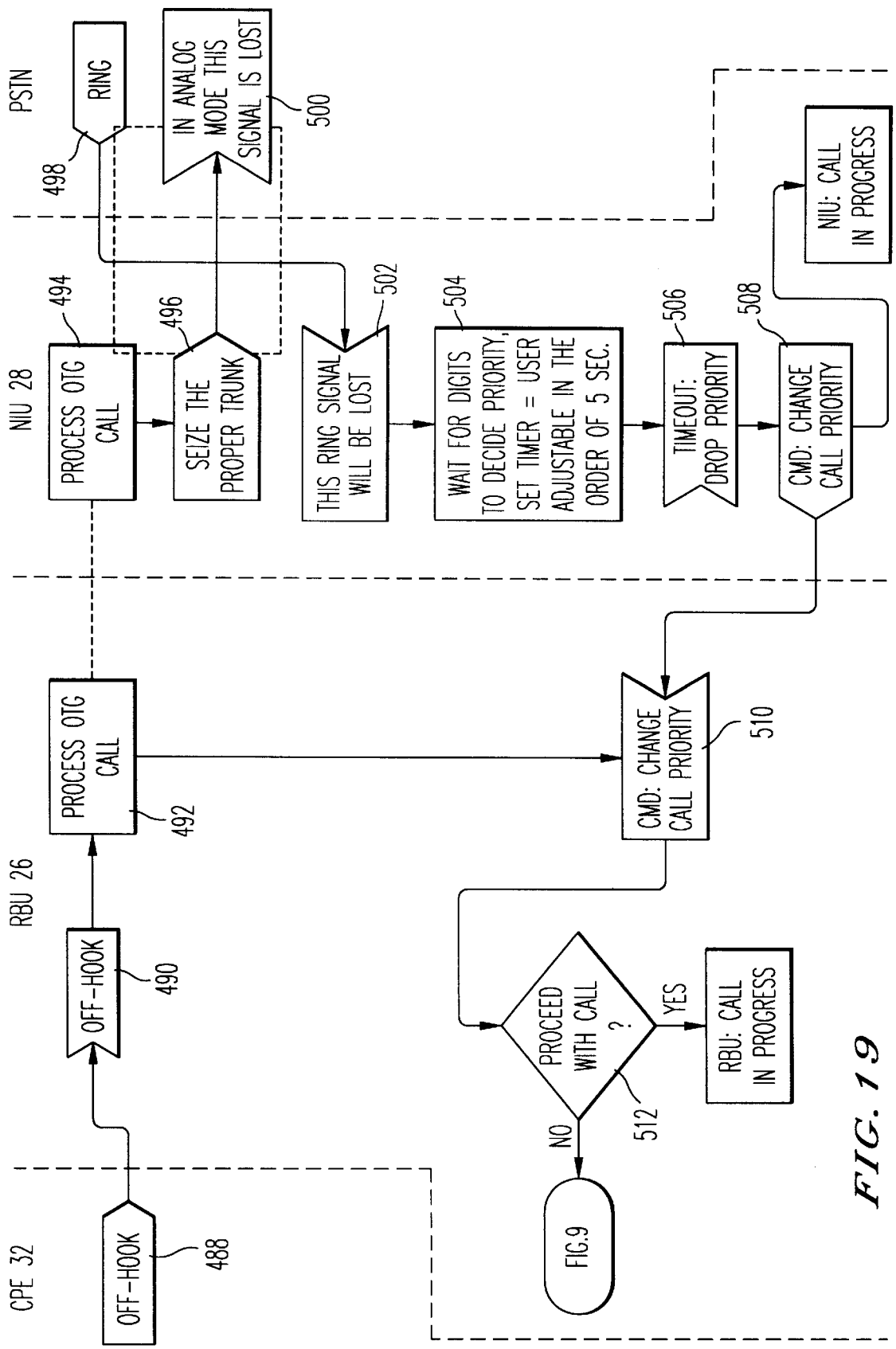
Figure 20:
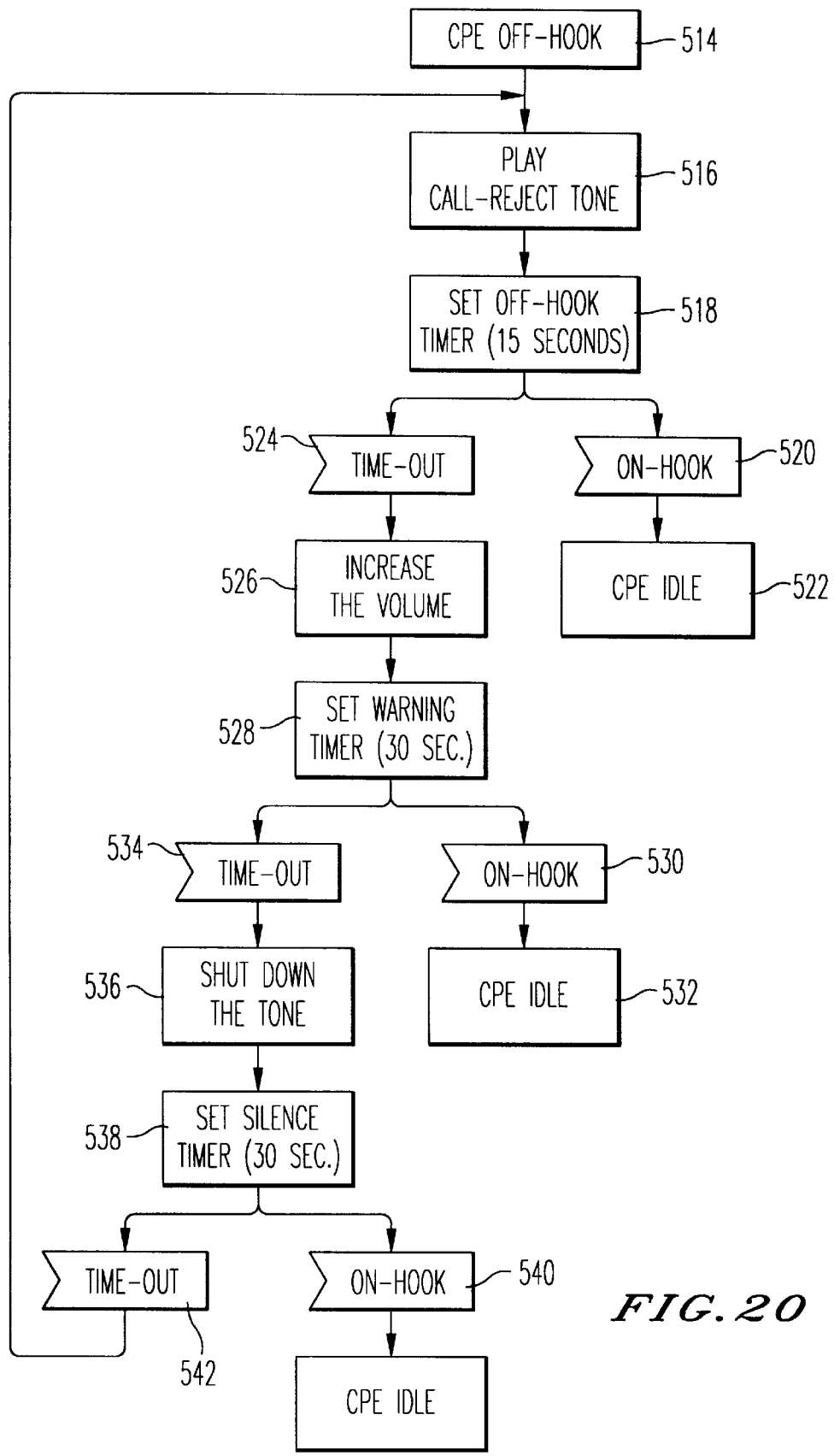

With reference to FIG. 19, a glare condition can occur between the NIU 28 and the PSTN, that is, when the NIU 28 is about to process an outgoing call (blocks 488, 490, 492, 494 and 496), but it receives an incoming call request from the PSTN (block 498). Call processing of the outgoing call illustrated by blocks 488, 490, 492, 494 and 496 is described with reference to FIG. 6. This glare condition, in which the outgoing call is favored, is also treated differently, depending on whether an analog or digital system is in use. The signals for ringing the NIU and seizing the trunk are lost (blocks 500 and 502). In an analog system, the outgoing call is connected to the incoming call. The subscriber is therefore connected to a calling party instead of a dial tone. Accordingly, the NIU 28 processes the call as an outgoing call (block 504) and, upon termination of a priority assigning timer (block 506), the NIU 28 provides the default call priority of a call to the RBU (blocks 508 and 512). In a digital system, the outgoing call is processed on one of the E1 channels ports on the NIU 28. The NIU 28 therefore rejects the incoming call from the PSTN. In an analog system, the NIU 28 leaves the loop start trunk unanswered. The PSTN equipment is thereby given an indication that the designation CPE 32 is not answering the call when, in fact, the CPE 32 never actually received a call. In a digital system, the NIU 28 rejects the call using a congestion signal transmitted back to the PSTN.

Most call flow exceptions are handled by the RBU 26 or CPE 32. One exception, however, occurs when a subscriber does not hang up at the end of a call (block 514). As shown in FIG. 20, the CPE 32 plays a call reject tone and sets a Call_Reject_Tone timer or Set_Off-Hook timer (blocks 516 and 518). If the CPE 32 detects an on-hook condition (block 520), it enters an idle state (block 522); otherwise, the CPE 32 increases the volume of the tone upon time-out (blocks 524 and 56. The CPE 32 also sets an Off-Hook_Warning timer (block 528). If the CPE 32 goes on-hook, then it continues in an idle state (blocks 530 and 532); otherwise, the CPE 32 ceases to play the call reject tone when the warning timer times out and sets a Silence timer (blocks 534, 536 and 538). If the CPE 32 does not go on-hook (block 540) and the Silence timer times out, the CPE 32 continues to play the call reject tone for the subscriber (block 540). Meanwhile, the AN-LE link has already been destroyed for that call if one had been set up by the RBU.

Commands sent between the NIU 28 and RBU 26, as described above in connection with FIGS. 6–20, preferably require responses within a predefined period of time. Although a reliable communication link is implemented between the NIU 28 and RBU, both devices are able to process worst-case scenarios when a message is lost or delayed in accordance with the present invention. Each message requiring a response causes the NIU 28 or RBU 26 to set a timer during which a reply should be received. If the reply is not received during that period of time, the RBU 26 or NIU 28 undertake exception handling measures. These measures vary depending on the message being sent. For example, if a OTG_CALL_SETUP command is sent and its corresponding timer expires, the RBU 26 sends a DROP_CALL command to the NIU 28 and a command to reject the call to the CPE 32. If the AN-LE link 30 has gone down, the RBU 26 reassigns the call to a new link, along with other calls. When the time out occurs, a DROP_CALL command is sent on the new link. Expiration of a timer following the command INC_CALL_SETUP causes the NIU 28 to send a release call identification (ID) signal to the RBU. At this time, the NIU 28 cannot reference the incoming call by a link identification number or a time slot number and, therefore, requires use of the call ID. The RBU 26 queries the CPE 32 to request that the CPE 32 stop ringing. If a DROP_CALL command is sent, the link carrying the call is used repeatedly by the RBU 26 until the timer expires, at which time the RBU 26 tries sending the DROP_CALL command on a new link. If a link has gone down, the RBU 26 reassigns the call to a new link, along with other calls. If a link carrying a call related to the command STATUS_QUERY is still operational, the RBU 26 attempts to send the STATUS_QUERY command repeatedly until the timer expires. The command is then transmitted on a new link. If the link was down, the RBU 26 reassigns the call to the new link, along with other calls. The RBU 26 attempts to transmit the command to reassign a channel link a number of times if the link carrying the call related to this command is apparently still operational. When the timer expires, the RBU 26 transmits a DROP_CALL command indicating a lost packet to the NIU 28. The RBU 26 tries the command on a new link and informs the CPE 32 to release the air channel.

In accordance with the present invention, a Ring_Trip timer for incoming calls is implemented in both the RBU 26 and the NIU 28. The timer is most frequently used in the NIU 28 and is preferably the only timer that system operators can change. The RBU 26 and CPE 32 each have a RBU/CPE timer. The RBU/CPE 32 timer stops a ringing CPE 32 in cases where the STOP_RING command from the RBU 26 to the CPE 32, or from the NIU 28 to the RBU, is lost. To reduce the processing required to change the same parameter into different processors, the NIU 28 is programmed to be a master controller under these circumstances. Thus, if the RBU 26 or CPE 32 timer expires, the RBU 26 queries the status of the CPE 32 from the NIU 28. If the NIU 28 indicates that the CPE 32 is still ringing, the RBU 26 or the CPE 32 resets the RBU/CPE 32 timer; otherwise, the RBU 26 stops sending ring signals to the CPE 32 and aborts the call.

With reference to the illustrated example in FIG. 3, the link layer 60 can be implemented using a time slot or channel on each of the four E1s of the AN-LE links 30 and constitute a control channel for that E1. Alternatively, the link layer can consist of a number control channels that are multiplexed as a separate link connected to a serial port on the AN and LE terminals.

As will be described below, loss of one of the E1s does not result in the loss of the control channel. In contrast with the V5 protocols, the other three E1s can be used for common channel signaling without requiring reinitialization or switchover protocol to invoke a backup-control channel or another nonfailed link. The V5.2 protocol permits the implementation of as many as 16 E1s and one, two or three control channels on respective AN-LE links 30. If two or three control channels are used, one of the channels is designated as the primary control channel. If the E1 corresponding to the primary control channel is lost, then a number of administrative operations and handshaking routines must be invoked to switch control to another link and to commence control signaling on the auxiliary control channel. The V5.2 protocol therefore is disadvantageous because it requires additional software and administrative functions. The V5.1 protocol permits only a single E1 with one or more control channels and therefore does not have any provisions for back-up control channels or transfer of calls upon link failure. Thus, the protocol of the present invention is advantageous because it allows for maintenance of control channels and calls following link failure with minimal processing.

Figure 21:
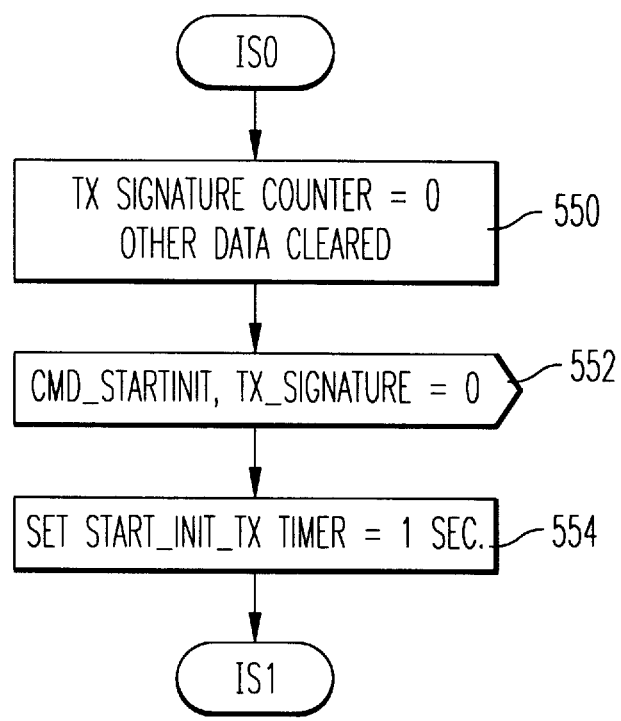
FIGS. 21–24, 25A, 25B, 26A, 26B, 27, 28, 29A, 29B, 29C and 29D are flow charts illustrating sequences of operations performed by the AN and the LE during link layer initialization, multiframe operation, link failure and link recovery states.

Initialization and operation of the link layer 60 of the protocol of the present invention will now be described with reference to FIGS. 21–26 and FIGS. 27–30, respectively. The flowcharts in FIGS. 21–24 apply to both end points of the AN-LE link; however, they are drawn for only one end point for illustrative purposes. The description of FIGS. 21–24 will be with reference to the RBU end point by way of an example, with the understanding that the description also applies to the NIU. Following initialization of each physical AN-LE link 30, the link end points (e.g., the RBU 26 and the NIU 28) each begin to send Cmd_StartInit requests to commence initialization (blocks 550 and 552) to the other end point once every second. A Tx_Signature Counter is incremented upon transmission of each Cmd_StartInit request (block 554), as shown in FIG. 21. Transmission of Cmd_StartInit requests by the link end points 26 and 28 continues indefinitely until an initialization request acknowledge (e.g., Rsp_StartInit) is received. The end points 26 and 28 each enter a second initialization state.

Figure 22:
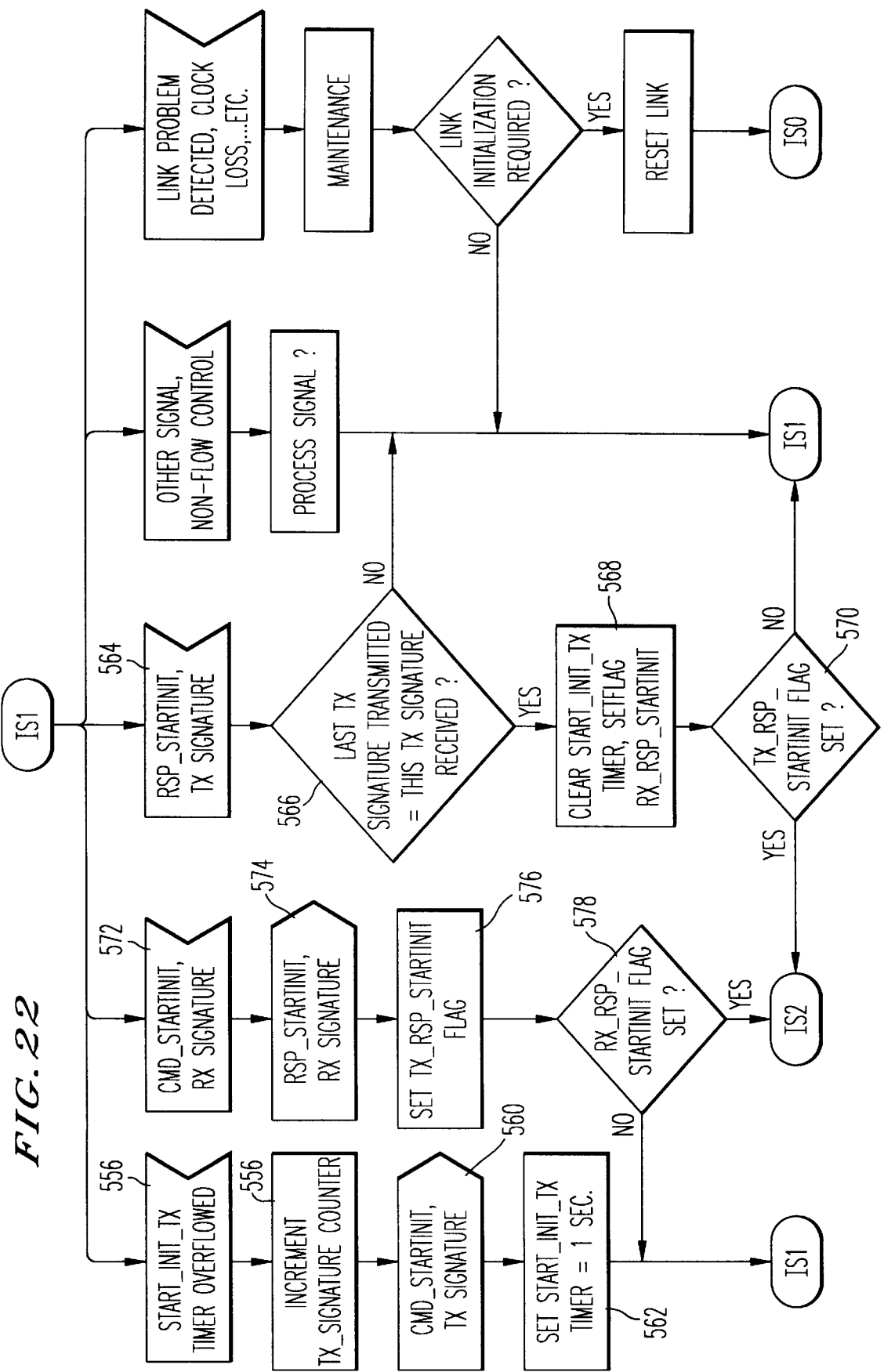

As illustrated in blocks 556, 558, 560 and 562 of FIG. 22, the Tx_Signature Counter is incremented when the StartInit_Tx timer maintained at each end point 26 and 28 expires before receipt of an Rsp_StartInit response message. Another Cmd_StartInit message is therefore retransmitted and the StartInit_Tx timer is reset to a predetermined time, such as one second. The StartInit_Tx timer continues to decrement until it either overflows again, or a Rsp_StartInit message has been received.

As shown in blocks 564, 566, 568 and 570 of FIG. 22, upon receipt of a Rsp_StartInit from the NIU, the RBU is programmed to determine whether the Signature transmitted therewith matches that of the last Signature received. If it does not, then the RBU continues to send Cmd_StartInit commands to the NIU. If the Signature does match, then the StartInit_Tx timer is reset, and a flag Rx_Rsp_StartInit is set. The RBU then determines whether the Tx_Rsp_StartInit flag was set by the NIU, as will be described below with reference to block 576. If it has not, then the RBU continues to wait for an Rsp_StartInit from the NIU; otherwise, the device enters the next initialization state described in connection with FIG. 23 for the NIU and FIG. 24 for the RBU.

While transmitting Cmd_StartInit commands to the NIU or RBU, respectively, each end point RBU or NIU also receives Cmd_StartInit commands from the other end point which contain a Signature (block 572). For example, the NIU both respond with a Rsp_StartInit and with the Signature (block 574). If the Signatures of the last commands from the RBU match, the NIU sets a Tx_Rsp_StartInit flag (block 576). If the Rsp_StartInit flag is set (block 568), then the RBU continues to the next initialization state; otherwise, it continues to exchange Cmd_StartInit requests with the NIU and awaits initialization request acknowledgment (i.e., a Rsp_StartInit message).

Figure 23:
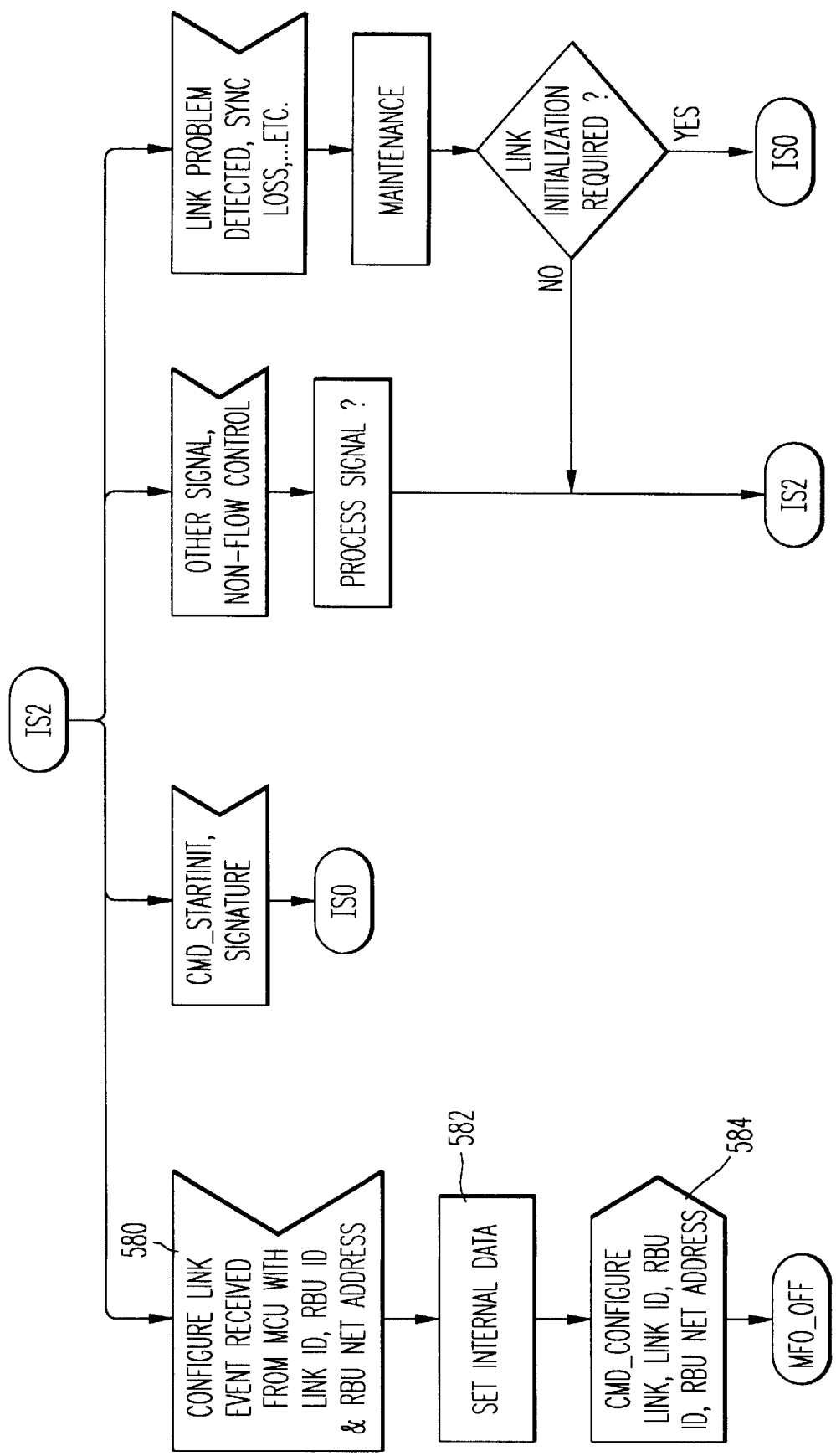

The NIU is programmed to receive a link identification number, an RBU identification number and an RBU address from the MCU 34, as shown in block 580 in FIG. 23. After setting internal data (block 582), the NIU transmits a Cmd_ConfigureLink command to the RBU (block 584) comprising the link identification number, the RBU ID and the RBU address. The NIU subsequently enters the Multi-Frame Operation_Off state described below in connection with FIGS. 25A and 25B.

Figure 24:
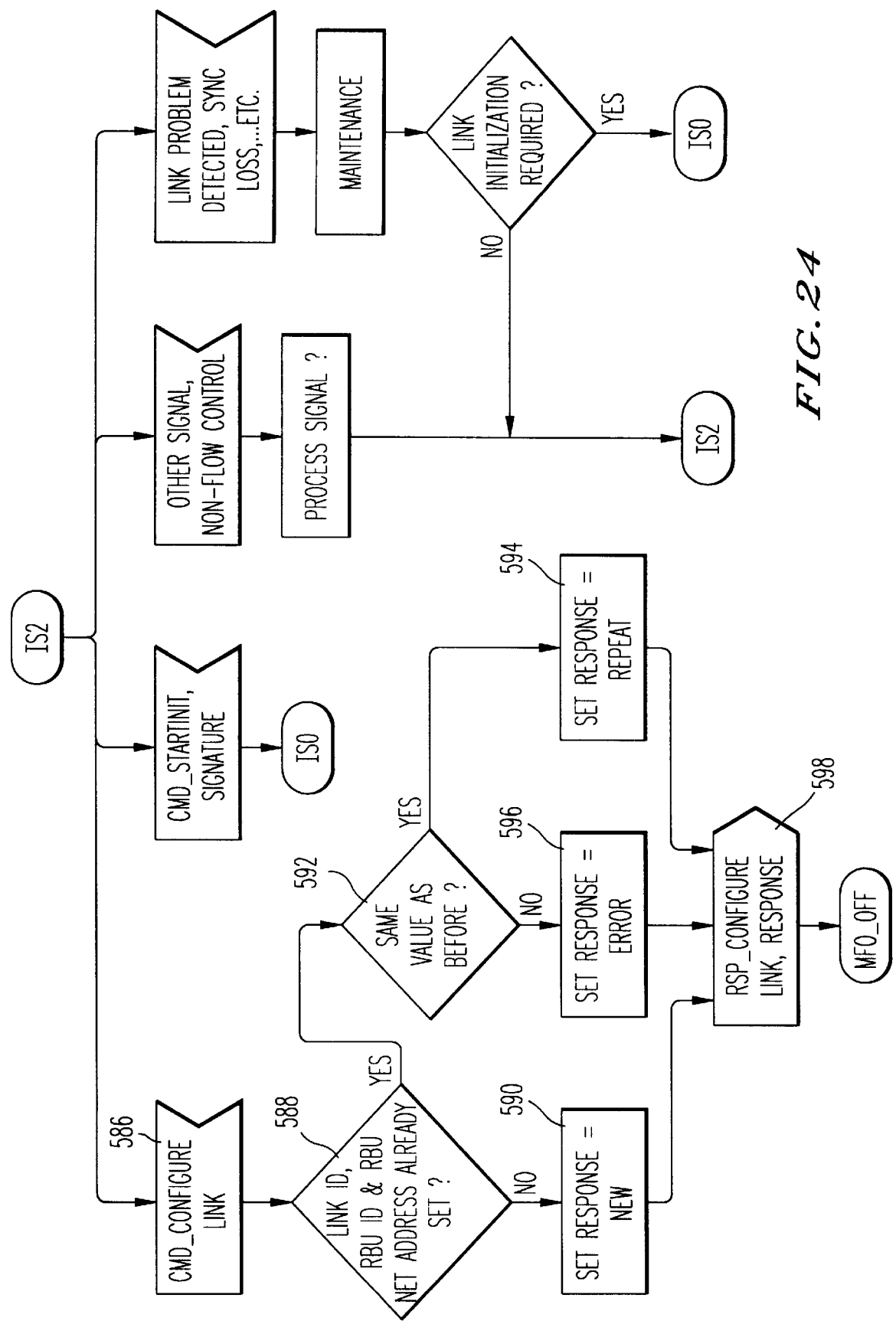

When the initialization request acknowledgment exchange is complete, the RBU awaits the receipt of a Cmd_ConfigureLink, as shown in block 586 in FIG. 24. This command is preferably only sent from the NIU to the RBU after completion of the Cmd_StartInit and Rsp_StartInit exchange. The NIU assigns a two bite identification number to this particular E1, and the RBU proceeds to store that identification numbers, along with information about the RBU itself (e.g., an RBU identification number and address). If the link ID, the RBU ID and the RBU address have not already been set (block 588), the RBU sets a RESPONSE variable to a value corresponding to a NEW condition (block 590). If the link ID, RBU ID and RBU address have already been set and the link ID is the same value as the previously set link ID (block 592), the RBU sets the RESPONSE variable to a value corresponding to REPEAT (block 594). If the link ID is different, then the RBU sets the RESPONSE variable to a value indicating ERROR (block 596). The RBU subsequently transmits an Rsp_ConfigureLink, along with the RESPONSE variable to the NIU (block 590), before entering the Multi-Frame Operation_Off state described below.

Figure 25A:
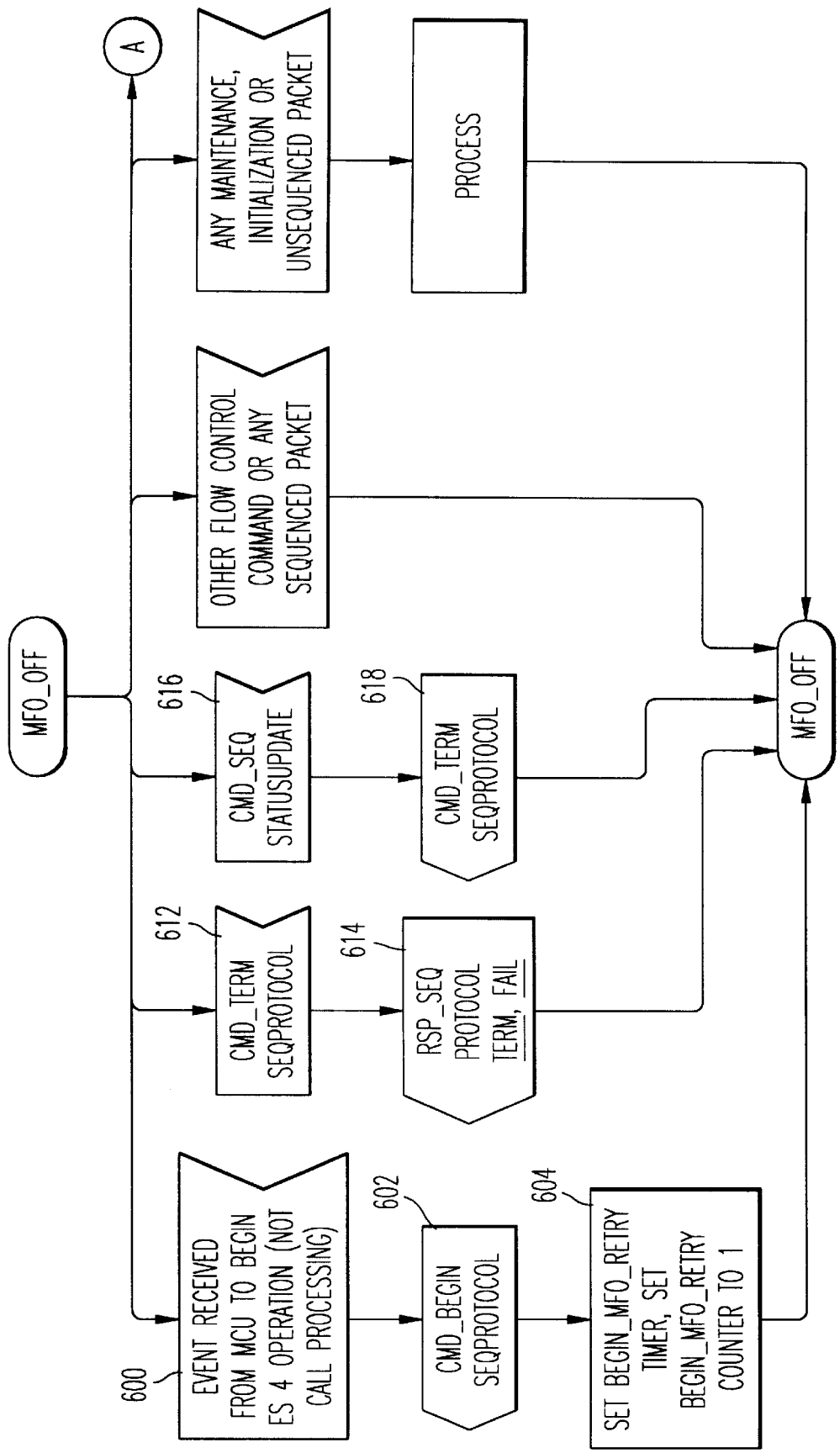
Figure 25B:
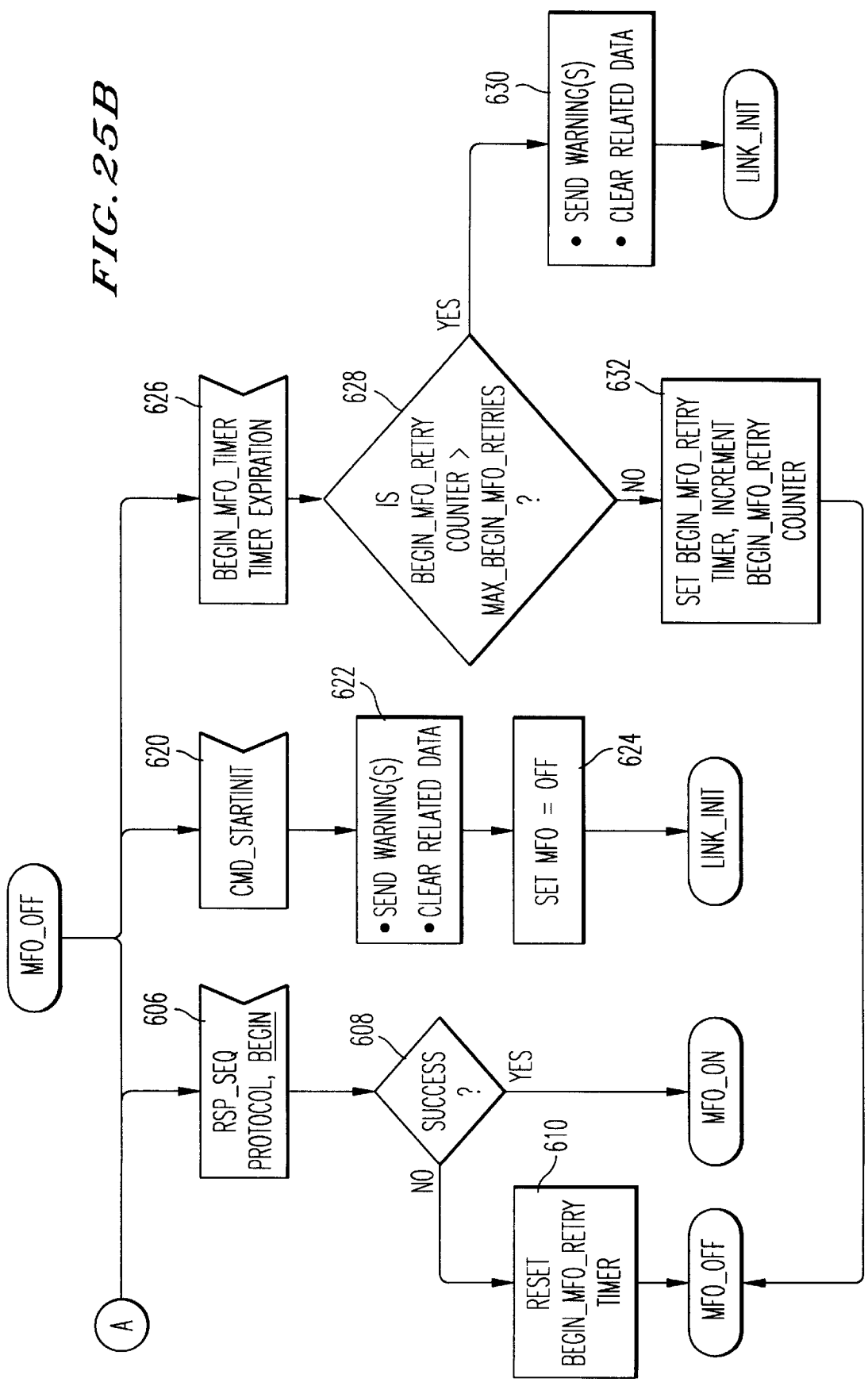

With reference to FIGS. 25A and 25B the NIU awaits receipt of an event from the MCU 34 to begin operation (block 600). The NIU subsequently determines when it is prepared to commence a signaling protocol for the transmission of sequenced messages along an AN-LE 30 link. The NIU transmits the Cmd_BeginSeqProtocol command to the RBU (block 602) to indicate that the NIU is prepared to commence multiple frame operation. Sequenced messages are preferably not transmitted between the link end points (i.e., the RBU and NIU) until the sequencing protocol is set up as described below. The NIU sets a Begin_MFO_Retry timer and a counter having the same name to the value of one (block 604). The NIU is programmed to await the receipt of a Rsp_SeqProtocol command from the other end point (i.e., the RBU) which indicates the sequencing protocol status "Begin" (block 606). If a Rsp_Sequence Protocol Begin is received from the RBU (block 608), then the NIU commences sequence numbering and assumes that the RBU is available. The NIU is therefore prepared for multiple frame operation and commences operation in accordance with the flow chart depicted in FIGS. 29A–29D. If a response is not received before the Begin_MFO_Retry timer times out, then the timer is reset and the NIU continues to operate in the MFO_Off state (block 610).

With reference to block 612 in FIG. 25A, receipt of a Cmd_Term_SeqProtocol command at an end point operating in the MFO_Off state from the other end point indicates a misalignment. In accordance with the present invention, the receiving end point can transmit a Rsp_SeqProtocol command with status information indicating that sequence messaging has been terminated to induce the other end point into the MFO_Off state (block 614). Similarly, receipt of a Cmd_SeqStatusUpdate command while in the MFO_Off state also indicates misalignment (block 616). Accordingly, the receiving end point transmits a command to terminate sequencing protocol (block 618). The messages in blocks 614 and 618 can be sent by either the NIU or the RBU to update flow control of the other end point. The Cmd_TermSeqProtocol command passes the sequence numbers of the messages which were most recently sent and received.

If a Cmd_StartInit is received from the RBU (block 620), the NIU is programmed to transmit warnings to the RBU (block 622) to clear related data and to set the MFO variable to the OFF state (block 624). The NIU subsequently undergoes initialization as described above in connection with FIGS. 21–24. If no Rsp_Seq_Protocol command is successfully sent to the NIU before the expiration of the Begin_MFO_Timer (block 626), and the Begin_MFO_Retry counter is greater than a predetermined maximum number of retries (block 628), the NIU sends warnings signals to the RBU (block 630) and commences link initialization as described in FIGS. 21–24. If the maximum number of retries have not been reached, then the NIU sets the Begin_MFO_Retry timer, increments the Begin_MFO_Retry counter (block 632) and continues to operate in the MFO_Off state.

Figure 26A:
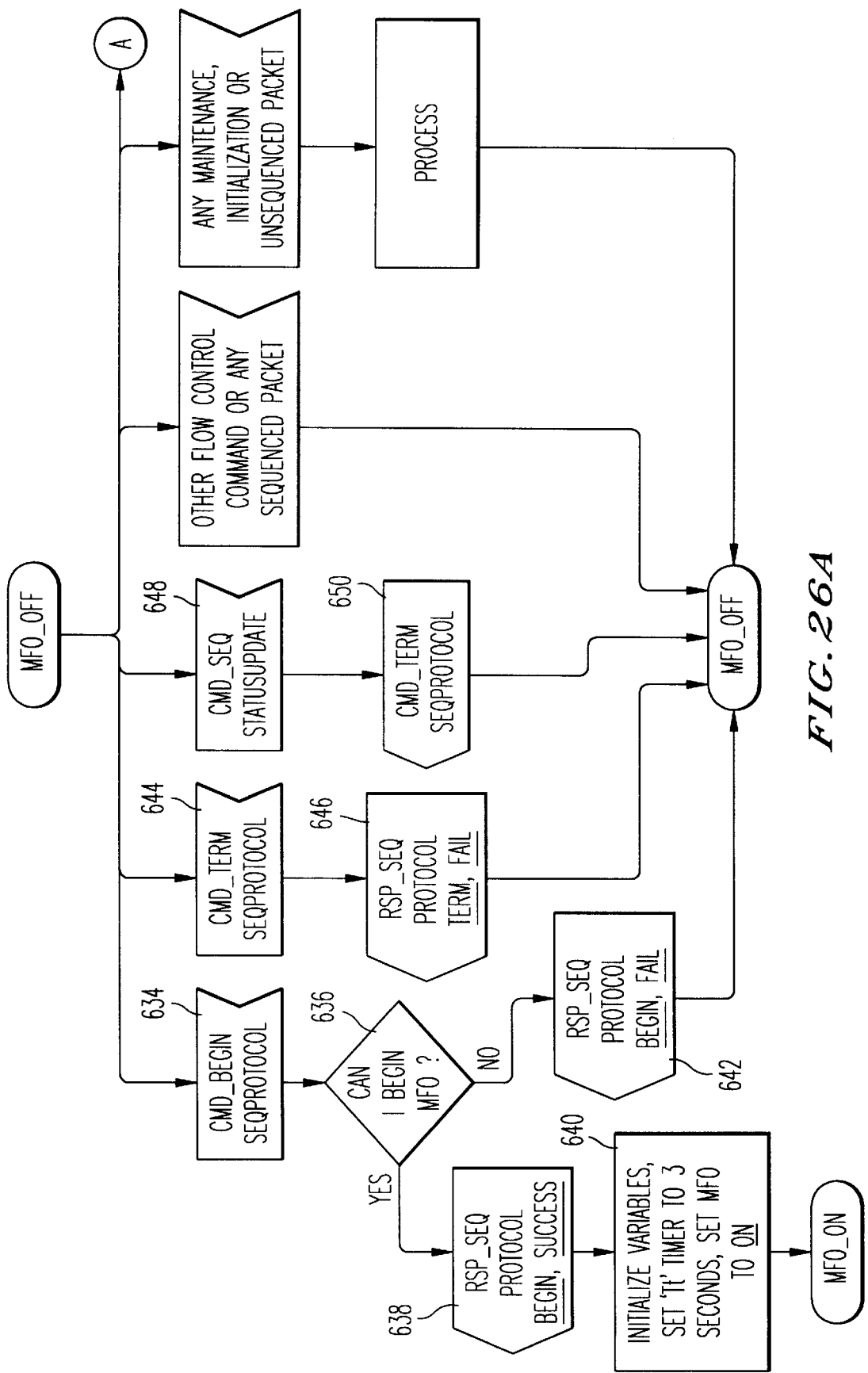
Figure 26B:
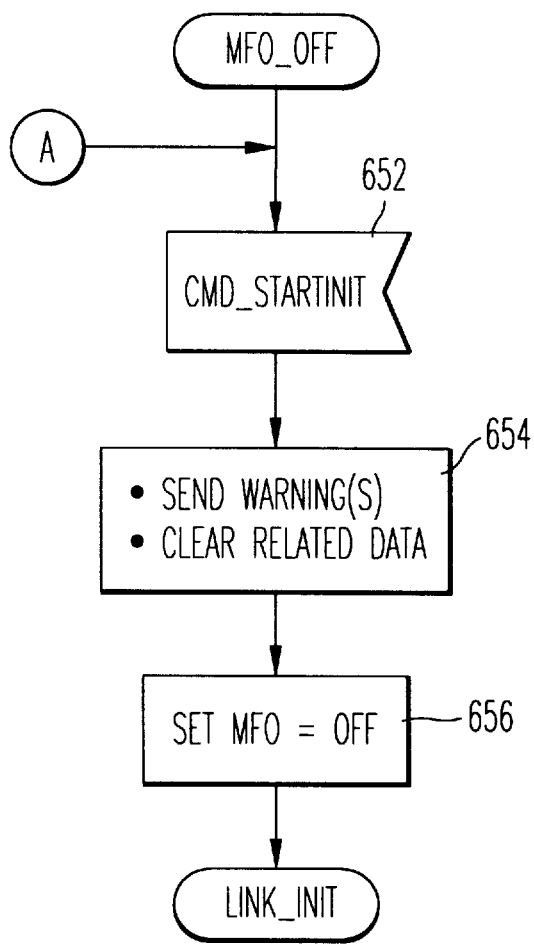

Multiple frame operation in the OFF state for the RBU will now be described with reference to FIGS. 26A and 26B. The RBU awaits receipt of the Cmd_BeginSeqProtocol command from the NIU (block 634). Once this command is received, the RBU transmits an Rsp_SeqProtocol command indicating the beginning of multiple frame operation (MFO) and the transmission of sequenced messages between the link end points (blocks 636 and 638). A number of variables are initialized and a timer (Tt) is set to three (3) seconds (block 640). If RBU is not prepared for MFO, the RBU responds with a Rsp_SeqProtocol begin fail condition (block 642). The RBU similarly receives and responds to a Cmd_TermSeqProtocol command (blocks 644 and 646), a Cmd_SeqStatusUpdate command (blocks 648 and 650), and a Cmd_StartInit command (blocks 652, 654 and 656), as described above in connection with the NIU.

Figure 27:
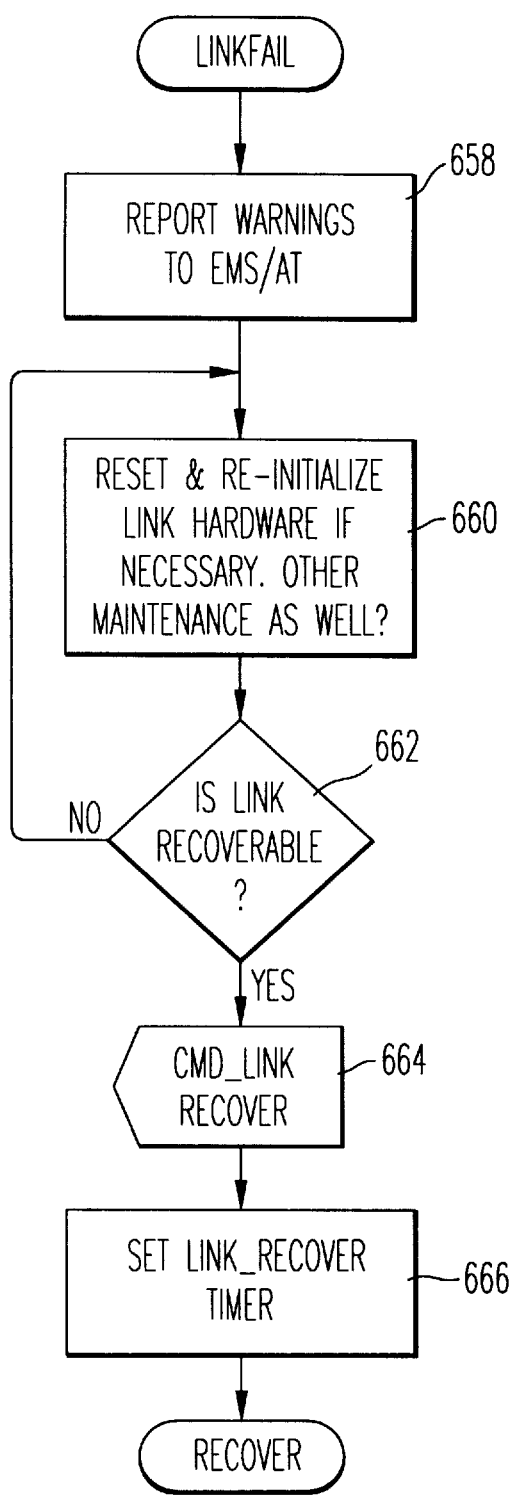

With reference to FIG. 27, a Cmd_LinkFail command can be sent by either the RBU or the NIU across a non-failed E1 upon detection of a failed E1. When the RBU receives this message, it is programmed to move calls on the failed link to another link. The end point (i.e., either the RBU or the NIU) receiving the link fail command reports warnings to an element management system (EMS) and an administrative terminal (block 658). Link hardware (i.e., the E1 interfaces 56a and 56b) on each trunk board 38a and 38b is reset and initialized if necessary (block 660), among other maintenance operations. If the link is recoverable (block 662), a Cmd_LinkRecover command is sent to the other end point over the link that is being recovered (block 664) and a Link_Recover timer is set (block 666).

Figure 28:
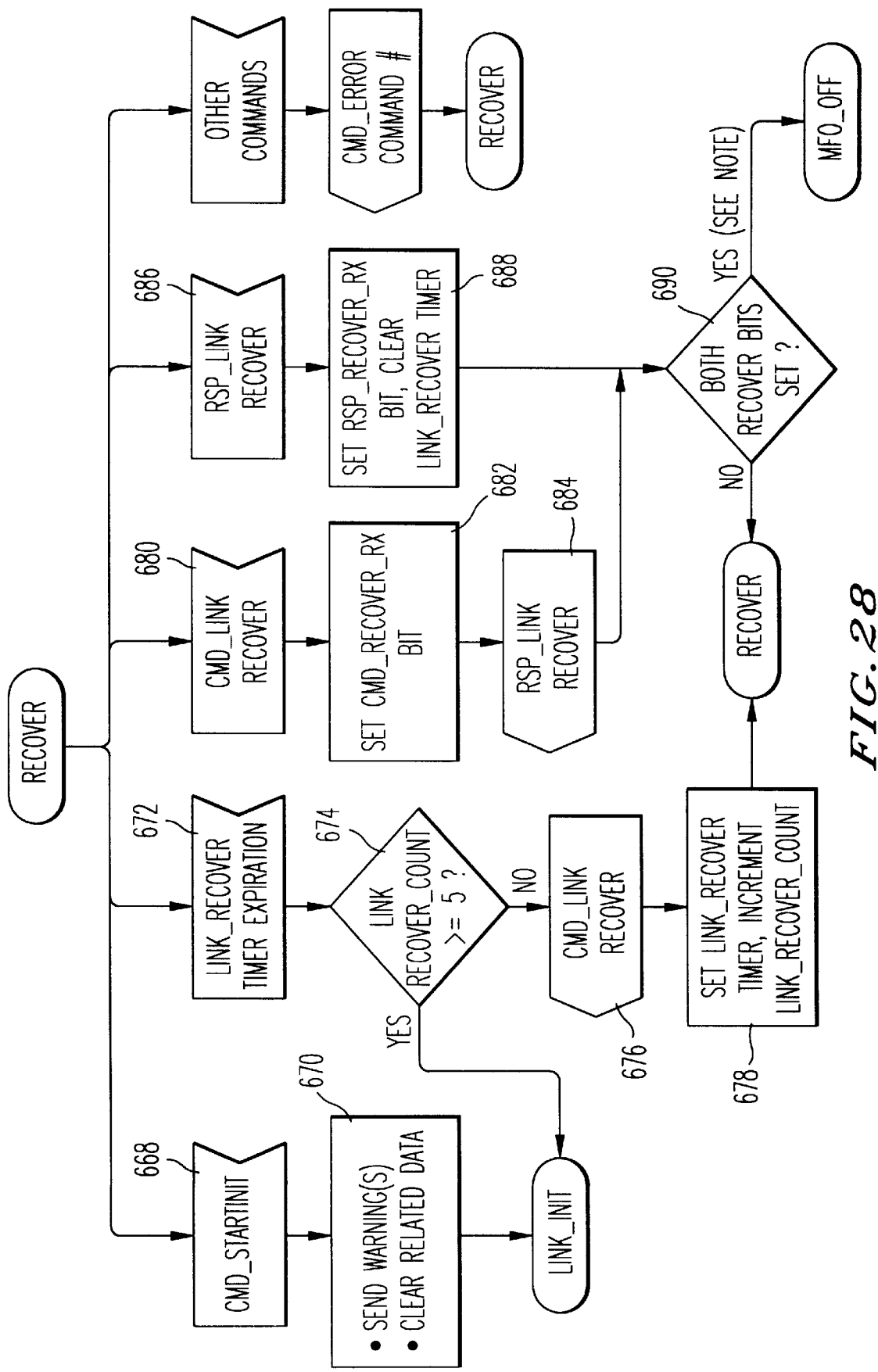
Figure 29A:
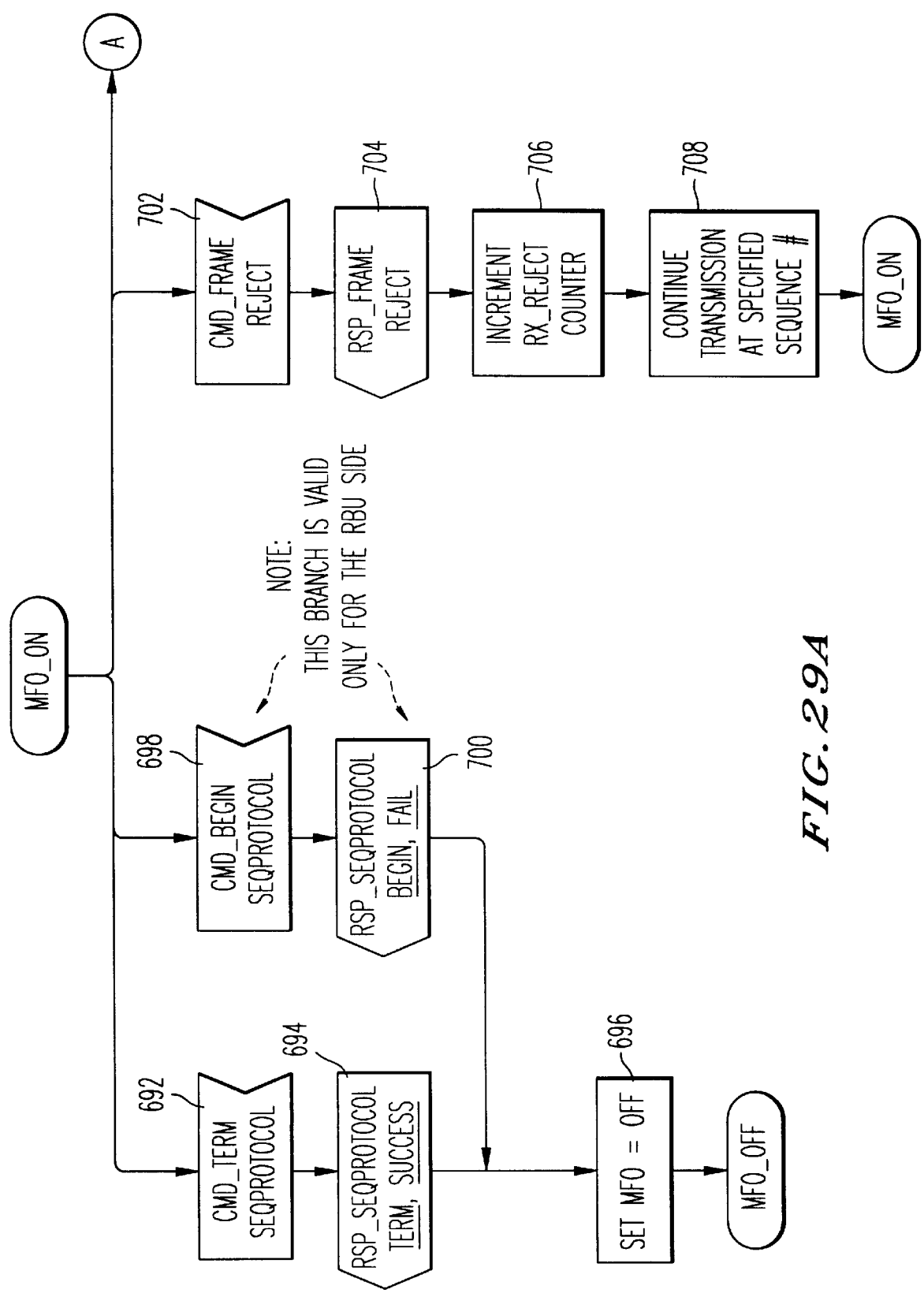
Figure 29B:
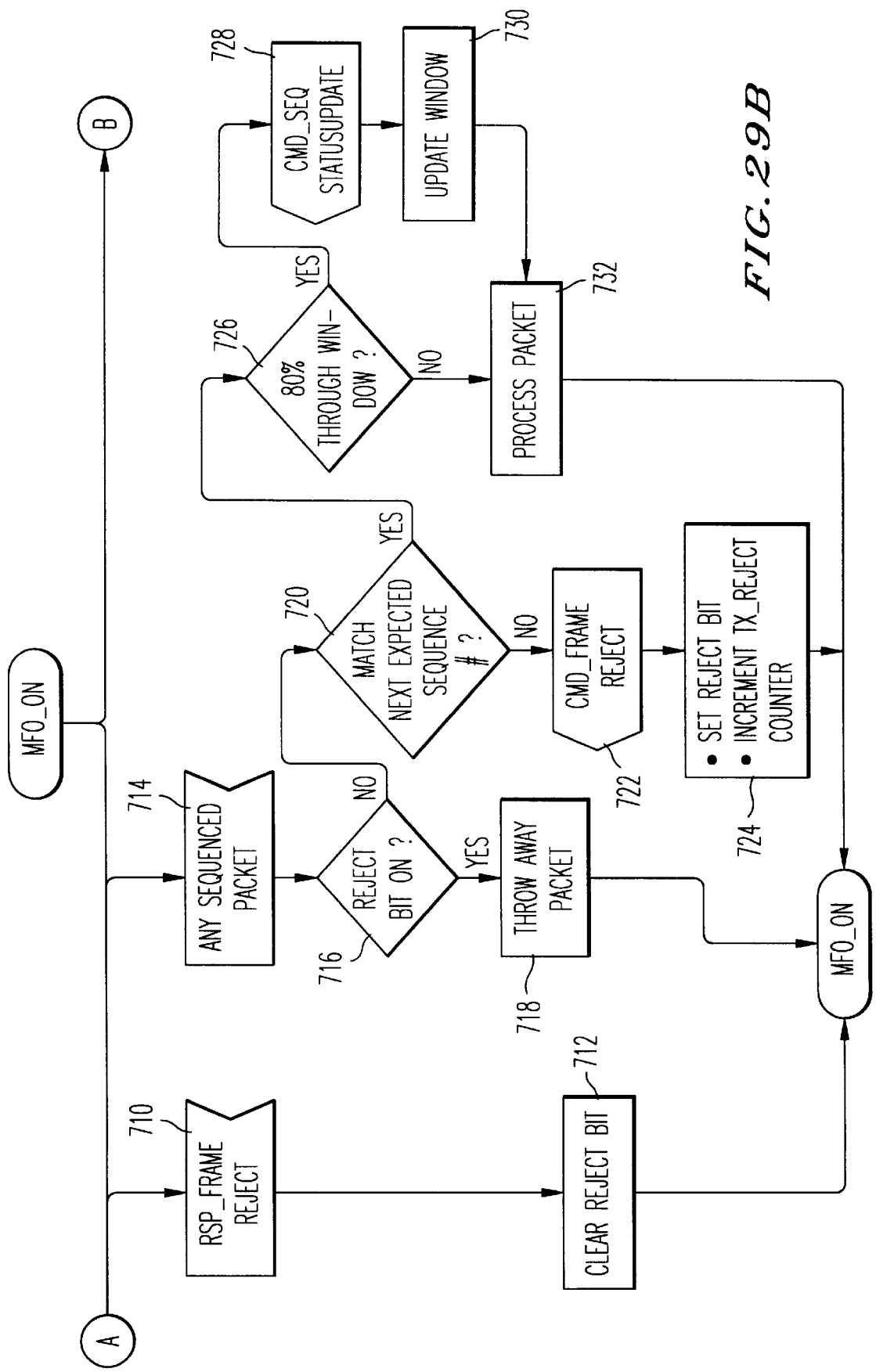
Figure 29C:
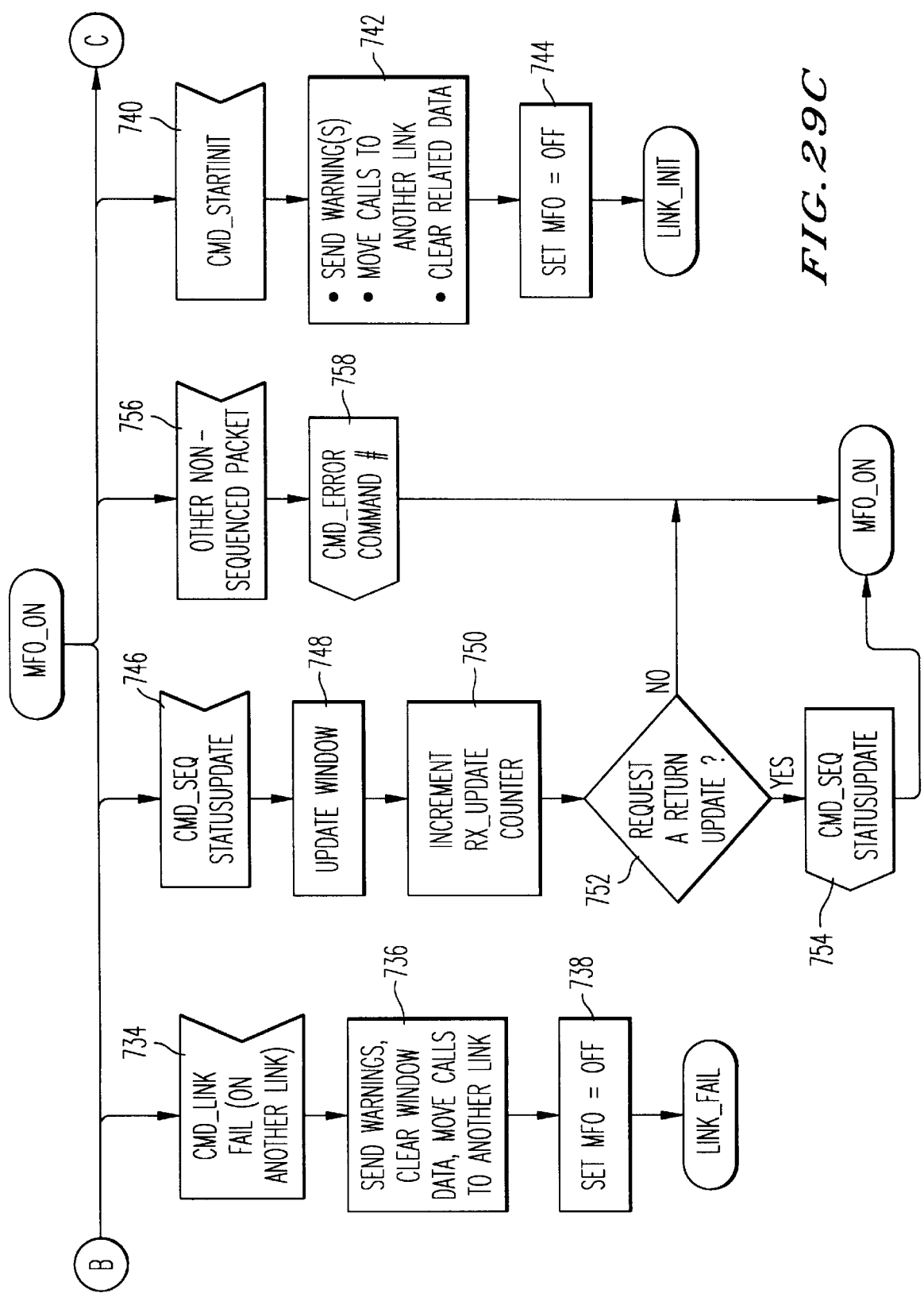
Figure 29D:
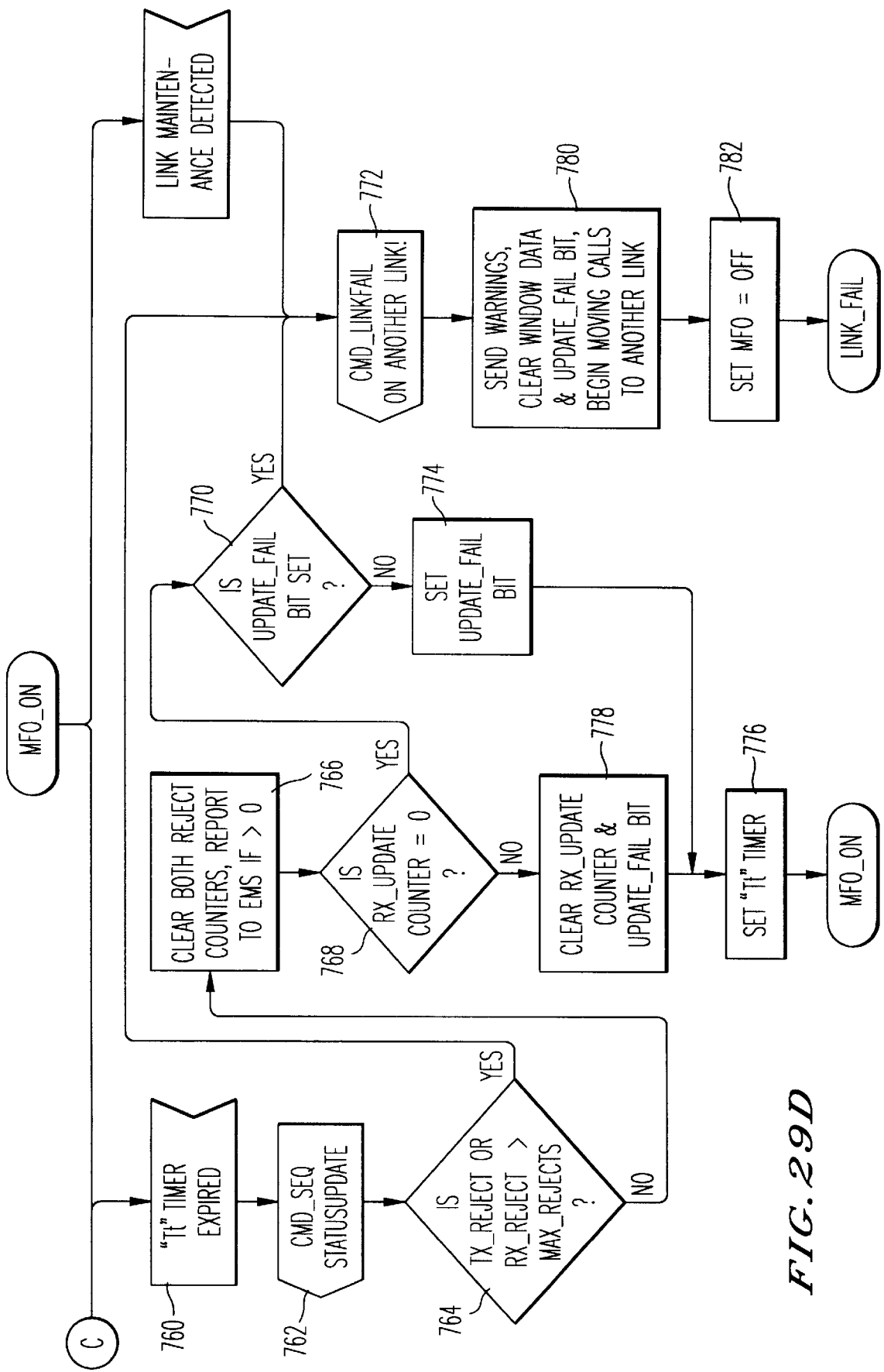
Figure 30:
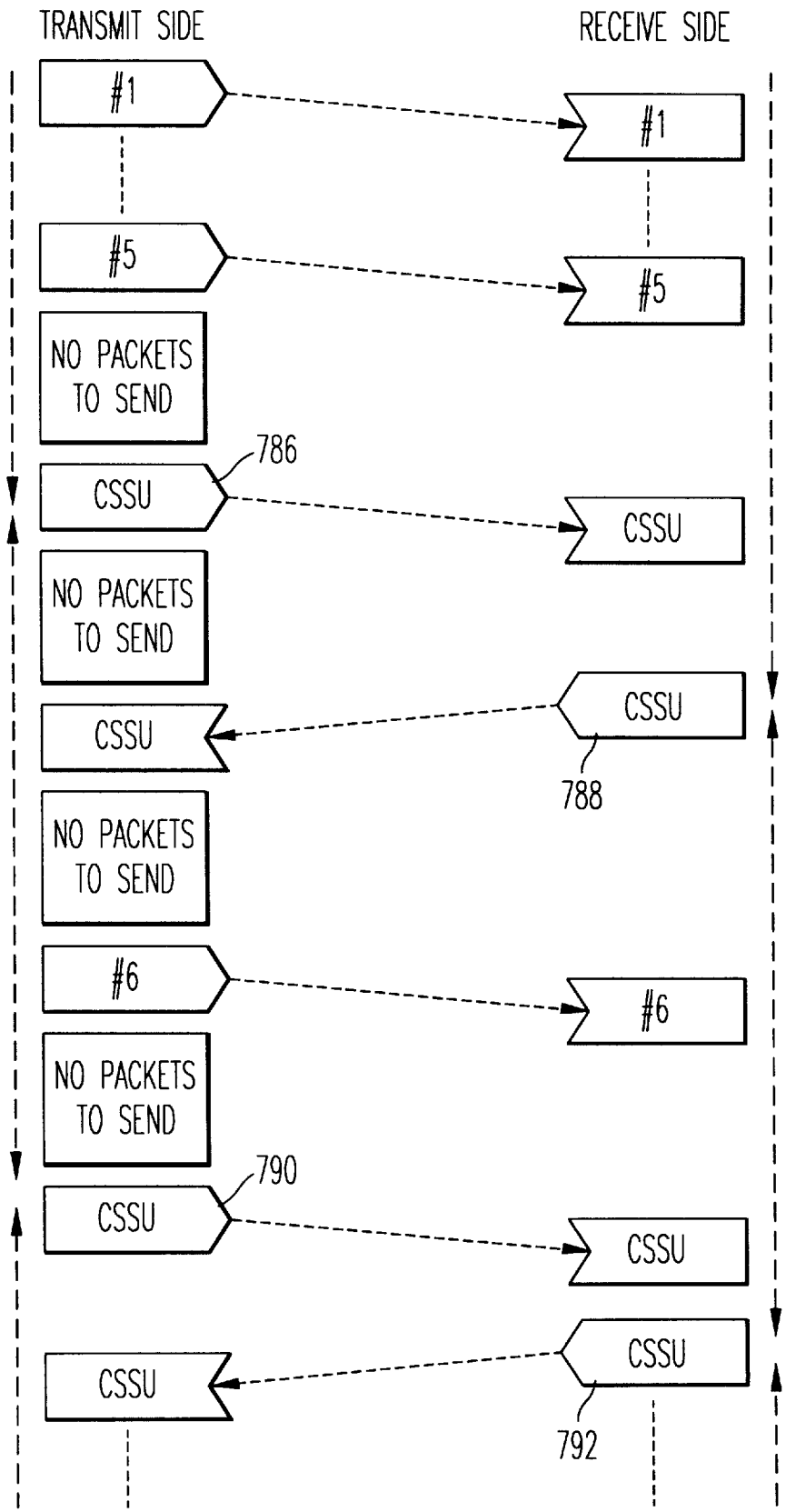

With reference to FIG. 28, both end points are programmed to await receipt of a Cmd_StartInit command or for the expiration of the Link_Recover timer (blocks 672 and 674). If either condition exists, the link undergoes initialization. If the timer does not expire, the end point is programmed to send a Cmd_Link_Recover command (block 676) to the other end point, as well as reset the Link_Recover timer and increment the Link_Recover counter (block 678). If a Cmd_Link_Recover command is received from the other end point (block 680), the receiving end point is programmed to send an Rsp_Link_Recover if the end point can also resume service (block 681). The Cmd_Recover_Rx bit is also set (block 682). Similarly, if the end point receives a Rsp_Link_Recover acknowledgment (block 680) to its transmission of a Cmd_Link_Recover command (block 676), the end point sets the Rsp_Recover_Rx bit and clears the Link_Recover timer (block 688). If both the Cmd_Recover_Rx bit and the Rsp_Recover_Rx bit are set (block 690), then the end points enter the MFO_Off state. Upon recovery of the link and before entering the MFO_Off state, the Rsp_Recover_Rx bit and the Cmd_Recover_Rx bit are preferably cleared. Another state can be provided to test the link via a loop back or a bit error rate test (BERT). Once the MFO_Off state is entered by both end points, the MFO_On operations can begin.

With reference to FIGS. 29A–29D, if the sequencing protocol has begun between the two end points, that is, the RBU and NIU are operating in the MFO_On state, and the Cmd_TermSeqProtocol is received from one of the end points (block 692), then an Rsp_SeqProtocol command is transmitted back to the end point (block 694) to indicate that termination is successful and that the end points are now operating in the MFO_Off state (block 696). In addition, the RBU and not the NIU can receive a Cmd_BeginSeqProtocol command (block 698) from the NIU, and respond with an Rsp_SeqProtocol response signal with status information indicating that commencement of the sequencing protocol failed (block 700) since it is in the MFO_On state already.

With continued reference to FIGS. 29A–29D, either end point can receive a Cmd_FrameReject signal from the other end point (block 702). This command can have two meanings, depending on the data within the message. Either end point (e.g., the RBU) can send this command upon detection of invalid or missing frames. The message tells the NIU, for example, to terminate the current transmission and to commence retransmission at the specified sequence number, as illustrated in FIGS. 30–35. A Rsp_Frame_Reject response to the Frame_Reject command is transmitted by the NIU to indicate that it received the reject command and is commencing retransmission (block 704). An Rx_Reject counter is incremented by the NIU (block 706). If the number of rejected frames exceeds a predetermined threshold, the link is considered to have failed. The NIU is programmed to report the error to the maintenance equipment. The NIU is programmed to continue transmission at the specified sequence number in the MFO_On state (block 708). If, on the other hand, an Rsp_FrameReject is received (block 710), the reject bit is cleared (block 712) and operation continues in the MFO_On state. The reject bit is analyzed (block 716) by the NIU when a sequence packet is received (block 714). If the reject bit is on, the packet is thrown away (block 718); otherwise, the next expected sequence number is compared with that of the received packet (block 720). If no match is found, a Cmd_FrameReject command is sent to the other end point (block 722). Further, the reject bit is set, and Tx_Reject counter is incremented (block 724). If the next expected sequence number matches that of the received packet, the NIU, for example, is programmed to determine whether its receive window or buffer is 80% full (block 726), or a time-transmit (Tt) timer has expired and, if so, to transmit a Cmd_SetStatusUpdate command (block 728). This command passes the sequence number of the messages most recently sent and accepted and updates the window (block 730). If the received window is not 80% full, or a Cmd_SeqStatusUpdate command has been sent, then the packet is processed in accordance with the call processing control (block 732).

With continued reference to FIGS. 29A–29D, if an end point receives a Cmd_Link_Fail command on another non-failed E1 link (block 734), the end point sends warnings to the EMS and moves calls to an operating link (block 736) before entering the MFO_Off state (block 738). The end point subsequently executes the link fail routine (FIG. 27) for the failed link. The end point operates similarly if a Cmd_StartInit command is received (blocks 740, 742 and 744), except that it executes a link initialization routine (FIGS. 21–24). If a Cmd_SeqStatusUpdate command is received (block 746), the receiving end point updates receive window (block 748) and increments an Rx_Update counter (block 750). If a request for a return update by the other end point is desired (block 752), a Cmd_SeqStatusUpdate command is sent (block 754). If a non-sequence packet is received (block 756), the receiving end point transmits a Cmd_Error command to the sending end point (block 758).

With continued reference to FIGS. 29A–29D, if the Tt timer is expired (block 760), a Cmd_SeqStatusUpdate command is sent to the sending end point (block 762). If the Tx_Reject counter or the Rx_Reject counter is greater than a maximum predetermined number of allowable rejects (block 764), both reject counters are cleared and a report is made to the EMS (block 766). If the Rx_Update counter is zero (block 768), the end point determines if the Update_Fail bit is set (block 770). If so, then a Cmd_LinkFail command is transmitted on another link (block 772). If the Update_Fail bit is not set, then the end point sets the bit (block 774), as well as the Tt timer (block 776). If the Rx_Update counter is not zero, then the counter is cleared, and the Update_Fail bit is also cleared (block 778), before setting the Tt timer. If a Cmd_LinkFail command is sent, then the end point provides warnings to the EMS, clears received window data and sets the Update_Fail bit before commencing movement of calls to another link (block 780). The MFO bit is then set to OFF (block 782), and the end point undergoes the link fail routine described above in connection with FIG. 27.

Flow control in the link layer 60 is illustrated in FIGS. 30–35. FIGS. 30–35 also illustrate queuing and processing delays that are normal operations of the protocol of the present invention. The numbers in the boxes represent sequence numbers for packets. The transmit side and the receive side can be either the RBU or the NIU since flow control is essentially the same for both, except for differences mentioned below. The diagrams in FIGS. 30–35 represent communication in one direction only for illustrative purposes. Bi-directional communication can occur such that the processes depicted in these figures are occurring in two directions simultaneously. Further, each diagram in the respective figures represents a particular condition, but combinations of these conditions can occur. Sequence numbers preferably range from 0×00 to 0×7F hexidecimal. The high bit is reserved for nonsequenced commands. A packet with the high bit set in the sequence number is processed as a nonsequence packet. For illustrative purposes, the window length is 10 and the maximum number of frame rejects is 3. These variables and the timertransmit timer described below are adjustable for optimal performance.

With continued reference to FIGS. 30–35, each side of an AN-LE link 30 sends a timed update every 3 seconds containing the last transmitted sequence number and the last received sequence number. The timer is called a timertransmit or Tt timer. The transmit and receive sides preferably guarantee an update at least every 3 seconds. If the other end of the AN-LE link 30 does not receive an update upon two expirations of its own Tt timer, then the link may have failed. The AN or LE (e.g., RBU or NIU) subsequently sends a Cmd_Link_Fail command to the other side and stops multiple frame operation on that particular link. The RBU, in accordance with the present invention, begins to move calls to the other links. Since the RBU is responsible for channel assignment on the AN-LE link, an alarm is sent to the element manager system and to the administrative terminals by the transmit and receive sides of the link. The Tt timer also helps to identify a lost packet in low traffic situations. If a packet is lost during low traffic conditions, the Tt timer causes an update by that particular transmit or receive side to be sent to the other end point terminal to identify the missing packet. During low traffic and normal operating conditions, the transmit side sends a packet having sequence number 1 which is received at the receive side. The Tt timer is set to 3 seconds at the beginning of the operation. Updates are sent and the timer is reset whenever it expires. Updates are preferably not sent until the receive window is approximately 80% full (i.e., 8 packets have been received in a window having a 10 packet length). In the illustrated example (i.e., FIG. 30), only 5 packets are sent by the transmit side before the Tt timer expires. The transmit side therefore sends a Cmd_Seq_Status_Update (CSSU) command (block 786) to the receive side and updates the Tt timer. The transmit side has no further packets to send. After the Tt timer of the receive side expires, the receive side transmits a CSSU command (block 788) to the transmit side. Thus, there are no unacknowledged transmitted packets at this point. The transmit side sends a packet having sequence number 6 such that there is now one unacknowledged packet received by the receive side. When the Tt timer expires, the transmit side sends a CSSU command (block 790). The receive side also sends an update or CSSU command (block 792) upon expiration of its Tt timer.

FIG. 31 illustrates heavy traffic but normal operating conditions. The packets transmitted in FIG. 31 occur within a time frame that is less than 3 seconds, such that expiration of the Tt timer on either the transmit or receive sides is not shown for illustrative purposes. The transmit side sends packets with sequence numbers 1–8 to the receive side. When 8 packets are in the receive window, the receive side sends an update or CSSU command 794 to the transmit side. Meanwhile, the transmit side has sent packets having sequence numbers 9 and 10 before hitting the end of its transmit window and refraining from further transmission. The CSSU command 794 from the receive side is received at the transmit side; however, only 8 packets are acknowledged while 2 packets remain unacknowledged. The transmit side continues to transmit packets having sequence numbers 11–18. When another 80% of the receive window has occurred, the receive side transmits another CSSU command 796 to the transmit side leaving 2 packets (i.e., packets 17 and 18) unacknowledged.

Figure 32:
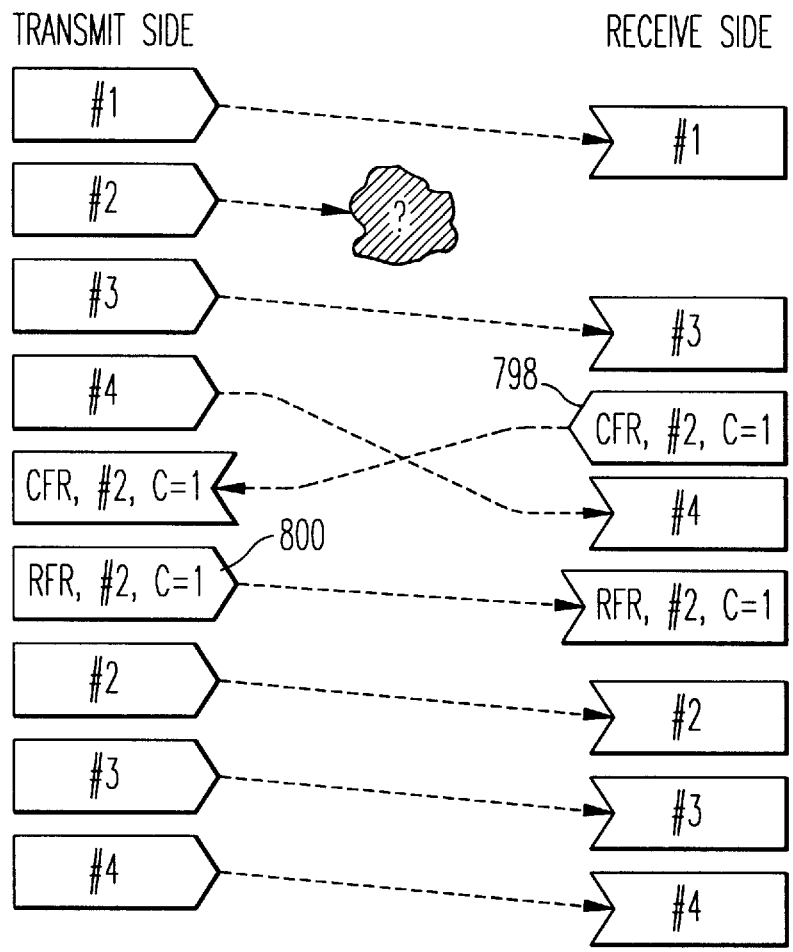

FIG. 32 illustrates link layer processing when there is an error condition. For example, the packet having sequence number 2 was not received by the receive side. The receive side detects that there is a missing packet and sends a Frame_Reject command 798 to the transmit side. The sequence packets are ignored until a Frame_Reject response 800 is received from the transmit side. The receive side transmits the missing sequence number and commences incrementing a Reject_Tx counter. The transmit side receives the Frame_Reject command and ceases to transmit additional packets. The transmit sides also generates a Frame_Reject response signal 800 and commences sending packets from the specified sequence number transmitted along with the Frame_Reject command. Meanwhile, the receive side ignores the packet having sequence numbers 3 and 4, but begins accepting sequence packets 2, 3 and 4 upon receipt of the Frame_Reject response 800. As with FIG. 31, timed updates using the Tt timer are not represented in this error condition diagram or in FIGS. 32–35 below for illustrative purposes.

Figure 33:
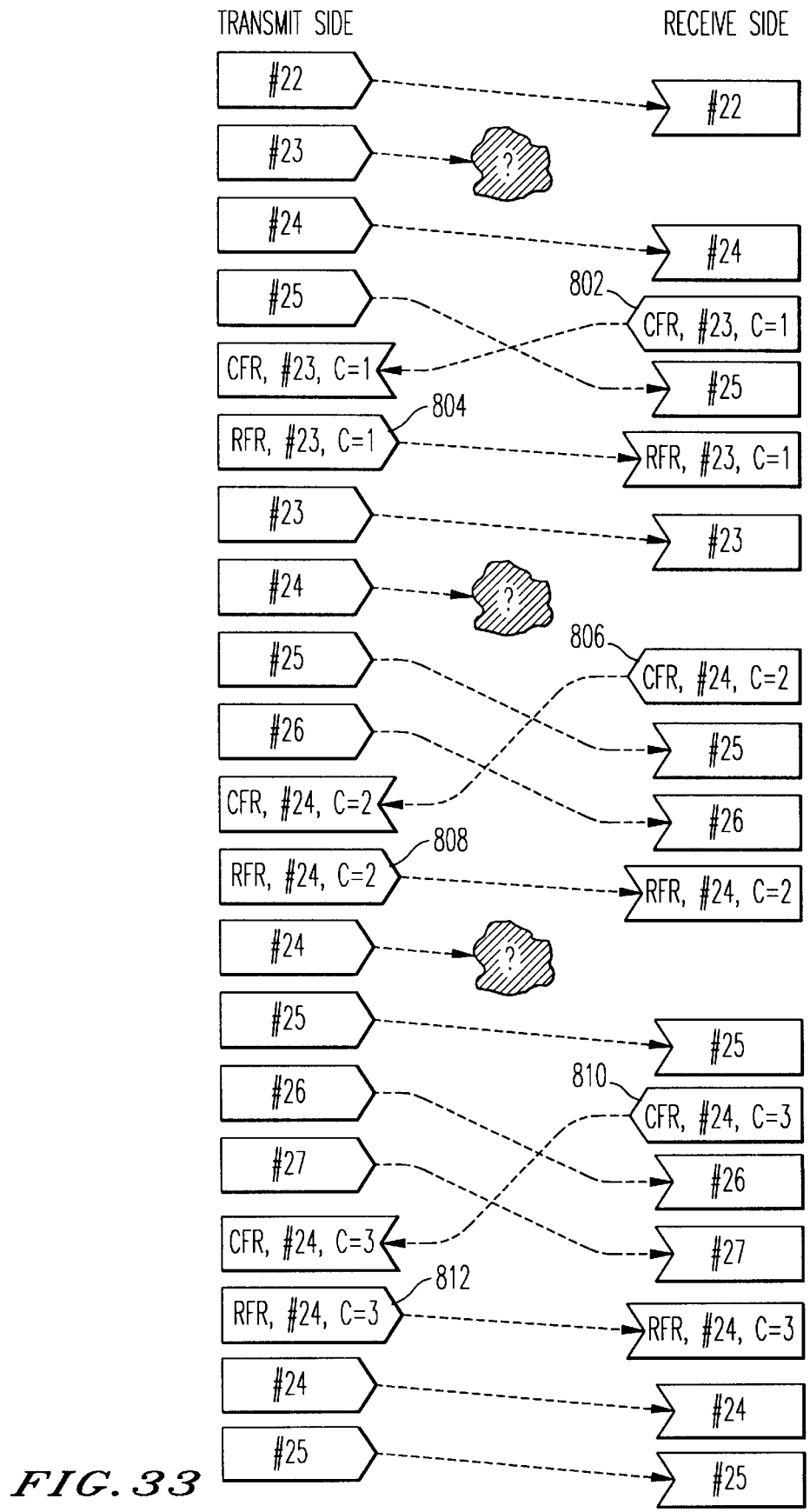

FIG. 33 illustrates flow control when multiple errors have occurred. For example, a packet having sequence number 23 can contain an error condition. The receive side detects a missing packet and sends a Frame_Reject command 802 to the transmit side containing the missing sequence number. The receive side also commences incrementing a Tx_Reject counter. The transmit side has already transmitted packets having sequence numbers 24 and 25 before it receives the Frame_Reject command 802. These and other packets are ignored at the receive side until a Frame_Reject response 804 is received. The transmit side commences retransmission of packets beginning with the sequence number provided to the transmit side by the Frame_Reject command 802. The packet having sequence number 24, however, also has an error condition during retransmission. Accordingly, the receive side transmits a Frame_Reject command 806 indicating the sequence number 24 of the missing packet and increments the Tx_Reject counter again.

The transmit side has already sent packets 25 and 26 before it receives the Frame_Reject command 806. The transmit side sends the Frame_Reject response 808 and begins to retransmit packets beginning with sequence number 24. Once again, a missing packet is detected and the receive side sends a Frame_Reject command 810 to the transmit side indicating the sequence number. The receive side also increments the Tx_Reject counter to 3. The transmit side ceases to transmit packets and responds with a Frame_Reject response before retransmitting packets commencing with the sequence number 24. If the counter exceeds a predetermined maximum number of Frame_Rejects before the expiration of the Tt timer, the link will be declared to have failed and a Link_Fail routine is executed as described in connection with FIG. 27.

Figure 34:
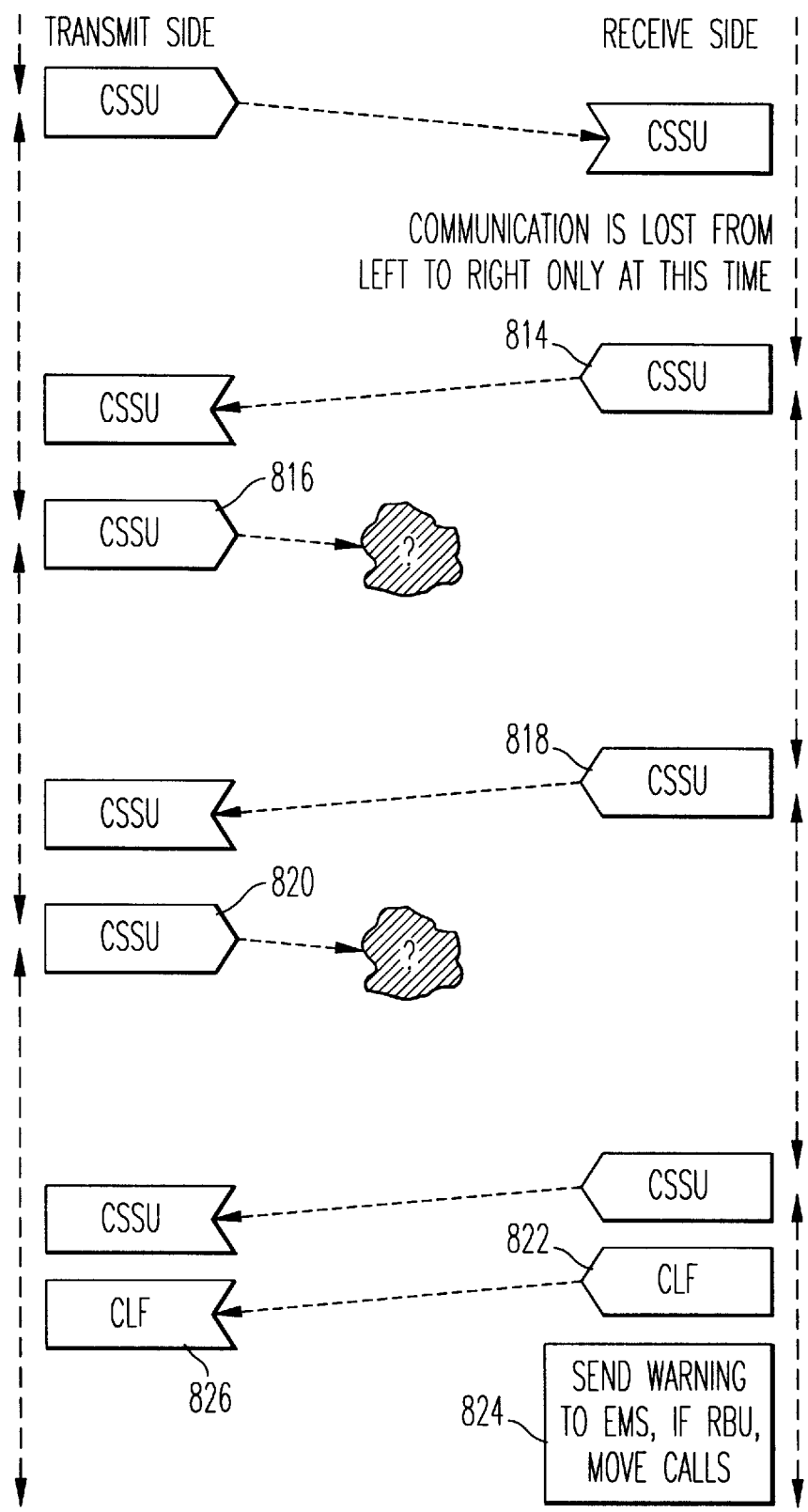

FIG. 34 illustrates when there is an idle traffic communication and the loss of communication in one direction. The Tt timer is set to 3 seconds, but communication is lost from the transmit side to the receive side. Since the Tt timer on the receive side expired, the receive side sends an CSSU command 814 to the transmit side and resets its Tt timer. The transmit side Tt timer also expires. The transmit side sends a CSSU command 816 to the receive side which has an error condition. The receive side once again resets its Tt timer after it expires and sends a CSSU command 818 to the transmit side. The transmit side sends another CSSU command 820. Upon detection of no update during the last two cycles of the Tt timer, the receive side sends a Cmd_Link_Fail command 822 to the transmit side. The receive side terminates multiple frame operation on this link and sends a warning to the EMS or maintenance terminal. The RBU, in accordance with the present invention, commences moving calls to another link at this time 824. At the transmit side, the Link_Failure command is received 826 and multiple frame operation is terminated at this end point of the link.

Figure 35:
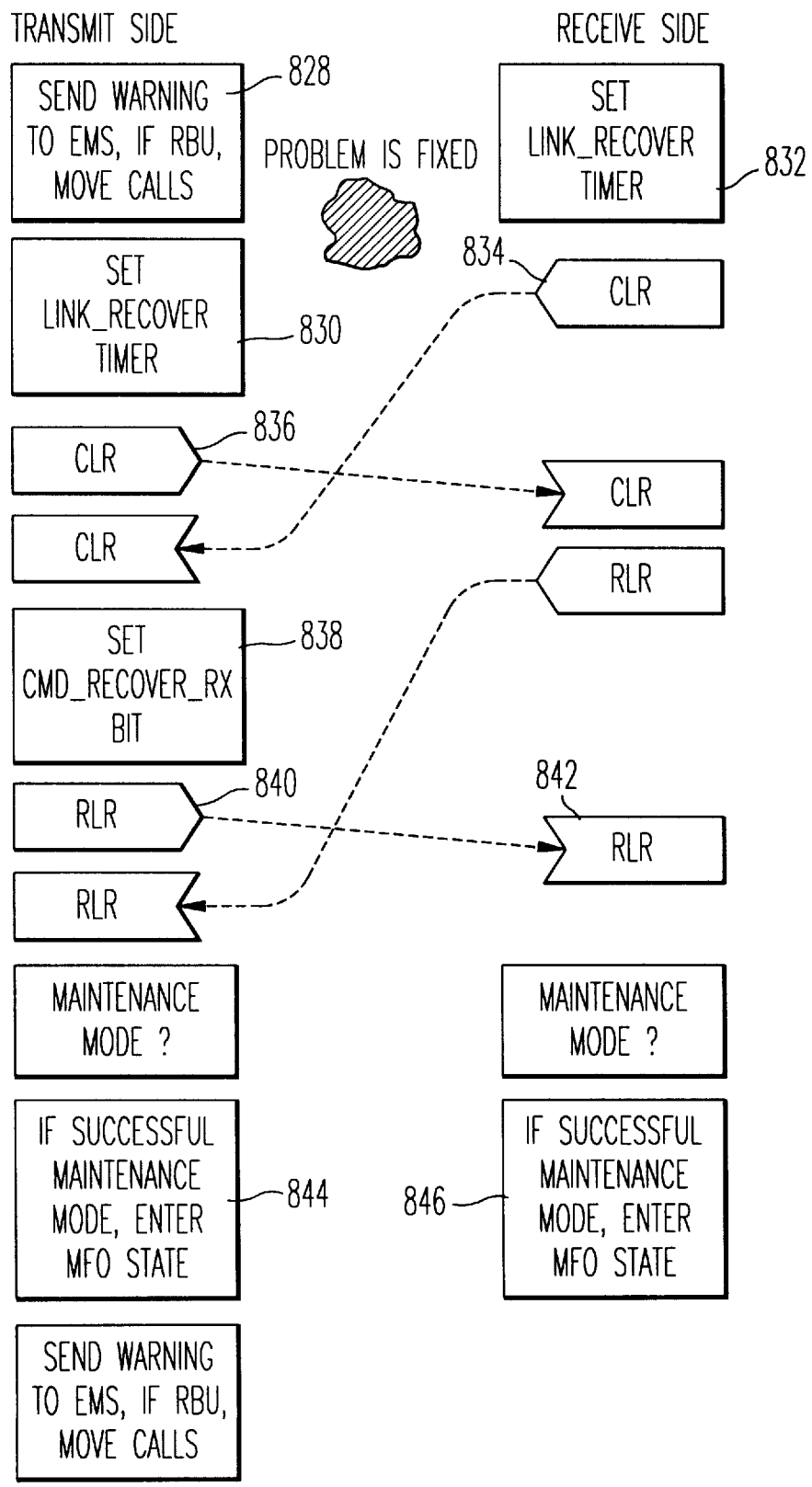

FIG. 35 illustrates link recovery. A warning has been sent to the EMS 828 when a Link_Failure condition is detected. As stated previously, the RBU commences moving calls to another link. Both the transmit and the receive sides set Link_Recover timers 830 and 832. If the problem is fixed, one of the sides can send a Cmd_Link_Recover command 384 to the other side. When the other side is ready, it also sends a Cmd_Link_Recover signal 836 to the other end point. The side that transmitted the Cmd_Link_Recover signal sets a Cmd_Recover_Rx bit 838 upon receipt of the Cmd_Link_Recover from the receiving end point. Both sides then proceed to generate Rsp_Link_Recover signals 840 and 842, respectively, and enter a multiple frame operation state 844 and 846.

While certain advantageous embodiments have been chosen to illustrate the invention, it will be understood by those skilled in the art that various changes and modifications can be made herein without departing from the scope of the invention as defined in the appended claims.

What is claimed is:

1. A method of processing calls transmitted between a subscriber unit and an access network device and a network, the access network device being connected to the subscriber unit, and to the network via a network interface device and at least one communications link comprising a number of channels, the network interface device being an integral part of the network or independent of the network, comprising the steps of:

determining via said access network device whether one of said channels is available on said communications link for an outgoing call attempt initiated by said subscriber unit;

assigning said channel to said outgoing call attempt using said access network device;

notifying said subscriber unit that said channel is available and is to be used for said outgoing call attempt; and notifying said network interface device that said outgoing call attempt will occur on said channel, said network interface device being programmed to process said outgoing call attempt using said channel assigned by said access network device without first assigning one of said channels and notifying said access network device of said channel selected by said network interface device.

2. A call processing method as claimed in claim 1, further comprising the step of reporting an off-hook condition at said subscriber unit to said access network device and then to said network interface device as an indication of said outgoing call attempt in lieu of sending a physical off-hook signal generated by said subscriber unit.

3. A call processing method as claimed in claim 1, further comprising the steps of:

determining whether said network interface device can accept said outgoing call attempt;

transmitting a response signal from said network interface device to said access network device indicating when said outgoing call attempt is not successfully received by said network interface device; and releasing said channel.

4. A call processing method as claimed in claim 3, further comprising the step of transmitting a signal from said access network device to said subscriber unit to indicate that said outgoing call attempt has been rejected if said access network device has determined that at least one of a first condition and a second condition exists, said first condition corresponding to none of said channels being available between said access network device and said network interface device, said second condition corresponding to lack of a communication channel between said subscriber unit and said access network device for an outgoing call resulting from said outgoing call attempt.

5. A call processing method as claimed in claim 1, further comprising the steps of:

determining whether said network interface device can accept said outgoing call attempt; and performing at least one of a plurality of functions comprising seizing a trunk using said network interface device to connect said subscriber unit to said network, and receiving dialed digits for routing a corresponding outgoing call resulting from said outgoing call attempt from said subscriber unit, if said outgoing call attempt can be processed by said network interface device.

6. A call processing method as claimed in claim 5, further comprising the steps of:

determining priority of of an outgoing call resulting from said outgoing call attempt at said network interface device using said dialed digits received from said subscriber unit; and notifying said access network device to process said outgoing call attempt in accordance with a different priority.

7. A method of processing calls transmitted between a subscriber unit, an access network device connected to the subscriber unit, and a network interface device connected to the access network device via at least one communications link comprising a number of channels and to a network, comprising the steps of:

receiving an in coming signal at said network interface device from said network, said in coming signal corresponding to an incoming call;

transmitting a command signal from said network interface device to said access network device indicating that said incoming call is forthcoming;

determining via said access network device whether one of said channels is available;

assigning said channel to said incoming call using said access network device;

notifying said subscriber unit if said channel is available; and transmitting an answer signal to said network interface device from said access network device.

8. A method of processing calls transmitted between a subscriber unit, an access network device connected to the subscriber unit, and a network interface device connected to the access network device via at least one communications link comprising a number of channels and to a network, comprising the steps of:

determining via said access network device whether one of said channels is available for a call;

detecting a condition to terminate said call at said access network device;

determining whether said network interface device should be notified of said condition; and transmitting a command to terminate said call to said network interface device if said network interface device had been notified that one of said channels on said link had been assigned for said call by said access network device.

9. A method of processing a call between a first subscriber unit and a second subscriber unit, both of which are connected to an access network device, a network interface device being connected to the access network device via a communication link comprising a plurality of channels and to a network, comprising the steps of:

determining via said access network device whether a first channel is available from among said plurality of channels for a call initiated by said first subscriber unit;

assigning said first channel to said call using said access network device;

notifying said first subscriber unit that said first channel is available;

notifying said network interface device that said call is forthcoming and on which of said plurality of channels said call is being transmitted, said network interface device being programmable to process said call using said first channel assigned by said access network device without first assigning one of said plurality of channels and notifying said access network device of said channel selected and assigned by said network interface device;

processing said call on said first channel using said network interface device to determine where said call is to be routed;

transmitting a command signal from said network interface device to said access network device indicating that said call is being routed thereto;

determining via said access network device whether a second channel from among said plurality of channels is available for routing said call to said second subscriber unit;

assigning said second channel to said call using said access network device;

sending a response signal from said access network device to said network interface device to indicating whether said second channel has been assigned;

notifying said second subscriber unit if said channel is available, said second subscriber unit proceeding to go off-hook; and transmitting an answer signal to said network interface device from said access network device to complete said call between said first subscriber unit and said second subscriber unit if said second channel has been successfully assigned by said access network device.

10. A method of processing calls transmitted between a subscriber unit and an access network device and a network, the access network device being connected to the subscriber unit, and to the network via a network interface device and at least one communications link comprising a number of channels, the network interface device being an integral part of the network or independent of the network, comprising the steps of:

receiving an incoming call indication signal at said network interface device from said network, said incoming call indication signal corresponding to an incoming call attempt for said subscriber unit;

transmitting a command signal from said network interface device to said access network device indicating that said incoming call attempt is forthcoming for said subscriber unit;

determining via said access network device whether one of said channels is available;

assigning said channel to said incoming call attempt using said access network device;

notifying said subscriber unit of said incoming call attempt and said channel to use for a corresponding incoming call resulting from said incoming call attempt; and transmitting an answer signal to said network interface device from said access network device when said subscriber unit answers said incoming call.

11. A method of processing calls transmitted between a subscriber unit and an access network device and a network, the access network device being connected to the subscriber unit, and to the network via a network interface device and at least one communications link comprising a number of channels, the network interface device being an integral part of the network or independent of the network, comprising the steps of:

detecting a condition to terminate an established call at said access network device via a call termination indication signal from one of the subscriber unit and the network;

determining whether said network interface device should be notified of said condition if said call termination signal is from the subscriber unit;

transmitting a command to terminate said call to said network interface device from said access network device if said call termination indication signal is from the subscriber unit and if said network interface device had been notified that one of said channels on said link had been assigned for said call by said access network device; and transmitting a command to terminate said call to said access network device from said network interface device if said call termination indication signal is from the network.

12. A method of processing a call between a first subscriber unit and a second subscriber unit, both of which are connected to an access network device, a network interface device being connected to the access network device via a communication link comprising a plurality of channels and to a network, comprising the steps of:

determining via said access network device whether a first channel is available from among said plurality of channels for an outgoing call attempt initiated by said first subscriber unit;

assigning said first channel to said outgoing call attempt using said access network device;

notifying said first subscriber unit that said first channel is available and is to be used for said outgoing call attempt;

notifying said network interface device that said outgoing call attempt will occur on said first channel, said network interface device being programmed to process said outgoing call attempt using said first channel assigned by said access network device without first assigning one of said plurality of channels and notifying said access network device of said channel selected and assigned by said network interface device;

processing an outgoing call corresponding to said outgoing call attempt on said first channel using said network interface device to determine where said call is to be routed;

transmitting a command signal from said network interface device to said access network device indicating that an incoming call attempt is forthcoming for said second subscriber unit;

determining via said access network device whether a second channel from among said plurality of channels is available for routing said call to said second subscriber unit;

assigning said second channel to said incoming call attempt using said access network device;

sending a response signal from said access network device to said network interface device to indicating whether said second channel has been assigned and which of said plurality of channels has been assigned to be said second channel;

notifying said second subscriber unit of said incoming call attempt and said second channel to use for an incoming call resulting from said incoming call attempt;

transmitting an answer signal to said network interface device from said access network device; and completing said call between said first subscriber unit and said second subscriber unit via said network interface device.

* * * * *